US012684193B2

(12) United States Patent
Ruangchan et al.

(10) Patent No.: US 12,684,193 B2
(45) Date of Patent: Jul. 14, 2026

(54) SYSTEMS AND METHODS OF PRESENTING MIXED MEDIA IN A THREE-DIMENSIONAL ENVIRONMENT

(71) Applicant: Apple Inc., Cupertino, CA (US)

(72) Inventors: Danvin Ruangchan, San Jose, CA (US); Bradley W. Peebler, Redwood City, CA (US); Derek E. Bowen, Santa Clara, CA (US); Jenny Kim, Irvine, CA (US); Marshall W. Huss, Santa Clara, CA (US); Fady A. Eid, Irvine, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/677,782

(22) Filed: May 29, 2024

(65) Prior Publication Data

US 2024/0406490 A1 Dec. 5, 2024

Related U.S. Application Data

(60) Provisional application No. 63/625,207, filed on Jan. 25, 2024, provisional application No. 63/505,415, filed on May 31, 2023.

(51) Int. Cl.
*H04N 21/431* (2011.01)
*H04N 21/2187* (2011.01)
(Continued)

(52) U.S. Cl.
CPC ..... *H04N 21/4316* (2013.01); *H04N 21/2187* (2013.01); *H04N 21/4532* (2013.01); *H04N 21/8133* (2013.01)

(58) Field of Classification Search
CPC ........... H04N 21/4316; H04N 21/2187; H04N 21/4532; H04N 21/8133; H04N 13/361;
(Continued)

(56) References Cited

U.S. PATENT DOCUMENTS 5,195,179 A 3/1993 Tokunaga
5,521,841 A 5/1996 Arman et al.
(Continued)

FOREIGN PATENT DOCUMENTS

EP 2631773 A2 8/2013
WO 2023/034231 A1 3/2023
WO 2024/064373 A1 3/2024

OTHER PUBLICATIONS

LMAOWTF, "How to Change Camera Angle in Madden 23 (Xbox, Playstation, PC)", Available online at <https://www.youtube.com/watch?v=yNcTgV4JXiw>, [Retrieved from Internet on Aug. 13, 2024], Sep. 10, 2022, 1 page.
(Continued)

*Primary Examiner* — Fernando Alcon
(74) *Attorney, Agent, or Firm* — Kubota & Basol LLP

(57) ABSTRACT

Some examples of the disclosure are directed to systems and methods for displaying supplemental content for two-dimensional content that is being played back in a three-dimensional environment at an electronic device. In some examples, while a content item is displayed in a virtual playback user interface in a three-dimensional environment, the electronic device displays a three-dimensional representation corresponding to the content item in the three-dimensional environment. In some examples, the three-dimensional representation includes a representation of a venue of the event and/or representations of participants in the event. In some examples, portions of the venue and/or a subset of the participants in the event that are not currently displayed/visible in the camera view of the broadcast/stream of the content item are included in the three-dimensional representation. In some examples, the three-dimensional representation is configurable to be interacted with independently (Continued)

of the display of the content item in the three-dimensional environment.

24 Claims, 58 Drawing Sheets

(51) Int. Cl.
H04N 21/45 (2011.01)
H04N 21/81 (2011.01)

(58) Field of Classification Search
CPC ........... H04N 21/4312; H04N 21/8153; H04N 21/816
See application file for complete search history.

(56) References Cited

U.S. PATENT DOCUMENTS

| | | | |
|---|---|---|---|
| 5,760,767 A | 6/1998 | Shore et al. | |
| 5,852,435 A | 12/1998 | Vigneaux et al. | |
| 5,884,056 A | 3/1999 | Steele | |
| 6,069,606 A | 5/2000 | Sciammarella et al. | |
| 6,332,147 B1 | 12/2001 | Moran et al. | |
| 6,463,444 B1 | 10/2002 | Jain et al. | |
| RE38,401 E | 1/2004 | Goldberg et al. | |
| RE38,609 E | 10/2004 | Chen et al. | |
| 6,807,361 B1 | 10/2004 | Girgensohn et al. | |
| 7,143,362 B2 | 11/2006 | Dieberger et al. | |
| 7,149,974 B2 | 12/2006 | Girgensohn et al. | |
| 7,343,026 B2 | 3/2008 | Niwa et al. | |
| 9,361,521 B1 | 6/2016 | Mclean et al. | |
| 10,203,762 B2 | 2/2019 | Bradski et al. | |
| 10,298,643 B1 | 5/2019 | Toal et al. | |
| 10,325,410 B1 * | 6/2019 | Smith | G06T 11/00 |
| 10,491,943 B1 * | 11/2019 | Wahlquist-Ortiz | A63F 13/46 |
| 10,491,958 B2 | 11/2019 | Taylor et al. | |
| 10,531,137 B1 * | 1/2020 | Matak | A63B 24/0062 |
| 10,937,239 B2 | 3/2021 | Huston et al. | |
| 11,606,608 B1 * | 3/2023 | Kalam | G06F 3/04815 |
| 11,622,156 B1 * | 4/2023 | Mendell | H04N 21/4532 463/25 |
| 11,632,531 B1 * | 4/2023 | Bryan | H04N 21/4307 348/43 |
| 2003/0184598 A1 | 10/2003 | Graham | |
| 2003/0189588 A1 | 10/2003 | Girgensohn et al. | |
| 2005/0162384 A1 | 7/2005 | Yokoyama | |
| 2006/0090141 A1 | 4/2006 | Loui et al. | |
| 2006/0103631 A1 | 5/2006 | Mashima et al. | |
| 2006/0120624 A1 | 6/2006 | Jojic et al. | |
| 2006/0252541 A1 | 11/2006 | Zalewski et al. | |
| 2007/0098350 A1 | 5/2007 | Gibbon et al. | |
| 2008/0096654 A1 | 4/2008 | Mondesir et al. | |
| 2009/0115902 A1 | 5/2009 | Fukushima et al. | |
| 2010/0050082 A1 * | 2/2010 | Katz | H04N 21/435 715/848 |
| 2011/0141359 A1 * | 6/2011 | DiGiovanni | H04N 21/44008 348/563 |
| 2012/0102526 A1 | 4/2012 | Lejeune | |
| 2012/0233640 A1 | 9/2012 | Odryna et al. | |
| 2014/0062696 A1 * | 3/2014 | Packard | H04N 21/23418 340/540 |
| 2014/0258854 A1 | 9/2014 | Li | |
| 2014/0289668 A1 | 9/2014 | Mavrody | |
| 2015/0058730 A1 | 2/2015 | Dubin et al. | |
| 2015/0103131 A1 | 4/2015 | Denoue et al. | |
| 2015/0350639 A1 | 12/2015 | Maule et al. | |
| 2016/0066053 A1 * | 3/2016 | Bielman | H04N 21/4316 725/41 |
| 2016/0149956 A1 | 5/2016 | Birnbaum et al. | |
| 2016/0182965 A1 * | 6/2016 | Peterson | H04N 21/4312 725/37 |
| 2016/0225012 A1 | 8/2016 | Ha et al. | |
| 2017/0134778 A1 | 5/2017 | Christie et al. | |
| 2017/0180780 A1 | 6/2017 | Jeffries | |
| 2017/0264936 A1 | 9/2017 | Depies et al. | |
| 2017/0347144 A1 | 11/2017 | Da Fonseca et al. | |
| 2018/0249113 A1 | 8/2018 | Faulkner | |
| 2018/0262782 A1 | 9/2018 | Mateik et al. | |
| 2019/0014378 A1 * | 1/2019 | Shah | H04N 21/47217 |
| 2019/0206129 A1 * | 7/2019 | Khalid | A63F 13/88 |
| 2019/0236364 A1 * | 8/2019 | Hall | H04N 21/8146 |
| 2019/0255386 A1 | 8/2019 | Trotter et al. | |
| 2019/0317657 A1 * | 10/2019 | Oddy | G06F 3/04815 |
| 2019/0373322 A1 | 12/2019 | Rojas-Echenique et al. | |
| 2020/0201529 A1 | 6/2020 | Mclean et al. | |
| 2021/0342590 A1 | 11/2021 | Choi et al. | |
| 2021/0397332 A1 | 12/2021 | Park et al. | |
| 2022/0100270 A1 | 3/2022 | Pastrana Vicente et al. | |
| 2022/0121344 A1 | 4/2022 | Pastrana Vicente et al. | |
| 2022/0229524 A1 | 7/2022 | Mckenzie et al. | |
| 2022/0321944 A1 * | 10/2022 | Hosseini | H04N 21/2335 |
| 2023/0082513 A1 | 3/2023 | Rowley | |
| 2023/0128243 A1 * | 4/2023 | Sundareson | H04L 65/611 |
| 2023/0146677 A1 | 5/2023 | Woo et al. | |
| 2023/0276189 A1 | 8/2023 | Elff | |
| 2023/0298242 A1 | 9/2023 | Djuric | |
| 2023/0351758 A1 | 11/2023 | Kumar | |
| 2023/0360278 A1 | 11/2023 | Keller et al. | |
| 2024/0103677 A1 | 3/2024 | Mckenzie et al. | |
| 2024/0107118 A1 | 3/2024 | Ellingford et al. | |
| 2024/0152256 A1 | 5/2024 | Dascola et al. | |
| 2024/0214521 A1 | 6/2024 | Zuo | |
| 2024/0231741 A1 | 7/2024 | Agrawal et al. | |
| 2024/0355004 A1 | 10/2024 | Zaghetto et al. | |
| 2024/0402969 A1 | 12/2024 | Peebler et al. | |
| 2025/0247577 A1 | 7/2025 | Chua et al. | |

OTHER PUBLICATIONS

Madden Guides, "Madden NFL 23 Tips—Jailbreak Screen—Attacking Cover 0 Press Man", Available online at <https://www.youtube.com/watch?v=LuZ-lub9vkA>, [Retrieved from Internet on Aug. 13, 2024], Sep. 16, 2022, 2 pages.

Throne, "Playing Madden With an Eye-Tracker", Available online at <https://www.youtube.com/watch?v=xum92xmCnUc>, [Retrieved from Internet on Aug. 13, 2024], Jan. 29, 2022, 1 page.

Non-Final Office Action received for U.S. Appl. No. 18/473,244, mailed on Aug. 25, 2025, 23 pages.

Non-Final Office Action received for U.S. Appl. No. 18/673,127, mailed on May 9, 2025, 27 pages.

Final Office Action received for U.S. Appl. No. 18/673,127, mailed on Aug. 27, 2025, 30 pages.

International Search Report received for PCT Patent Application No. PCT/US2024/030869, mailed on Sep. 9, 2024, 5 pages.

International Search Report received for PCT Patent Application No. PCT/US2023/074974, mailed on Mar. 11, 2024, 6 pages.

Reichherzer, et al., "SecondSight: Demonstrating Cross-Device Augmented Reality", SIGGRAPH '21 Immersive Pavilion, Aug. 9-13, 2021, Virtual Event, USA, Retrieved from the internet: <https://dl.acm.org/doi/fullHtml/10.1145/3450615.3464545>, 2 pages.

Somolinos, José, "Augmented Reality disrupts Television", Medium, Feb. 28, 2019 [online], Retrieved from the internet: <https://medium.com/@josesomolinos/augmented-reality-disrupts-television-9d79ed01f27>, [retrieved on Jun. 12, 2025], 13 pages.

Zhu, et al., "BISHARE: Exploring Bidirectional Interactions Between Smartphones and Head-Mounted Augmented Reality", CHI '20, Apr. 25-30, 2020, Honolulu, USA, Retrieved from the internet: <https://dl.acm.org/doi/fullHtml/10.1145/3313831.3376233>, [retrieved on: Jun. 13, 2025], 10 pages.

Notice of Allowance received for U.S. Appl. No. 18/673,127, mailed on Jan. 14, 2026, 11 pages.

Final Office Action received for U.S. Appl. No. 18/473,244, mailed on Jan. 13, 2026, 25 pages.

International Search Report received for PCT Patent Application No. PCT/US2025/031393, mailed on Oct. 17, 2025, 4 pages.

* cited by examiner

Figure 6:
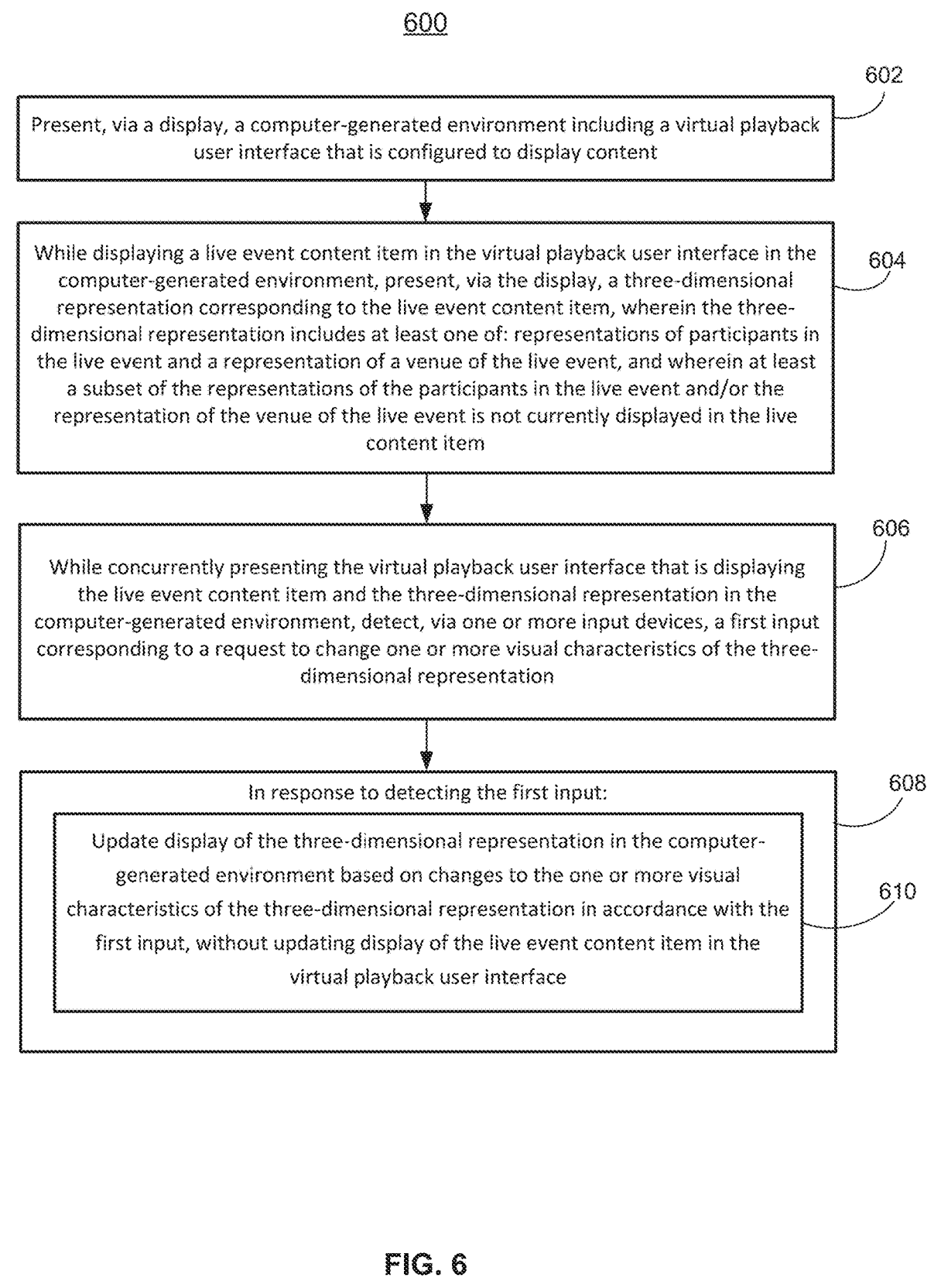

600

602

Present, via a display, a computer-generated environment including a virtual playback user interface that is configured to display content

604

While displaying a live event content item in the virtual playback user interface in the computer-generated environment, present, via the display, a three-dimensional representation corresponding to the live event content item, wherein the three-dimensional representation includes at least one of: representations of participants in the live event and a representation of a venue of the live event, and wherein at least a subset of the representations of the participants in the live event and/or the representation of the venue of the live event is not currently displayed in the live content item

606

While concurrently presenting the virtual playback user interface that is displaying the live event content item and the three-dimensional representation in the computer-generated environment, detect, via one or more input devices, a first input corresponding to a request to change one or more visual characteristics of the three-dimensional representation

608

In response to detecting the first input:

Update display of the three-dimensional representation in the computer-generated environment based on changes to the one or more visual characteristics of the three-dimensional representation in accordance with the first input, without updating display of the live event content item in the virtual playback user interface

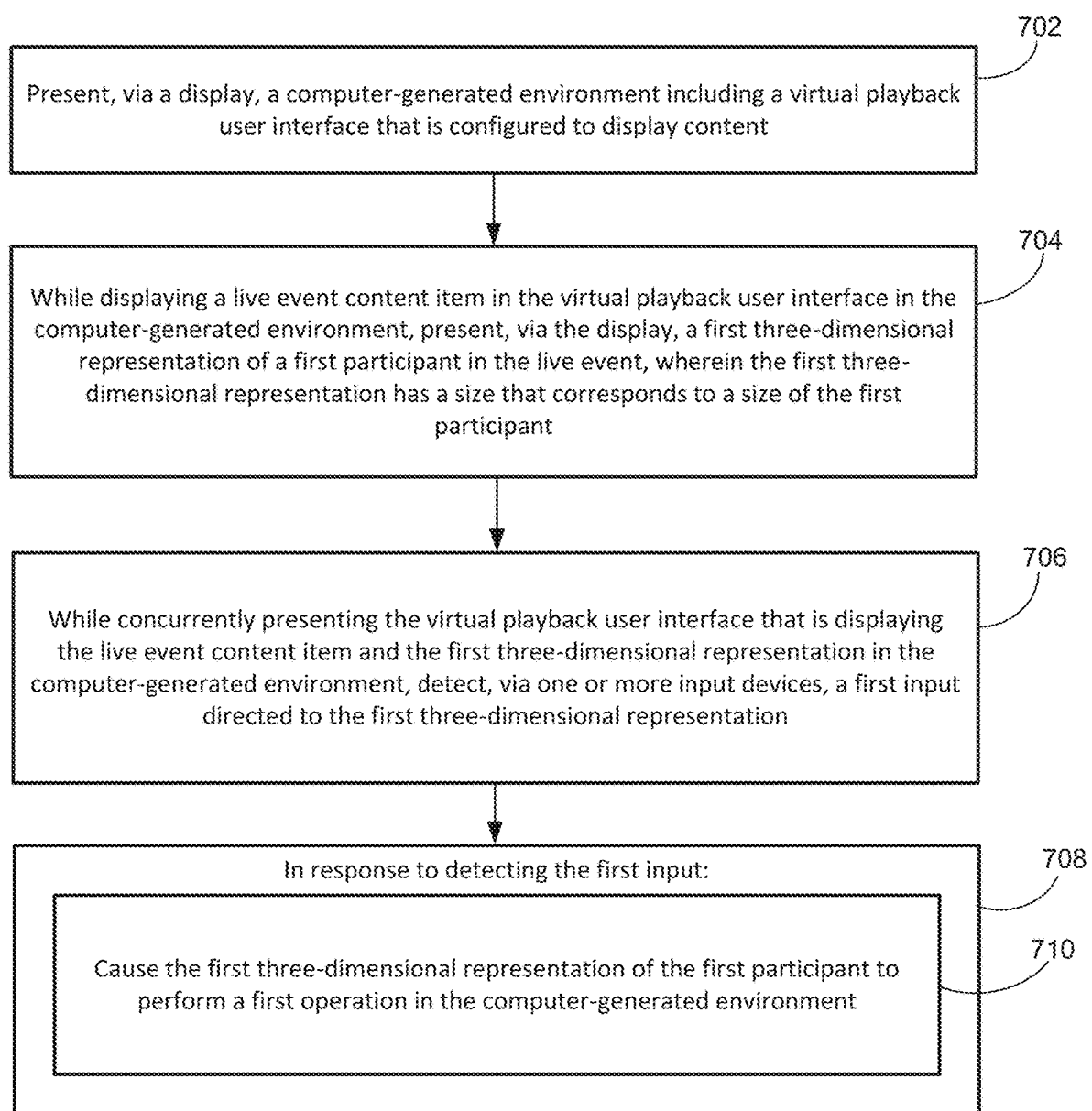

702

Present, via a display, a computer-generated environment including a virtual playback user interface that is configured to display content

704

While displaying a live event content item in the virtual playback user interface in the computer-generated environment, present, via the display, a first three-dimensional representation of a first participant in the live event, wherein the first three-dimensional representation has a size that corresponds to a size of the first participant

706

While concurrently presenting the virtual playback user interface that is displaying the live event content item and the first three-dimensional representation in the computer-generated environment, detect, via one or more input devices, a first input directed to the first three-dimensional representation

708

In response to detecting the first input:

710

Cause the first three-dimensional representation of the first participant to perform a first operation in the computer-generated environment

FIG. 7

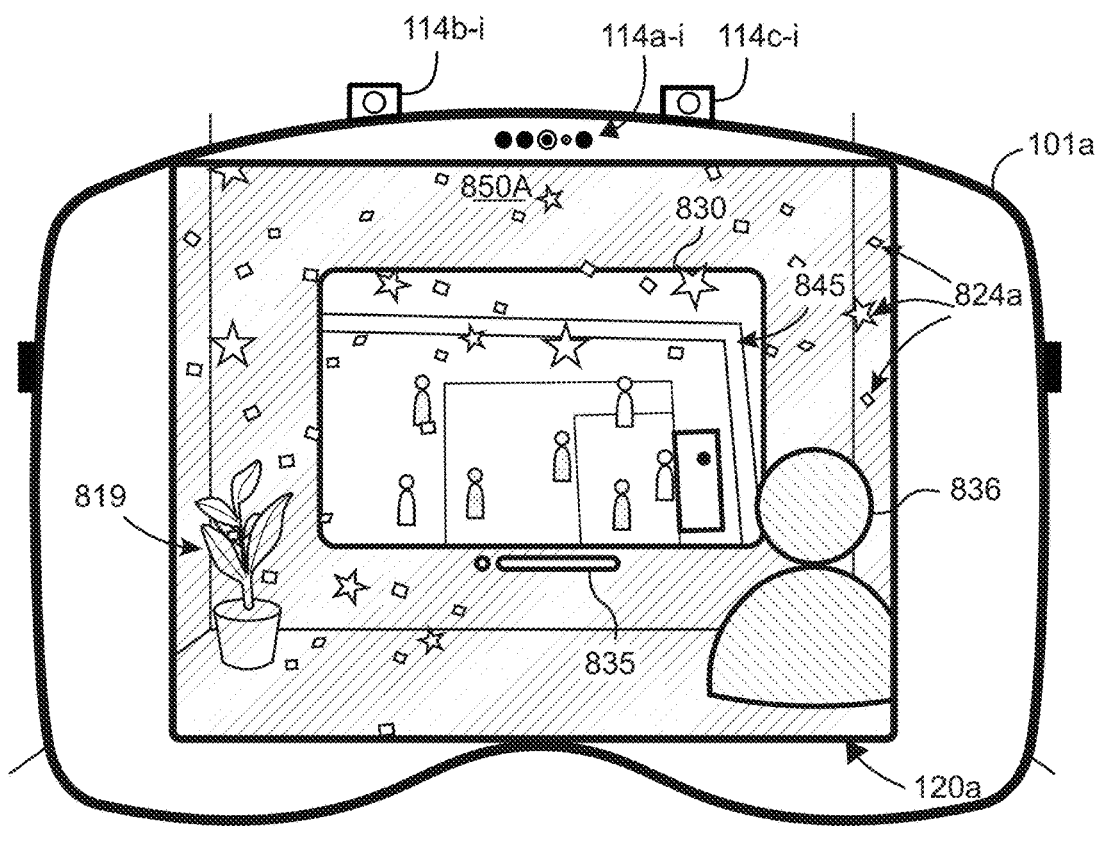
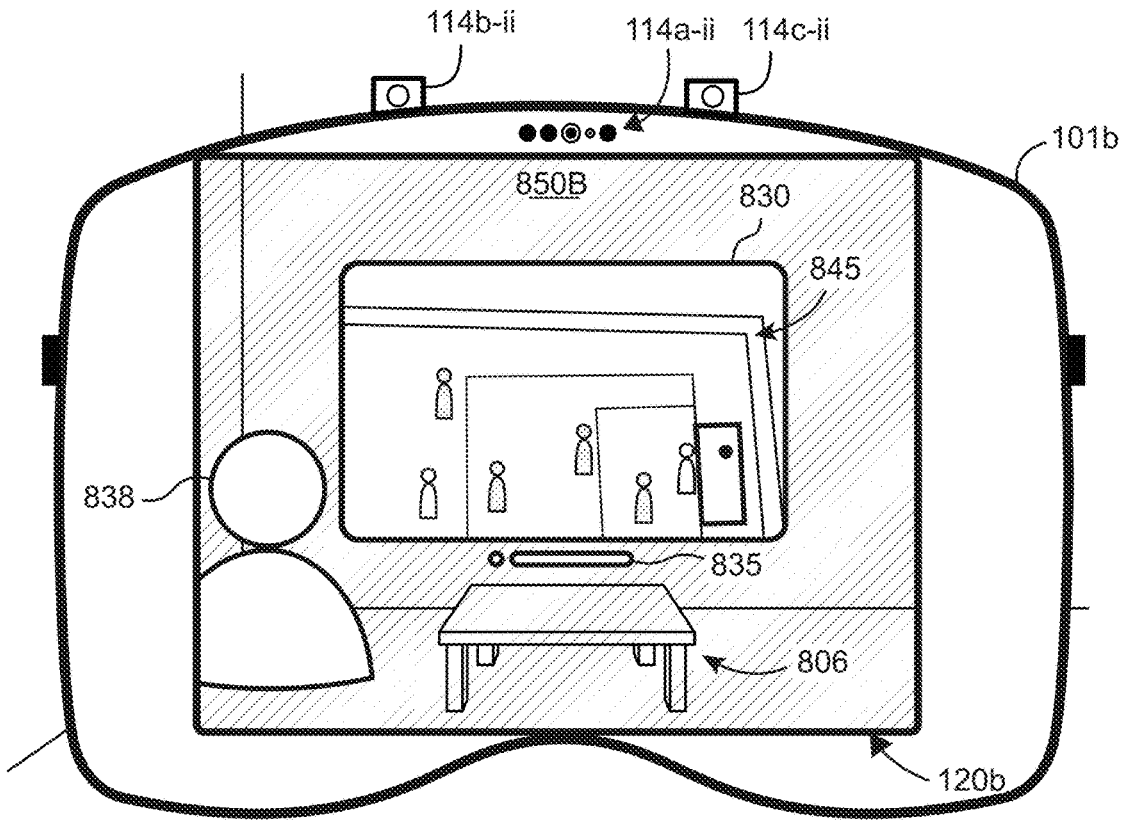
FIG. 8I

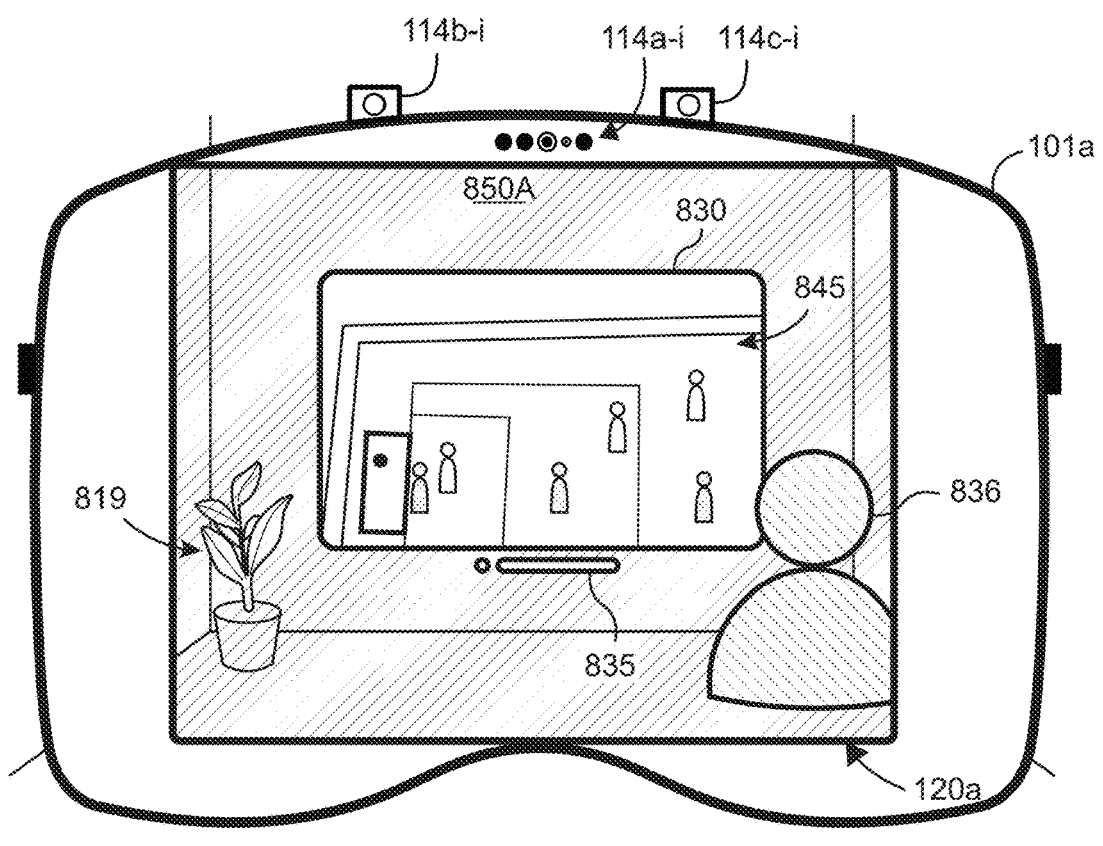
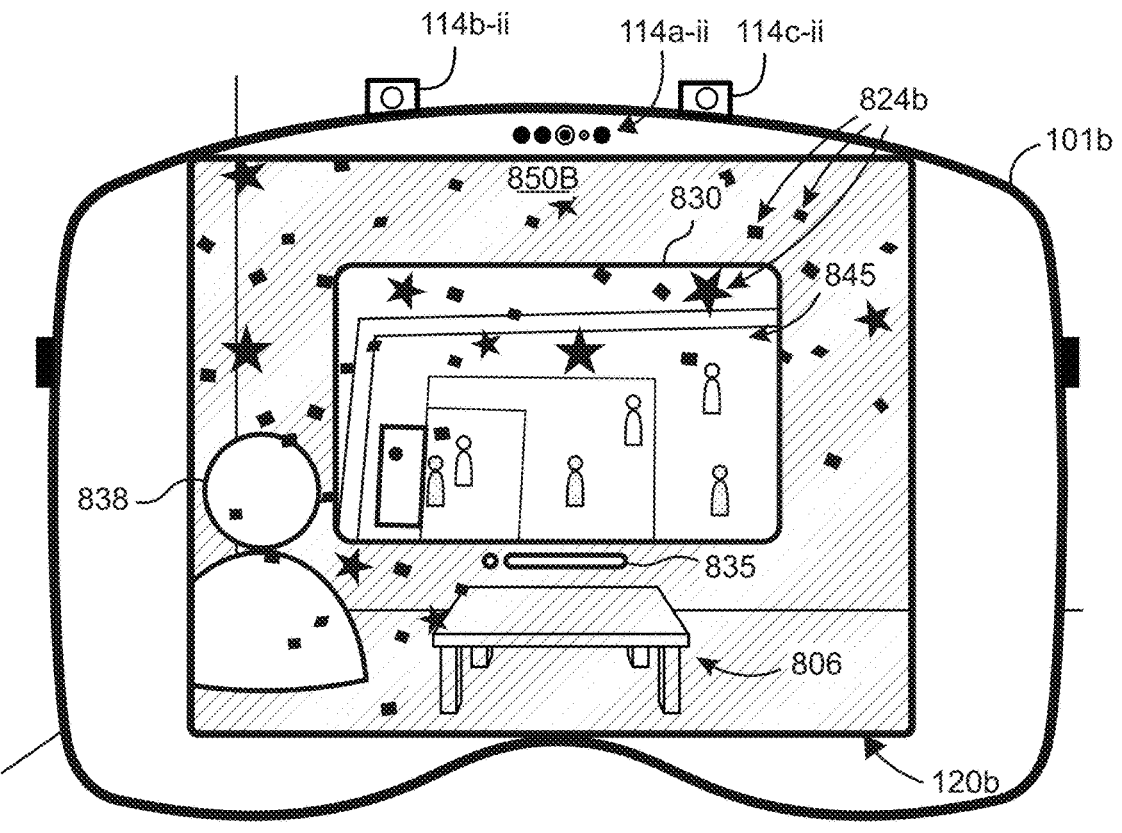
FIG. 8J

1000

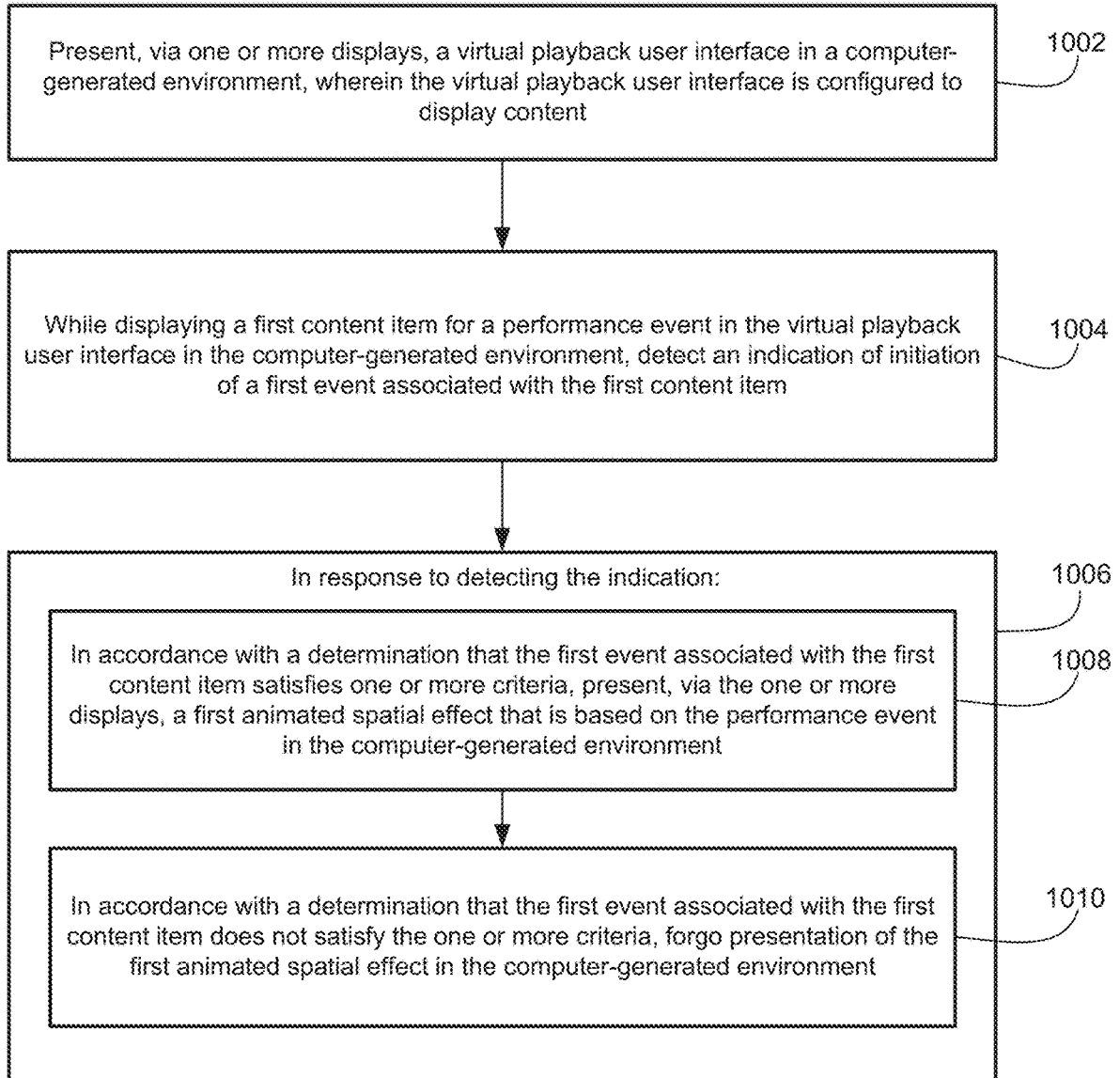

Present, via one or more displays, a virtual playback user interface in a computer-generated environment, wherein the virtual playback user interface is configured to display content — 1002

While displaying a first content item for a performance event in the virtual playback user interface in the computer-generated environment, detect an indication of initiation of a first event associated with the first content item — 1004

In response to detecting the indication: — 1006

In accordance with a determination that the first event associated with the first content item satisfies one or more criteria, present, via the one or more displays, a first animated spatial effect that is based on the performance event in the computer-generated environment — 1008

In accordance with a determination that the first event associated with the first content item does not satisfy the one or more criteria, forgo presentation of the first animated spatial effect in the computer-generated environment — 1010

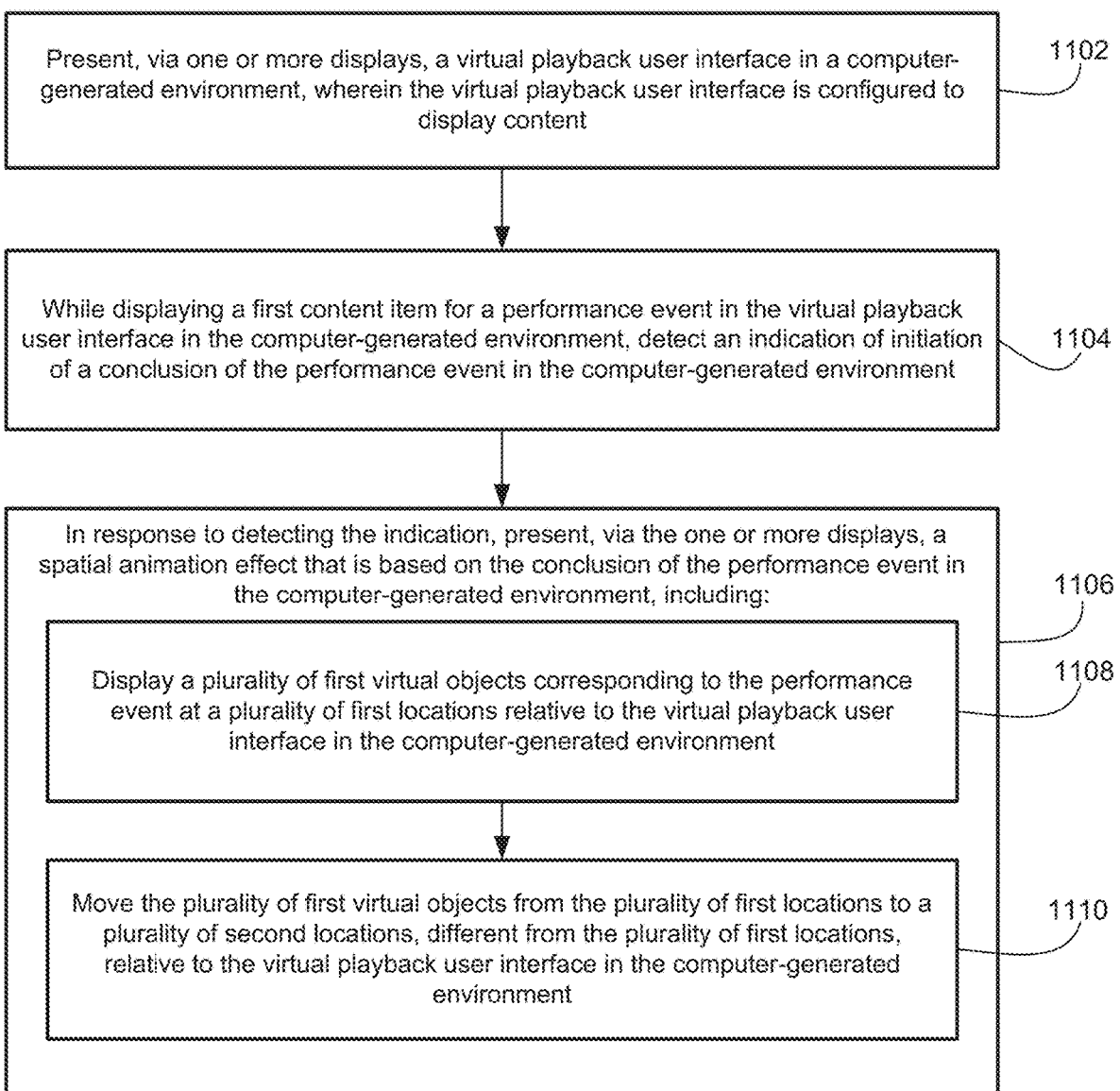

Present, via one or more displays, a virtual playback user interface in a computer-generated environment, wherein the virtual playback user interface is configured to display content                                    1102

While displaying a first content item for a performance event in the virtual playback user interface in the computer-generated environment, detect an indication of initiation of a conclusion of the performance event in the computer-generated environment                                    1104

In response to detecting the indication, present, via the one or more displays, a spatial animation effect that is based on the conclusion of the performance event in the computer-generated environment, including:                                    1106

Display a plurality of first virtual objects corresponding to the performance event at a plurality of first locations relative to the virtual playback user interface in the computer-generated environment                                    1108

Move the plurality of first virtual objects from the plurality of first locations to a plurality of second locations, different from the plurality of first locations, relative to the virtual playback user interface in the computer-generated environment                                    1110

FIG. 11

SYSTEMS AND METHODS OF PRESENTING MIXED MEDIA IN A THREE-DIMENSIONAL ENVIRONMENT

CROSS-REFERENCE TO RELATED APPLICATIONS

This application claims the benefit of U.S. Provisional Application No. 63/625,207, filed Jan. 25, 2024, and U.S. Provisional Application No. 63/505,415, filed May 31, 2023, the contents of which are incorporated herein by reference in their entireties for all purposes.

FIELD OF THE DISCLOSURE

This relates generally to systems and methods of presenting two-dimensional and three-dimensional content in a three-dimensional environment.

BACKGROUND OF THE DISCLOSURE

Some computer graphical environments provide two-dimensional and/or three-dimensional environments (e.g., extended reality environments) where at least some objects displayed for a user's viewing are virtual and generated by a computer. In some examples, the objects (e.g., including virtual user interfaces, such as a virtual playback user interface) that are displayed in the three-dimensional environments are configured to be interactive (e.g., via direct or indirect inputs provided by the user). In some examples, a live event content item is configured to be displayed in a two-dimensional playback user interface in the three-dimensional environment with three-dimensional supplemental content for the live content item. In some examples, it may be desirable to facilitate interactions with the three-dimensional supplemental content that are independent of interactions with the live event content item displayed in the two-dimensional playback user interface in the three-dimensional environment.

SUMMARY OF THE DISCLOSURE

Some examples of the disclosure are directed to systems and methods for displaying supplemental content for two-dimensional live content that is being played back in a three-dimensional environment at an electronic device. In some examples, while a live event content item is displayed in a virtual playback user interface in a three-dimensional environment, the electronic device displays a three-dimensional representation corresponding to the live event content item in the three-dimensional environment. In some examples, the three-dimensional representation includes a representation of a venue of the live event and/or representations of participants in the live event. In some examples, the three-dimensional representation is generated and displayed in the three-dimensional environment based on display data that is encoded in broadcast/streaming data for the live event content item. In some examples, portions of the venue and/or a subset of the participants in the live event that are not currently displayed/visible in the camera view of the broadcast/stream of the live event content item are included in the three-dimensional representation. In some examples, the three-dimensional representation is configurable to be interacted with independently of the display of the live event content item in the three-dimensional environment. For example, in response to detecting input directed to the three-dimensional representation (e.g., a movement input, a scaling input, a rotation input, etc.), the electronic device updates display of (e.g., one or more characteristics of) the three-dimensional representation in the three-dimensional environment (e.g., moves, scales, rotates, etc. the three-dimensional representation) in accordance with the input, without updating display of the live event content item (e.g., without moving, changing a zoom level of, scrubbing, etc. the live event content item).

Some examples of the disclosure are directed to systems and methods for displaying supplemental participant content for two-dimensional live content that is being played back in a three-dimensional environment at an electronic device. In some examples, while a live event content item is displayed in a virtual playback user interface in a three-dimensional environment, the electronic device displays a three-dimensional representation of a participant in the live event in the three-dimensional environment. For example, if the live event is a sports game, the electronic device displays a three-dimensional representation of a player competing in the sports game. In some examples, the three-dimensional representation of the participant is generated and displayed based on one or more physical attributes (e.g., a height, weight, stature, etc.) of the participant in the real world. In some examples, the three-dimensional representation is generated and displayed in the three-dimensional environment based on display data that is encoded in broadcast/streaming data for the live event content item. In some examples, the three-dimensional representation of the participant is configurable to perform an operation in the three-dimensional environment that is based on one or more physical capabilities (e.g., skills) of the participant in the real world. For example, in response to detecting an input directed to the three-dimensional representation, the electronic device causes the three-dimensional representation to perform the operation, including movement, in the three-dimensional environment, without updating display of the live event content item in the three-dimensional environment (e.g., without scrubbing or changing a zoom level of the live event content item).

Some examples of the disclosure are directed to systems and methods for presenting animated spatial effects in a computer-generated environment based on detection of respective events associated with a content item being played back in the computer-generated environment. In some examples, a method is performed at an electronic device in communication with one or more displays and one or more input devices. In some examples, the electronic device presents, via the one or more displays, a virtual playback user interface in a computer-generated environment, wherein the virtual playback user interface is configured to display content. In some examples, while displaying a first content item for a performance event in the virtual playback user interface in the computer-generated environment, the electronic device detects an indication of initiation of a first event associated with the first content item. In some examples, in response to detecting the indication, in accordance with a determination that the first event associated with the first content item satisfies one or more criteria, the electronic device presents, via the one or more displays, a first animated spatial effect that is based on the performance event in the computer-generated environment. In some examples, in accordance with a determination that the first event associated with the first content item does not satisfy the one or more criteria, the electronic device forgoes presentation of the first animated spatial effect in the computer-generated environment.

In some examples, the one or more criteria include a criterion that is satisfied in accordance with a determination that a respective entity (e.g., a sports team) participating in the performance event scores a point (e.g., a goal, run, basket, etc.). In some examples, the criterion is further satisfied in accordance with a determination that the respective entity corresponds to a user-preferred entity (e.g., user-favorited sports team) defined according to one or more user preferences. In some examples, the one or more criteria include a criterion that is satisfied in accordance with a determination that the first event corresponds to a respective action performed by a respective participant (e.g., a particular player, such as a user-favorited player) participating in the performance event. In some examples, the one or more criteria include a criterion that is satisfied in accordance with a determination that a respective venue at which the performance event is taking place is a first venue (e.g., a home field or stadium of the scoring team). In some examples, the one or more criteria include a criterion that is satisfied in accordance with a determination that the performance event corresponds to a user-preferred performance event defined according to one or more user preferences (e.g., a user-favorited sporting event).

Some examples of the disclosure are directed to systems and methods for presenting animated spatial effects in a computer-generated environment based on detection of a conclusion of a content item being played back in the computer-generated environment. In some examples, a method is performed at an electronic device in communication with one or more displays and one or more input devices. In some examples, the electronic device presents, via the one or more displays, a virtual playback user interface in a computer-generated environment, wherein the virtual playback user interface is configured to display content. In some examples, while displaying a first content item for a performance event in the virtual playback user interface in the computer-generated environment, the electronic device detects an indication of a conclusion of the performance event of the first content item. In some examples, in response to detecting the indication, the electronic device presents, via the one or more displays, a spatial animation effect that is based on the conclusion of the performance event in the computer-generated environment. In some examples, the electronic device displays a plurality of first virtual objects corresponding to the performance event at a plurality of first locations relative to the virtual playback user interface in the computer-generated environment. In some examples, the electronic device moves the plurality of first virtual objects from the plurality of first locations to a plurality of second locations, different from the plurality of first locations, relative to the virtual playback user interface in the computer-generated environment.

The full descriptions of these examples are provided in the Drawings and the Detailed Description, and it is understood that this Summary does not limit the scope of the disclosure in any way.

BRIEF DESCRIPTION OF THE DRAWINGS

For improved understanding of the various examples described herein, reference should be made to the Detailed Description below along with the following drawings. Like reference numerals often refer to corresponding parts throughout the drawings.

FIG. 6 is a flow diagram illustrating an example process for facilitating interaction with supplemental content that is associated with live event content in a computer-generated environment according to some examples of the disclosure.

FIG. 7 is a flow diagram illustrating an example process for facilitating interaction with supplemental content that is associated with live event content in a computer-generated environment according to some examples of the disclosure.

FIGS. 8A-8J illustrate examples of presenting spatial animation effects in accordance with detecting respective events associated with live event content according to some examples of the disclosure.

FIG. 10 is a flow diagram illustrating an example process for presenting spatial animation effects in a computer-generated environment in accordance with detecting respective events associated with a live event content item according to some examples of the disclosure.

FIG. 11 is a flow diagram illustrating an example process for presenting spatial animation effects in a computer-generated environment in accordance with detecting a conclusion of a live event content item according to some examples of the disclosure.

DETAILED DESCRIPTION

Figure 1:
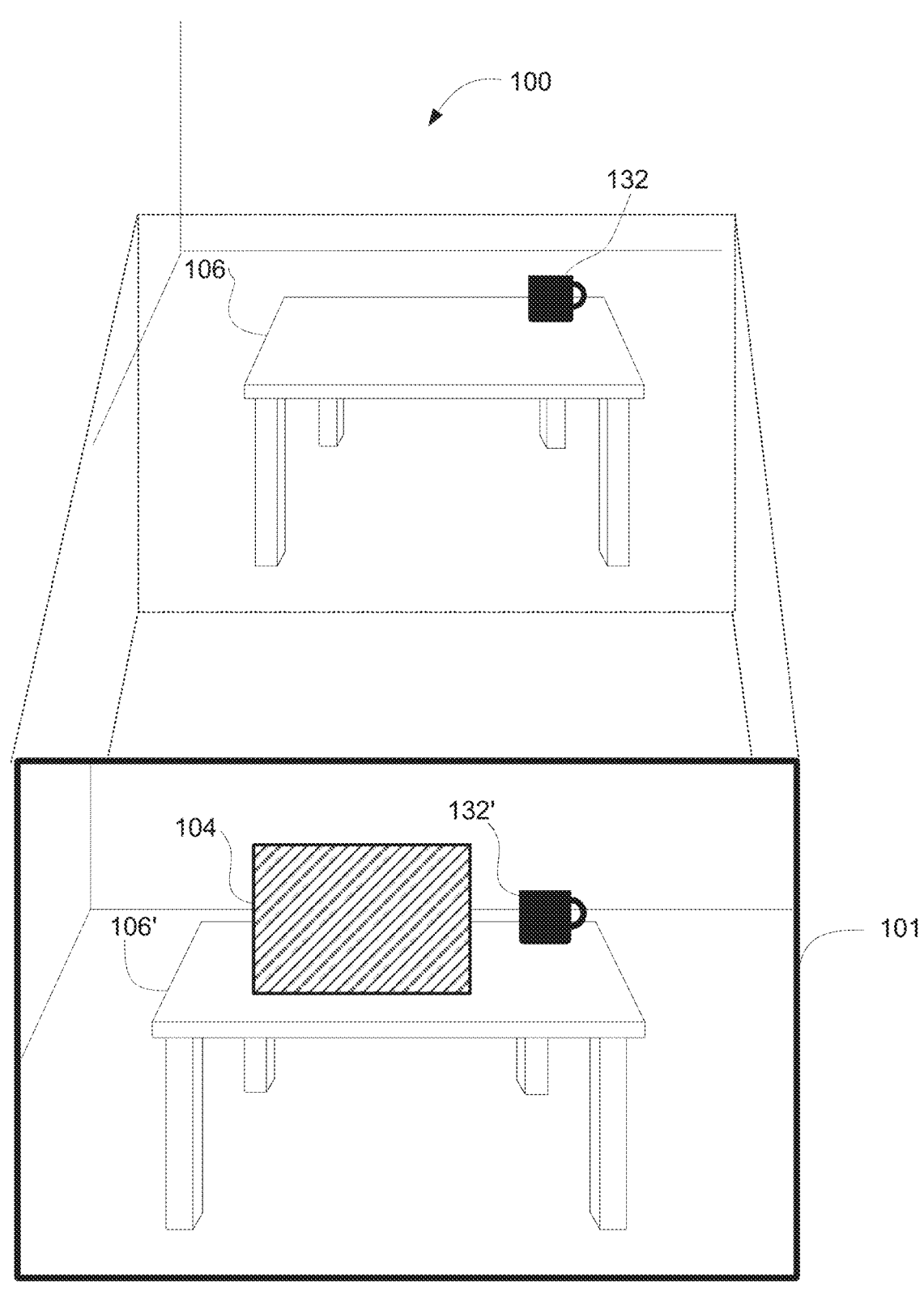
FIG. 1 illustrates an electronic device presenting an extended reality environment according to some examples of the disclosure.

Some examples of the disclosure are directed to systems and methods for displaying supplemental content for two-dimensional live content that is being played back in a three-dimensional environment at an electronic device. In some examples, while a live event content item is displayed in a virtual playback user interface in a three-dimensional environment, the electronic device displays a three-dimensional representation corresponding to the live event content item in the three-dimensional environment. In some examples, the three-dimensional representation includes a representation of a venue of the live event and/or representations of participants in the live event. In some examples, the three-dimensional representation is generated and displayed in the three-dimensional environment based on display data that is encoded in broadcast/streaming data for the live event content item. In some examples, portions of the venue and/or a subset of the participants in the live event that are not currently displayed/visible in the camera view of the broadcast/stream of the live event content item are included in the three-dimensional representation. In some examples, the three-dimensional representation is configurable to be interacted with independently of the display of the live event content item in the three-dimensional environment. For example, in response to detecting input directed to the three-dimensional representation (e.g., a movement input, a scaling input, a rotation input, etc.), the electronic device updates display of (e.g., one or more characteristics of) the three-dimensional representation in the three-dimensional environment (e.g., moves, scales, rotates, etc. the three-dimensional representation) in accordance with the input, without updating display of the live event content item (e.g., without moving, changing a zoom level of, scrubbing, etc. the live event content item).

Some examples of the disclosure are directed to systems and methods for displaying supplemental participant content for two-dimensional live content that is being played back in a three-dimensional environment at an electronic device. In some examples, while a live event content item is displayed in a virtual playback user interface in a three-dimensional environment, the electronic device displays a three-dimensional representation of a participant in the live event in the three-dimensional environment. For example, if the live event is a sports game, the electronic device displays a three-dimensional representation of a player competing in the sports game. In some examples, the three-dimensional representation of the participant is generated and displayed based on one or more physical attributes (e.g., a height, weight, stature, etc.) of the participant in the real world. In some examples, the three-dimensional representation is generated and displayed in the three-dimensional environment based on display data that is encoded in broadcast/streaming data for the live event content item. In some examples, the three-dimensional representation of the participant is configurable to perform an operation in the three-dimensional environment that is based on one or more physical capabilities (e.g., skills) of the participant in the real world. For example, in response to detecting an input directed to the three-dimensional representation, the electronic device causes the three-dimensional representation to perform the operation, including movement, in the three-dimensional environment, without updating display of the live event content item in the three-dimensional environment (e.g., without scrubbing or changing a zoom level of the live event content item).

Some examples of the disclosure are directed to systems and methods for presenting animated spatial effects in a computer-generated environment based on detection of respective events associated with a content item being played back in the computer-generated environment. In some examples, a method is performed at an electronic device in communication with one or more displays and one or more input devices. In some examples, the electronic device presents, via the one or more displays, a virtual playback user interface in a computer-generated environment, wherein the virtual playback user interface is configured to display content. In some examples, while displaying a first content item for a performance event in the virtual playback user interface in the computer-generated environment, the electronic device detects an indication of initiation of a first event associated with the first content item. In some examples, in response to detecting the indication, in accordance with a determination that the first event associated with the first content item satisfies one or more criteria, the electronic device presents, via the one or more displays, a first animated spatial effect that is based on the performance event in the computer-generated environment. In some examples, in accordance with a determination that the first event associated with the first content item does not satisfy the one or more criteria, the electronic device forgoes presentation of the first animated spatial effect in the computer-generated environment.

In some examples, the one or more criteria include a criterion that is satisfied in accordance with a determination that a respective entity (e.g., a sports team) participating in the performance event scores a point (e.g., a goal, run, basket, etc.). In some examples, the criterion is further satisfied in accordance with a determination that the respective entity corresponds to a user-preferred entity (e.g., user-favorited sports team) defined according to one or more user preferences. In some examples, the one or more criteria include a criterion that is satisfied in accordance with a determination that the first event corresponds to a respective action performed by a respective participant (e.g., a particular player, such as a user-favorited player) participating in the performance event. In some examples, the one or more criteria include a criterion that is satisfied in accordance with a determination that a respective venue at which the performance event is taking place is a first venue (e.g., a home field or stadium of the scoring team). In some examples, the one or more criteria include a criterion that is satisfied in accordance with a determination that the performance event corresponds to a user-preferred performance event defined according to one or more user preferences (e.g., a user-favorited sporting event).

Some examples of the disclosure are directed to systems and methods for presenting animated spatial effects in a computer-generated environment based on detection of a conclusion of a content item being played back in the computer-generated environment. In some examples, a method is performed at an electronic device in communication with one or more displays and one or more input devices. In some examples, the electronic device presents, via the one or more displays, a virtual playback user interface in a computer-generated environment, wherein the virtual playback user interface is configured to display content. In some examples, while displaying a first content item for a performance event in the virtual playback user interface in the computer-generated environment, the electronic device detects an indication of a conclusion of the performance event of the first content item. In some examples, in response to detecting the indication, the electronic device presents, via the one or more displays, a spatial animation effect that is based on the conclusion of the performance event in the computer-generated environment. In some examples, the electronic device displays a plurality of first virtual objects corresponding to the performance event at a plurality of first locations relative to the virtual playback user interface in the computer-generated environment. In some examples, the electronic device moves the plurality of first virtual objects from the plurality of first locations to a plurality of second locations, different from the plurality of first locations, relative to the virtual playback user interface in the computer-generated environment.

In some examples, displaying supplemental three-dimensional content for a live content item being played back in a playback a user interface in a three-dimensional environment (e.g., an extended reality environment) may include interaction with one or more user interface elements in the three-dimensional environment. For example, initiation of display of the supplemental three-dimensional content for the live content item in the three-dimensional environment can include interaction with one or more virtual options/affordances displayed in the three-dimensional environment.

In some examples, a user's gaze may be tracked by the electronic device as an input for identifying one or more virtual options/affordances targeted for selection when initiating display of the supplemental three-dimensional content in the three-dimensional environment. For example, gaze can be used to identify one or more virtual options/affordances targeted for selection using another selection input. In some examples, a virtual option/affordance may be selected using hand-tracking input detected via an input device in communication with the electronic device. In some examples, user interfaces displayed in the three-dimensional environment may be moved and/or reoriented in the three-dimensional environment in accordance with movement input detected via the input device.

In some examples, a three-dimensional object is displayed in a computer-generated three-dimensional environment with a particular orientation that controls one or more behaviors of the three-dimensional object (e.g., when the three-dimensional object is moved within the three-dimensional environment). In some examples, the orientation in which the three-dimensional object is displayed in the three-dimensional environment is selected by a user of the electronic device or automatically selected by the electronic device. For example, when initiating presentation of the three-dimensional object in the three-dimensional environment, the user may select a particular orientation for the three-dimensional object or the electronic device may automatically select the orientation for the three-dimensional object (e.g., based on a type of the three-dimensional object).

In some examples, a three-dimensional object can be displayed in the three-dimensional environment in a world-locked orientation, a body-locked orientation, a tilt-locked orientation, or a head-locked orientation, as described below. As used herein, an object that is displayed in a body-locked orientation in a three-dimensional environment has a distance and orientation offset relative to a portion of the user's body (e.g., the user's torso). Alternatively, in some examples, a body-locked object has a fixed distance from the user without the orientation of the content being referenced to any portion of the user's body (e.g., may be displayed in the same cardinal direction relative to the user, regardless of head and/or body movement). Additionally or alternatively, in some examples, the body-locked object may be configured to always remain gravity or horizon (e.g., normal to gravity) aligned, such that head and/or body changes in the roll direction would not cause the body-locked object to move within the three-dimensional environment. Rather, translational movement in either configuration would cause the body-locked object to be repositioned within the three-dimensional environment to maintain the distance offset.

As used herein, an object that is displayed in a head-locked orientation in a three-dimensional environment has a distance and orientation offset relative to the user's head. In some examples, a head-locked object moves within the three-dimensional environment as the user's head moves (as the viewpoint of the user changes).

As used herein, an object that is displayed in a world-locked orientation in a three-dimensional environment does not have a distance or orientation offset relative to the user.

As used herein, an object that is displayed in a tilt-locked orientation in a three-dimensional environment (referred to herein as a tilt-locked object) has a distance offset relative to the user, such as a portion of the user's body (e.g., the user's torso) or the user's head. In some examples, a tilt-locked object is displayed at a fixed orientation relative to the three-dimensional environment. In some examples, a tilt-locked object moves according to a polar (e.g., spherical) coordinate system centered at a pole through the user (e.g., the user's head). For example, the tilt-locked object is moved in the three-dimensional environment based on movement of the user's head within a spherical space surrounding (e.g., centered at) the user's head. Accordingly, if the user tilts their head (e.g., upward or downward in the pitch direction) relative to gravity, the tilt-locked object would follow the head tilt and move radially along a sphere, such that the tilt-locked object is repositioned within the three-dimensional environment to be the same distance offset relative to the user as before the head tilt while optionally maintaining the same orientation relative to the three-dimensional environment. In some examples, if the user moves their head in the roll direction (e.g., clockwise or counterclockwise) relative to gravity, the tilt-locked object is not repositioned within the three-dimensional environment.

FIG. 1 illustrates an electronic device 101 presenting an extended reality (XR) environment (e.g., a computer-generated environment) according to some examples of the disclosure. In some examples, electronic device 101 is a hand-held or mobile device, such as a tablet computer, laptop computer, smartphone, or head-mounted display. Examples of electronic device 101 are described below with reference to the architecture block diagram of FIG. 2. As shown in FIG. 1, electronic device 101, table 106, and coffee mug 132 are located in the physical environment 100. The physical environment may include physical features such as a physical surface (e.g., floor, walls) or a physical object (e.g., table, lamp, etc.). In some examples, electronic device 101 may be configured to capture images of physical environment 100 including table 106 and coffee mug 132 (illustrated in the field of view of electronic device 101). In some examples, in response to a trigger, the electronic device 101 may be configured to display a virtual object 104 (e.g., two-dimensional virtual content, such as a two-dimensional user interface) in the computer-generated environment (e.g., represented by a rectangle illustrated in FIG. 1) that is not present in the physical environment 100, but is displayed in the computer-generated environment positioned on (e.g., anchored to) the top of a computer-generated representation 106' of real-world table 106. For example, virtual object 104 can be displayed on the surface of the computer-generated representation 106' of the table in the computer-generated environment next to the computer-generated representation 132' of real-world coffee mug 132 displayed via electronic device 101 in response to detecting the planar surface of table 106 in the physical environment 100.

It should be understood that virtual object 104 is a representative virtual object and one or more different virtual objects (e.g., of various dimensionality such as two-dimensional or other three-dimensional virtual objects) can be included and rendered in a three-dimensional computer-generated environment. For example, the virtual object can represent an application or a user interface displayed in the computer-generated environment. In some examples, the virtual object can represent content corresponding to the application and/or displayed via the user interface in the computer-generated environment. In some examples, the virtual object 104 is optionally configured to be interactive and responsive to user input, such that a user may virtually touch, tap, move, rotate, or otherwise interact with, the virtual object 104. In some examples, while the virtual object 104 is displayed in the three-dimensional environment, the electronic device selectively moves the virtual object 104 in response to movement of a viewpoint of the user. Additionally, it should be understood, that the 3D environment (or 3D virtual object) described herein may be a representation of a 3D environment (or three-dimensional virtual object) projected or presented at an electronic device.

In the discussion that follows, an electronic device that is in communication with a display generation component and one or more input devices is described. It should be understood that the electronic device optionally is in communication with one or more other physical user-interface devices, such as a touch-sensitive surface, a physical keyboard, a mouse, a joystick, a hand tracking device, an eye tracking device, a stylus, etc. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device, or touch input received on the surface of a stylus) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/ or a digital video player application.

Figure 2:
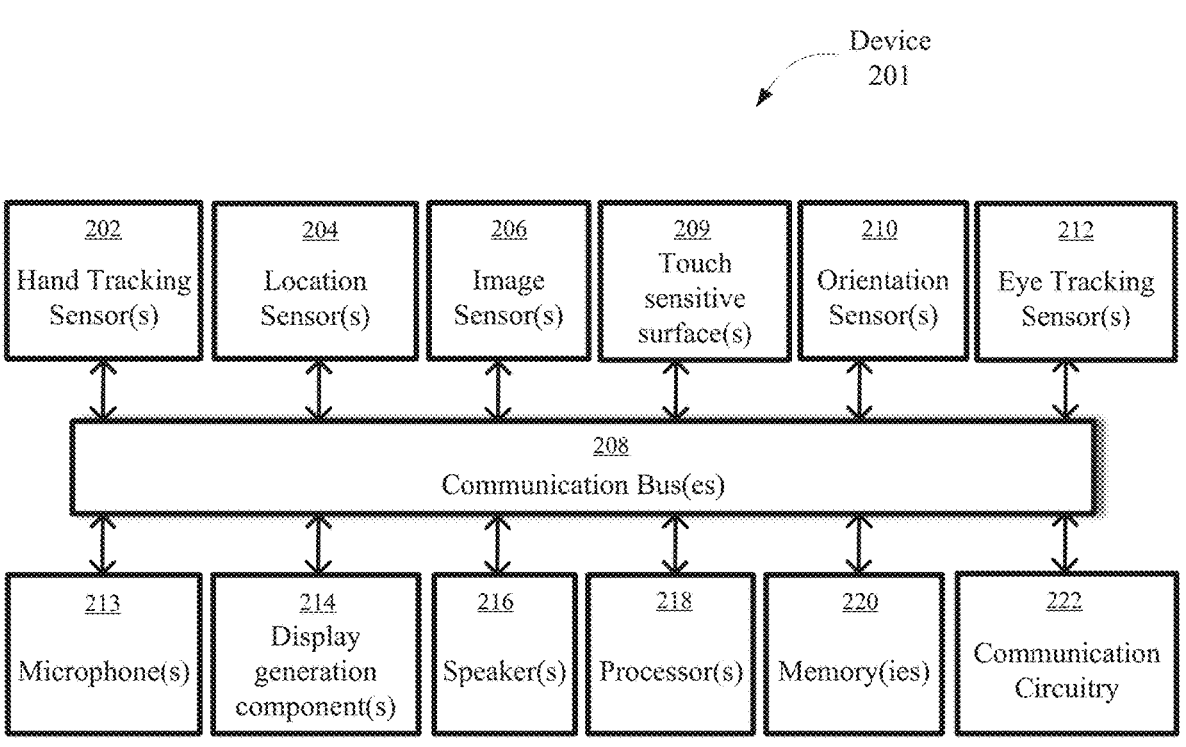
FIG. 2 illustrates a block diagram of an exemplary architecture for a device according to some examples of the disclosure.

FIG. 2 illustrates a block diagram of an exemplary architecture for an electronic device 201 according to some examples of the disclosure. In some examples, electronic device 201 includes one or more electronic devices. For example, the electronic device 201 may be a portable device, such as a mobile phone, smart phone, a tablet computer, a laptop computer, an auxiliary device in communication with another device, a head-mounted display, etc., respectively.

As illustrated in FIG. 2, the electronic device 201 optionally includes various sensors (e.g., one or more hand tracking sensor(s) 202, one or more location sensor(s) 204, one or more image sensor(s) 206, one or more touch-sensitive surface(s) 209, one or more motion and/or orientation sensor(s) 210, one or more eye tracking sensor(s) 212, one or more microphone(s) 213 or other audio sensors, etc.), one or more display generation component(s) (e.g., displays) 214, one or more speaker(s) 216, one or more processor(s) 218, one or more memories 220, and/or communication circuitry 222. One or more communication buses 208 are optionally used for communication between the above-mentioned components of electronic devices 201.

Communication circuitry 222 optionally includes circuitry for communicating with electronic devices, networks, such as the Internet, intranets, a wired network and/or a wireless network, cellular networks, and wireless local area networks (LANs). Communication circuitry 222 optionally includes circuitry for communicating using near-field communication (NFC) and/or short-range communication, such as Bluetooth®.

Processor(s) 218 include one or more general processors, one or more graphics processors, and/or one or more digital signal processors. In some examples, memory 220 is a non-transitory computer-readable storage medium (e.g., flash memory, random access memory, or other volatile or non-volatile memory or storage) that stores computer-readable instructions configured to be executed by processor(s) 218 to perform the techniques, processes, and/or methods described below. In some examples, memory 220 can include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

In some examples, display generation component(s) 214 include a single display (e.g., a liquid-crystal display (LCD), organic light-emitting diode (OLED), or other types of display). In some examples, display generation component(s) 214 includes multiple displays, such as a stereo pair of displays. In some examples, display generation component(s) 214 can include a display with touch capability (e.g., a touch screen), a projector, a holographic projector, a retinal projector, etc. In some examples, electronic device 201 includes touch-sensitive surface(s) 209, respectively, for receiving user inputs, such as tap inputs and swipe inputs or other gestures. In some examples, display generation component(s) 214 and touch-sensitive surface(s) 209 form touch-sensitive display(s) (e.g., a touch screen integrated with electronic device 201 or external to electronic device 201 that is in communication with electronic device 201).

Electronic device 201 optionally includes image sensor(s) 206. Image sensors(s) 206 optionally include one or more visible light image sensors, such as charged coupled device (CCD) sensors, and/or complementary metal-oxide-semiconductor (CMOS) sensors operable to obtain images of physical objects from the real-world environment. Image sensor(s) 206 also optionally include one or more infrared (IR) sensors, such as a passive or an active IR sensor, for detecting infrared light from the real-world environment. For example, an active IR sensor includes an IR emitter for emitting infrared light into the real-world environment. Image sensor(s) 206 also optionally include one or more cameras configured to capture movement of physical objects in the real-world environment. Image sensor(s) 206 also optionally include one or more depth sensors configured to detect the distance of physical objects from electronic device 201. In some examples, information from one or more depth sensors can allow the device to identify and differentiate objects in the real-world environment from other objects in the real-world environment. In some examples, one or more depth sensors can allow the device to determine the texture and/or topography of objects in the real-world environment.

In some examples, electronic device 201 uses CCD sensors, event cameras, and depth sensors in combination to detect the physical environment around electronic device 201. In some examples, image sensor(s) 206 include a first image sensor and a second image sensor. The first image sensor and the second image sensor work in tandem and are optionally configured to capture different information of physical objects in the real-world environment. In some examples, the first image sensor is a visible light image sensor and the second image sensor is a depth sensor. In some examples, electronic device 201 uses image sensor(s) 206 to detect the position and orientation of electronic device 201 and/or display generation component(s) 214 in the real-world environment. For example, electronic device 201 uses image sensor(s) 206 to track the position and orientation of display generation component(s) 214 relative to one or more fixed objects in the real-world environment.

In some examples, electronic device 201 includes microphone(s) 213 or other audio sensors. Electronic device 201 optionally uses microphone(s) 213 to detect sound from the user and/or the real-world environment of the user. In some examples, microphone(s) 213 includes an array of microphones (a plurality of microphones) that optionally operate in tandem, such as to identify ambient noise or to locate the source of sound in space of the real-world environment.

Electronic device 201 includes location sensor(s) 204 for detecting a location of electronic device 201 and/or display generation component(s) 214. For example, location sensor(s) 204 can include a global positioning system (GPS) receiver that receives data from one or more satellites and allows electronic device 201 to determine the device's absolute position in the physical world.

Electronic device 201 includes orientation sensor(s) 210 for detecting orientation and/or movement of electronic device 201 and/or display generation component(s) 214. For example, electronic device 201 uses orientation sensor(s) 210 to track changes in the position and/or orientation of electronic device 201 and/or display generation component(s) 214, such as with respect to physical objects in the real-world environment. Orientation sensor(s) 210 optionally include one or more gyroscopes and/or one or more accelerometers.

Electronic device 201 includes hand tracking sensor(s) 202 and/or eye tracking sensor(s) 212 (and/or other body tracking sensor(s), such as leg, torso and/or head tracking sensor(s), in some examples. Hand tracking sensor(s) 202 are configured to track the position/location of one or more portions of the user's hands, and/or motions of one or more portions of the user's hands with respect to the extended reality environment, relative to the display generation component(s) 214, and/or relative to another defined coordinate system. Eye tracking sensor(s) 212 are configured to track the position and movement of a user's gaze (eyes, face, or head, more generally) with respect to the real-world or extended reality environment and/or relative to the display generation component(s) 214. In some examples, hand tracking sensor(s) 202 and/or eye tracking sensor(s) 212 are implemented together with the display generation component(s) 214. In some examples, the hand tracking sensor(s) 202 and/or eye tracking sensor(s) 212 are implemented separate from the display generation component(s) 214.

In some examples, the hand tracking sensor(s) 202 (and/or other body tracking sensor(s), such as leg, torso and/or head tracking sensor(s)) can use image sensor(s) 206 (e.g., one or more IR cameras, 3D cameras, depth cameras, etc.) that capture three-dimensional information from the real-world including one or more body parts (e.g., hands, legs, or torso of a human user). In some examples, the hands can be resolved with sufficient resolution to distinguish fingers and their respective positions. In some examples, one or more image sensor(s) 206 are positioned relative to the user to define a field of view of the image sensor(s) 206 and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures, touch, tap, etc.) can be advantageous in that it does not require the user to touch, hold or wear any sort of beacon, sensor, or other marker.

In some examples, eye tracking sensor(s) 212 includes at least one eye tracking camera (e.g., infrared (IR) cameras) and/or illumination sources (e.g., IR light sources, such as LEDs) that emit light towards a user's eyes. The eye tracking cameras may be pointed towards a user's eyes to receive reflected IR light from the light sources directly or indirectly from the eyes. In some examples, both eyes are tracked separately by respective eye tracking cameras and illumination sources, and a focus/gaze can be determined from tracking both eyes. In some examples, one eye (e.g., a dominant eye) is tracked by a respective eye tracking camera/illumination source(s).

Electronic device 201 is not limited to the components and configuration of FIG. 2, but can include fewer, other, or additional components in multiple configurations. In some examples, electronic device 201 can be implemented between two electronic devices (e.g., as a system). A person or persons using electronic device 201, is optionally referred to herein as a user or users of the device.

Attention is now directed towards interactions with one or more virtual objects (e.g., one or more user interfaces) that are displayed in a three-dimensional environment (e.g., an extended reality environment) presented at an electronic device (e.g., corresponding to electronic device 201). As discussed below, the one or more virtual objects may be associated with a video playback (or other type of) application operating on the electronic device. In some examples, the one or more virtual objects includes a virtual playback user interface that is configured to display two-dimensional content (e.g., two-dimensional video) in the three-dimensional environment. In some examples, the electronic device displays supplemental three-dimensional content that is associated with the two-dimensional content being played back in the three-dimensional environment. As described below, interactions directed to the supplemental three-dimensional content associated with the two-dimensional content are independent of interactions directed to the two-dimensional content. In some examples, interactions directed to the two-dimensional content cause a corresponding operation to be performed on the supplemental three-dimensional content.

Figure 3A:
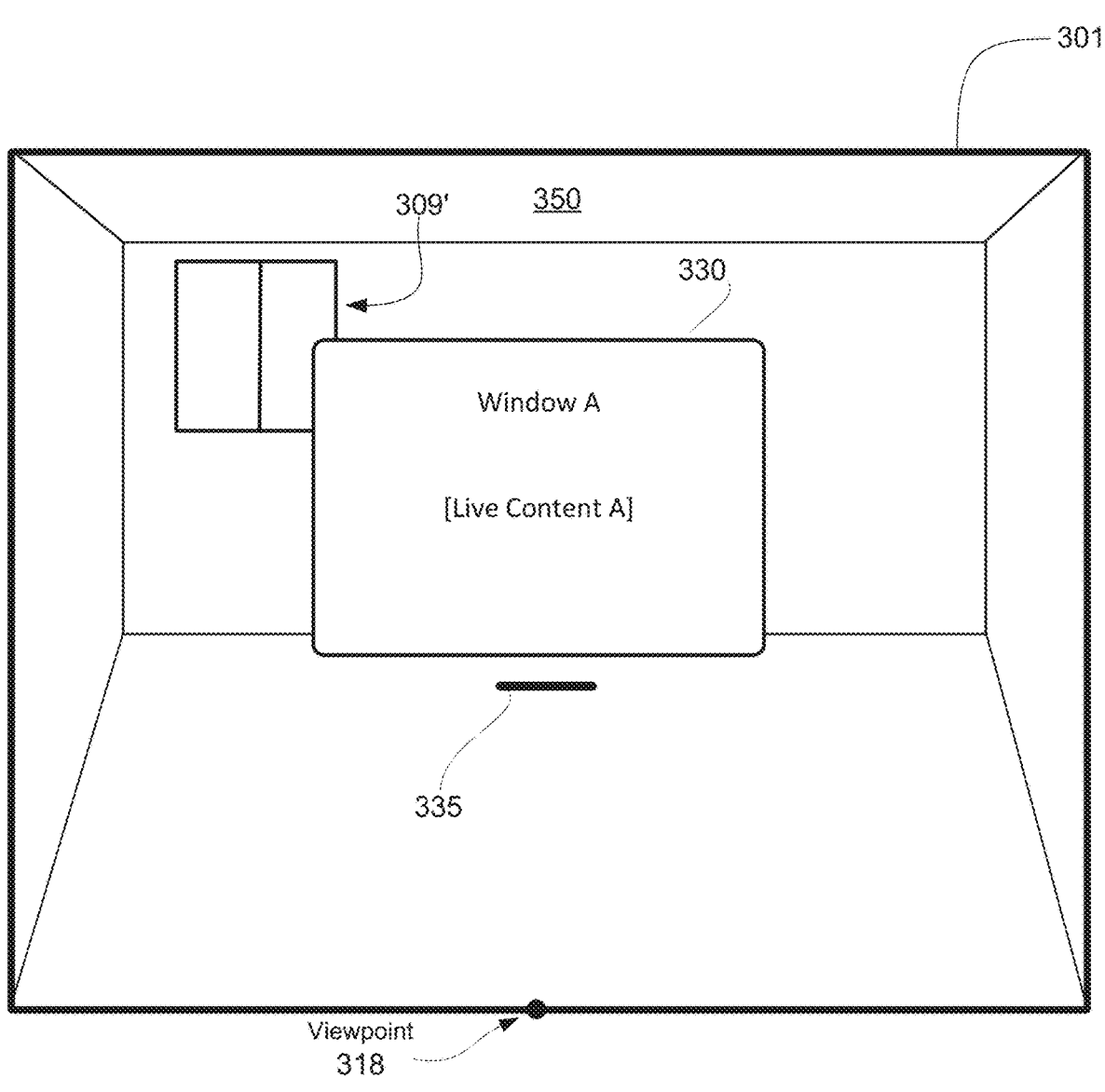
FIGS. 3A-3S illustrate example interactions involving concurrent display of live event content and supplemental content that is associated with the live event content in a computer-generated environment according to some examples of the disclosure.
Figure 3B:
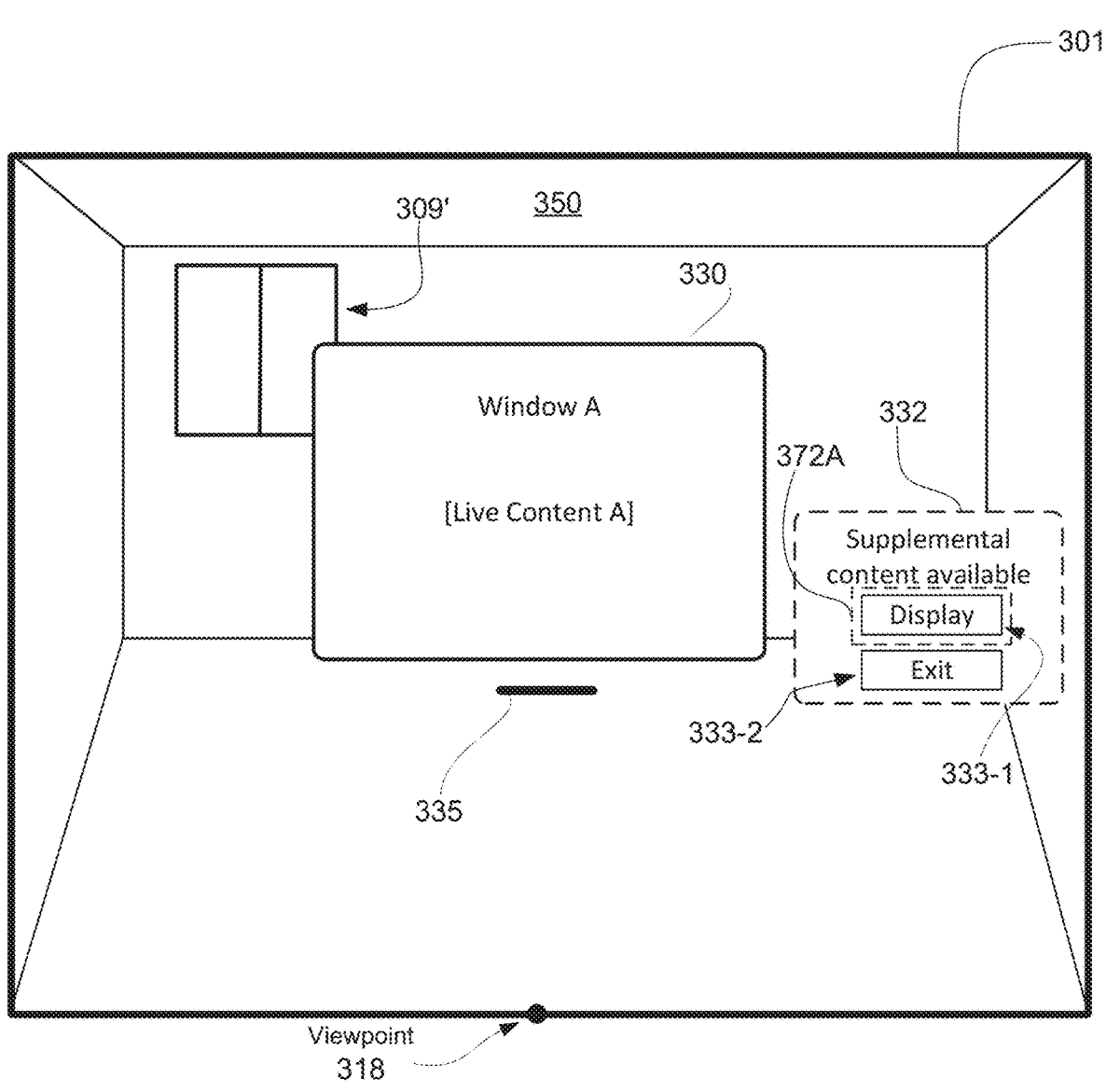
Figure 3C:
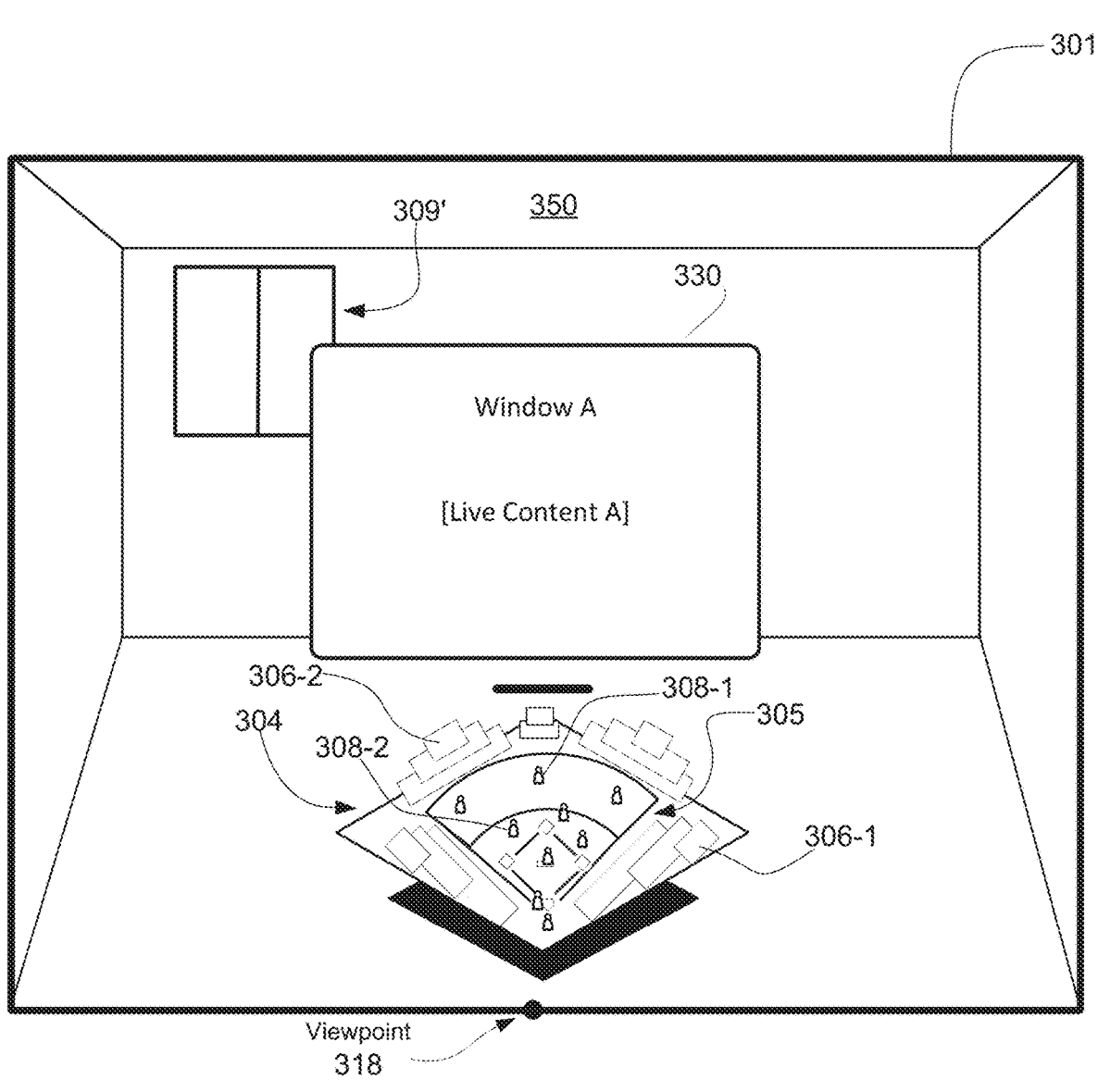
Figure 3D:
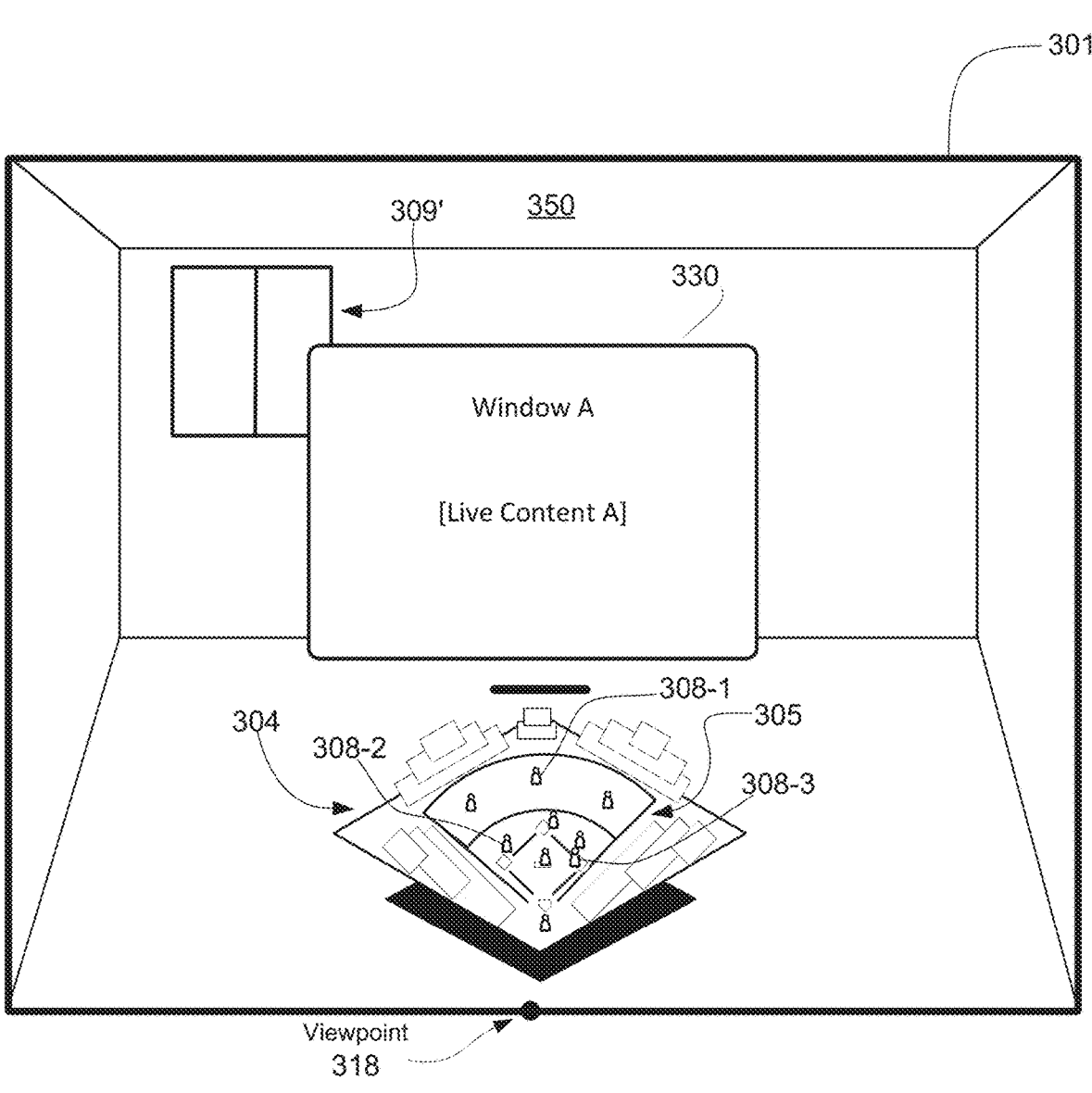
Figure 3E:
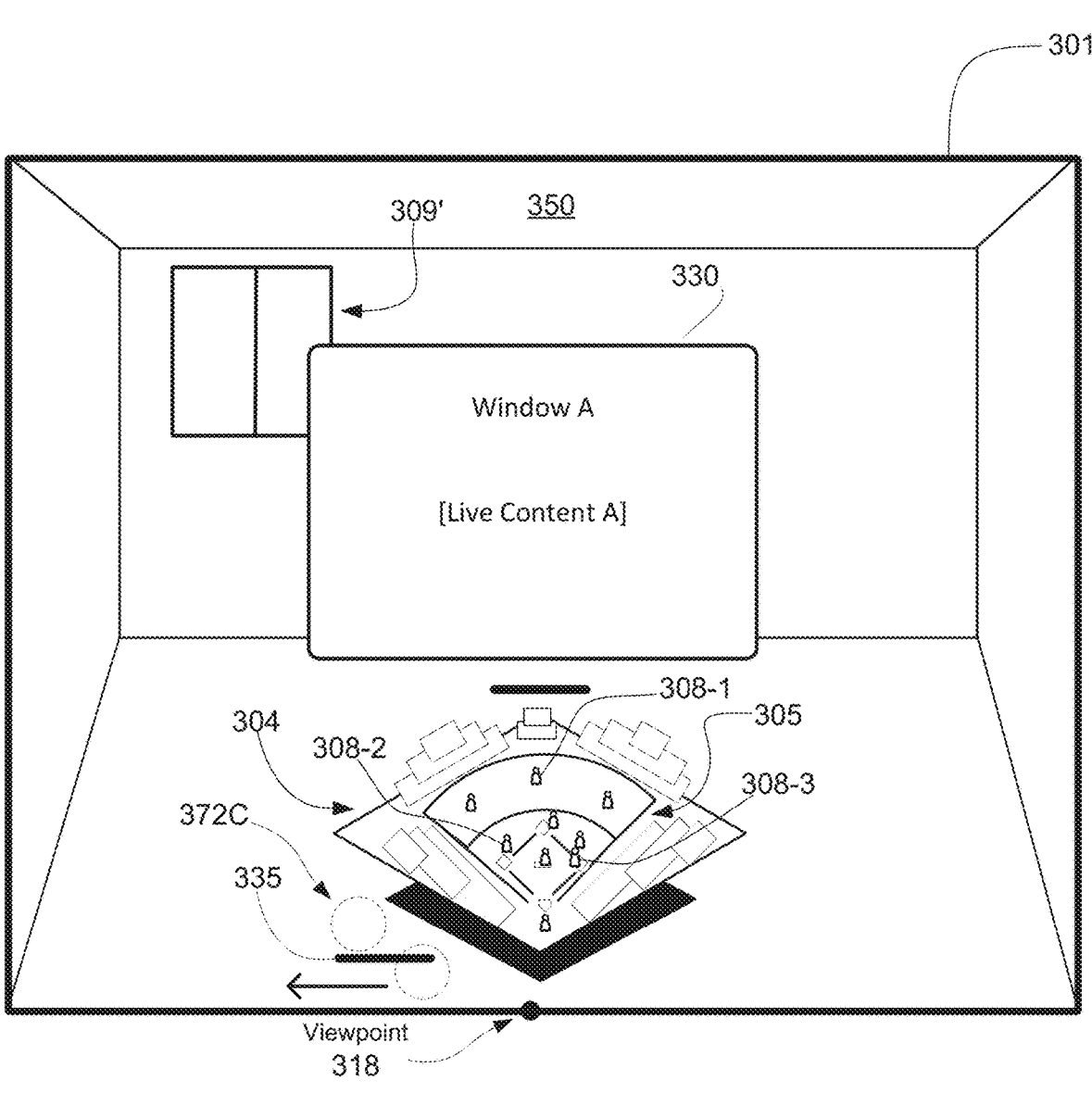
Figure 3F:
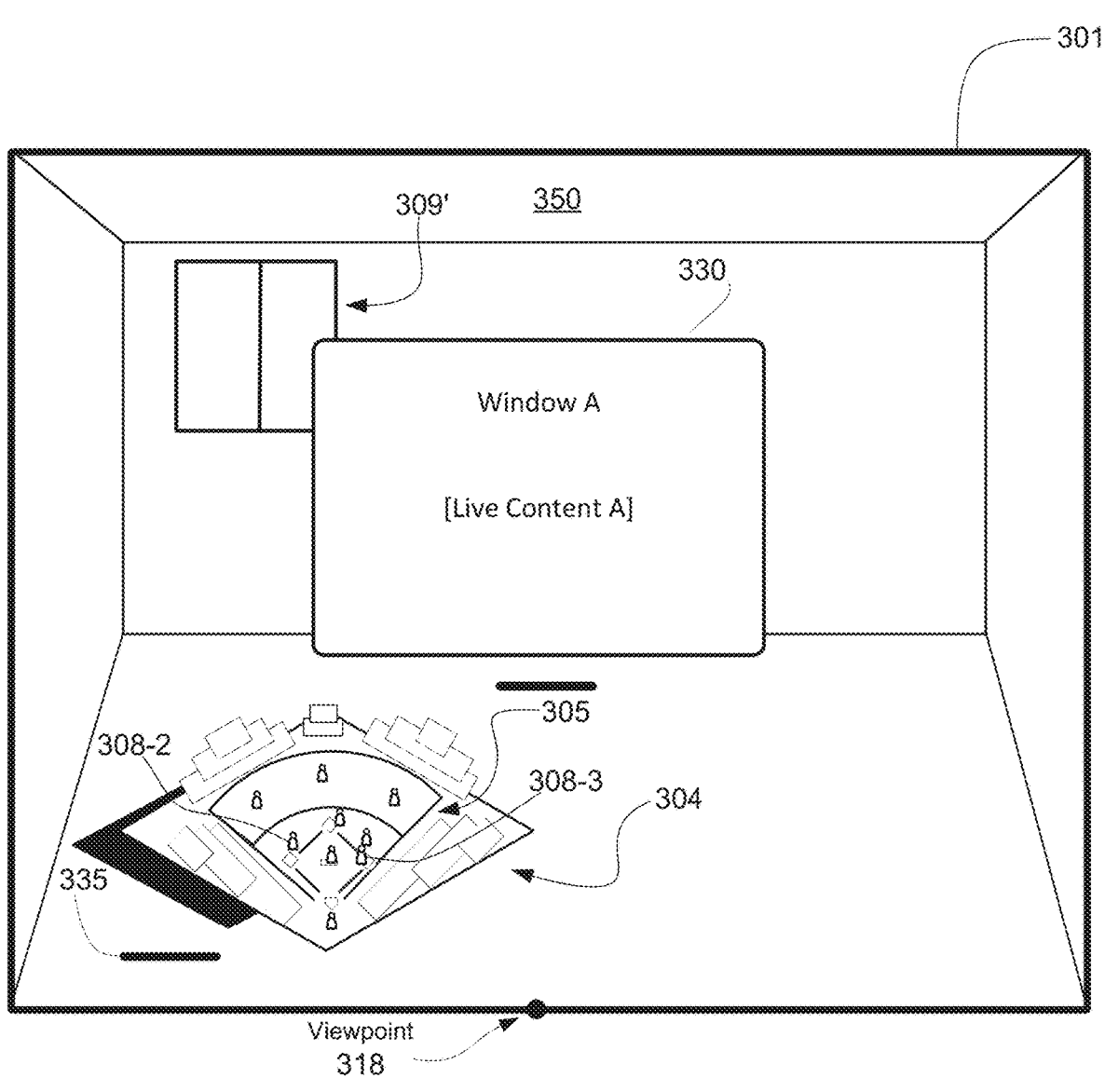
Figure 3G:
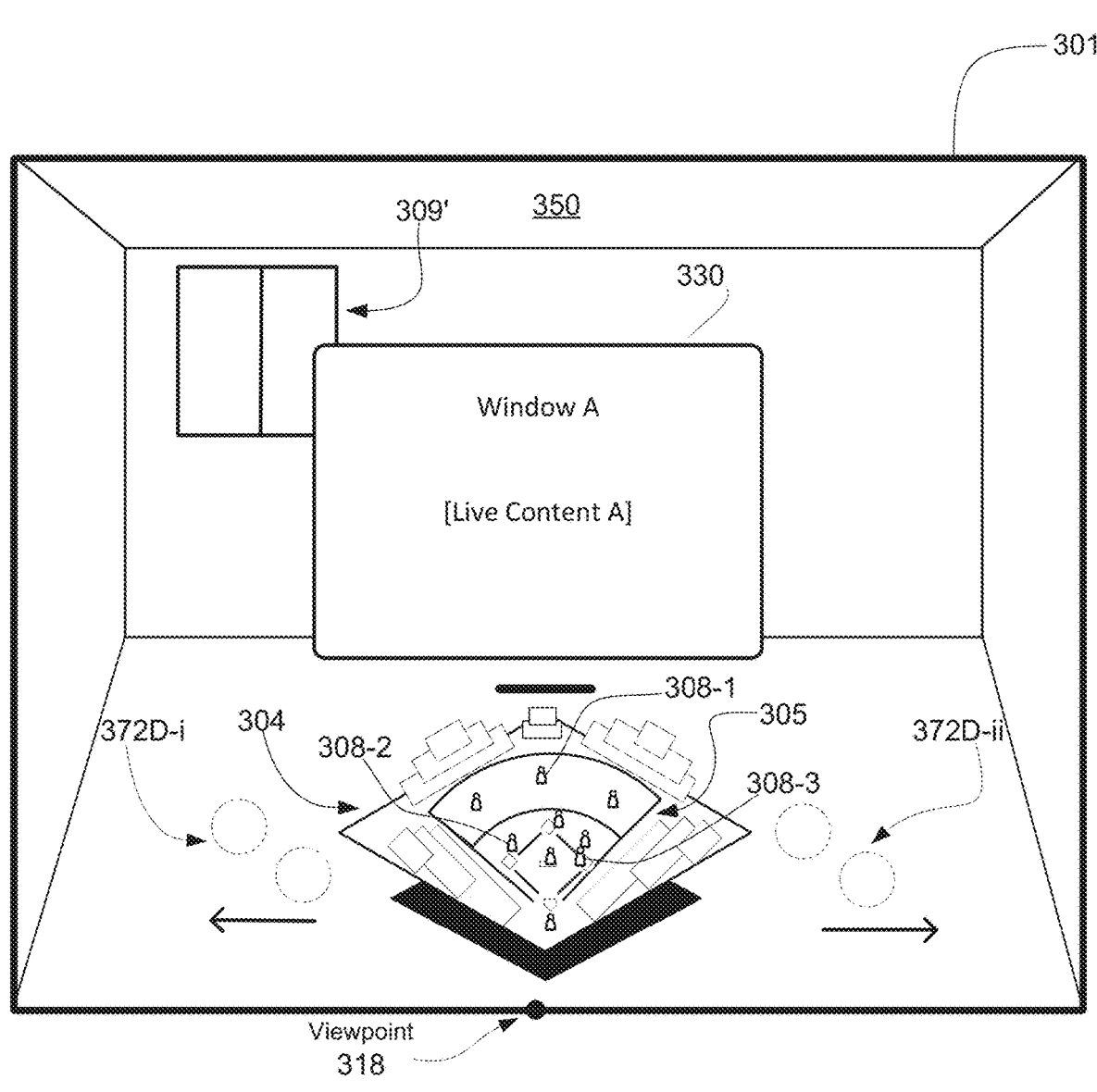
Figure 3H:
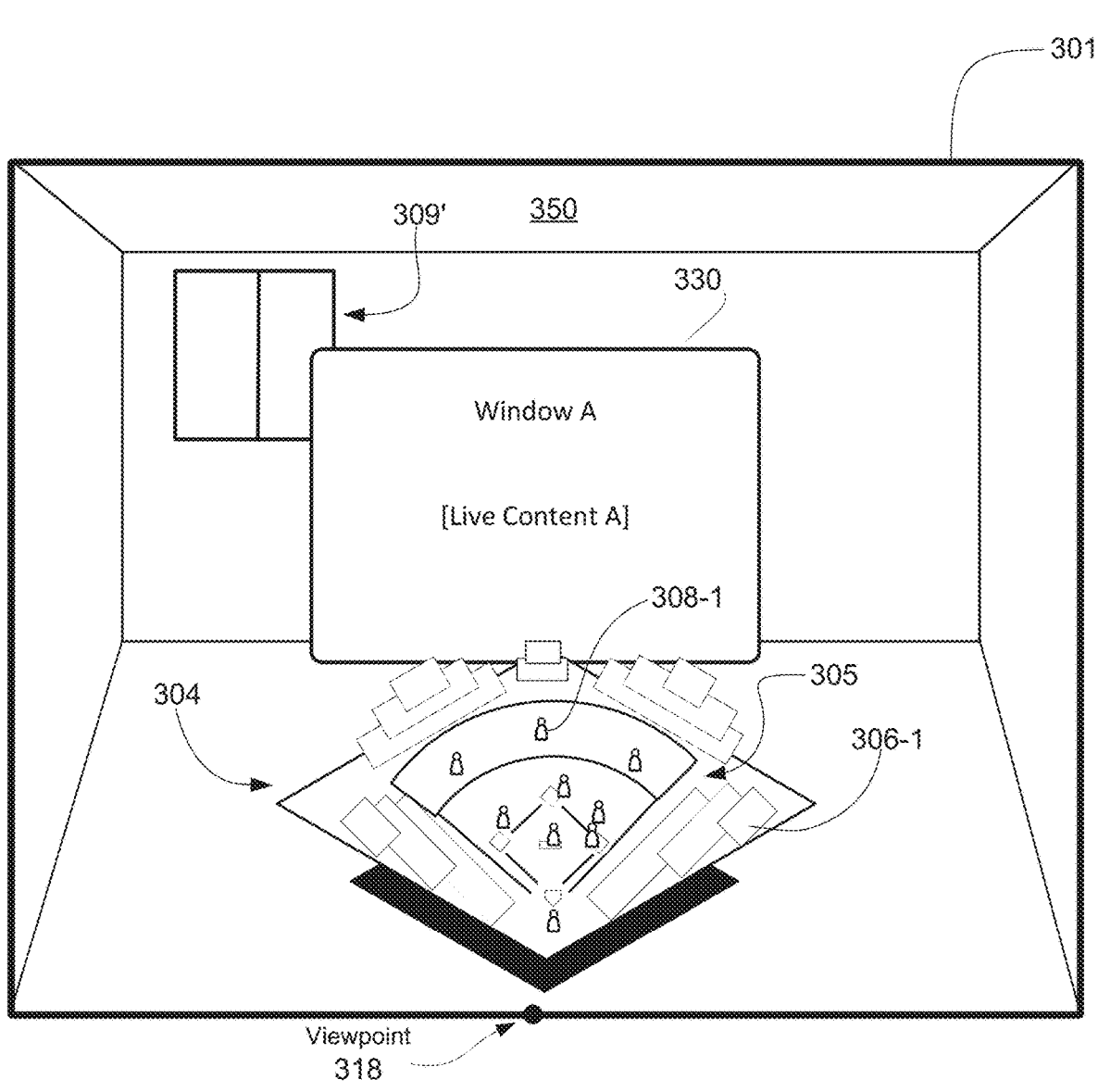
Figure 3I:
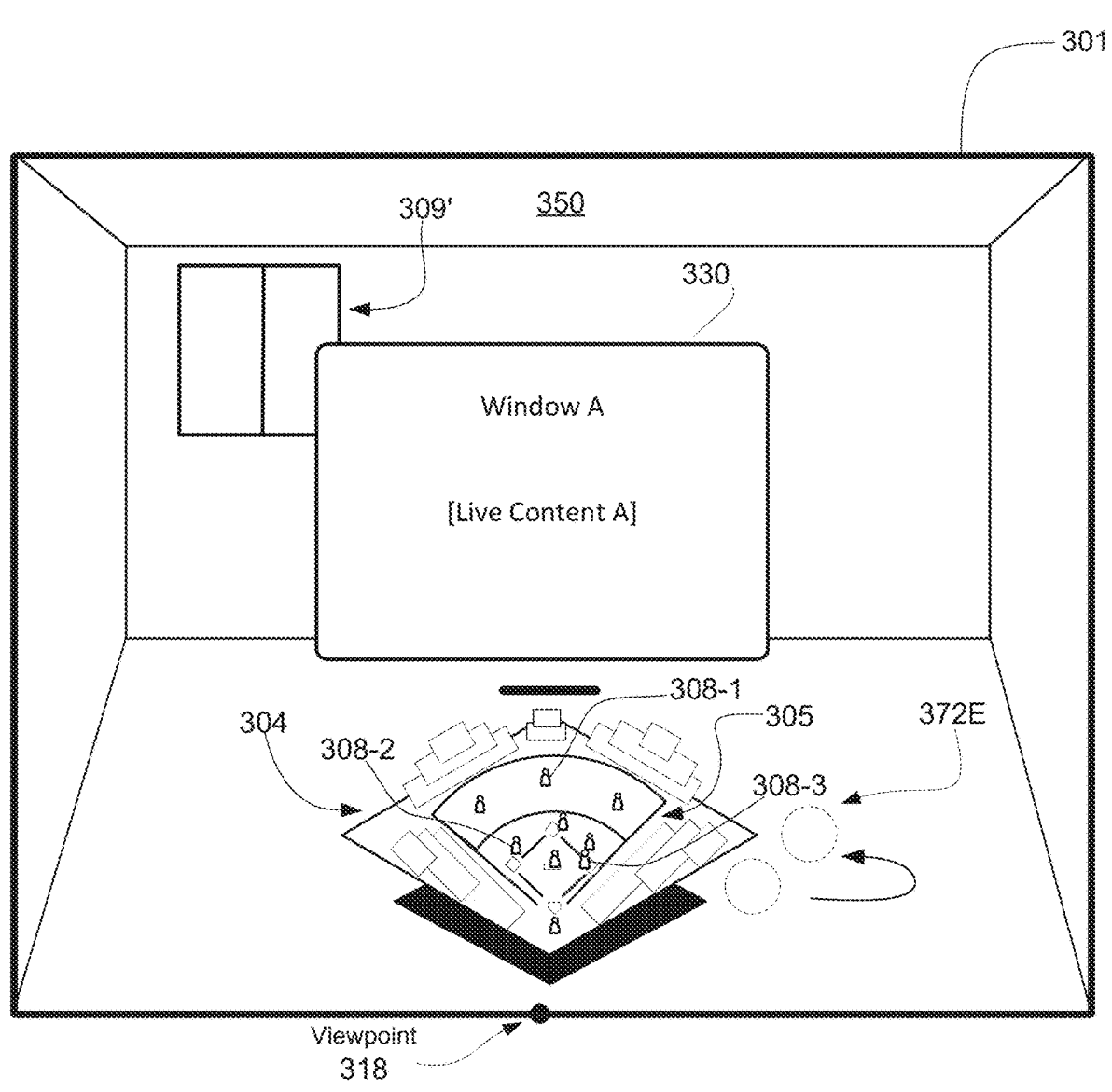
Figure 3J:
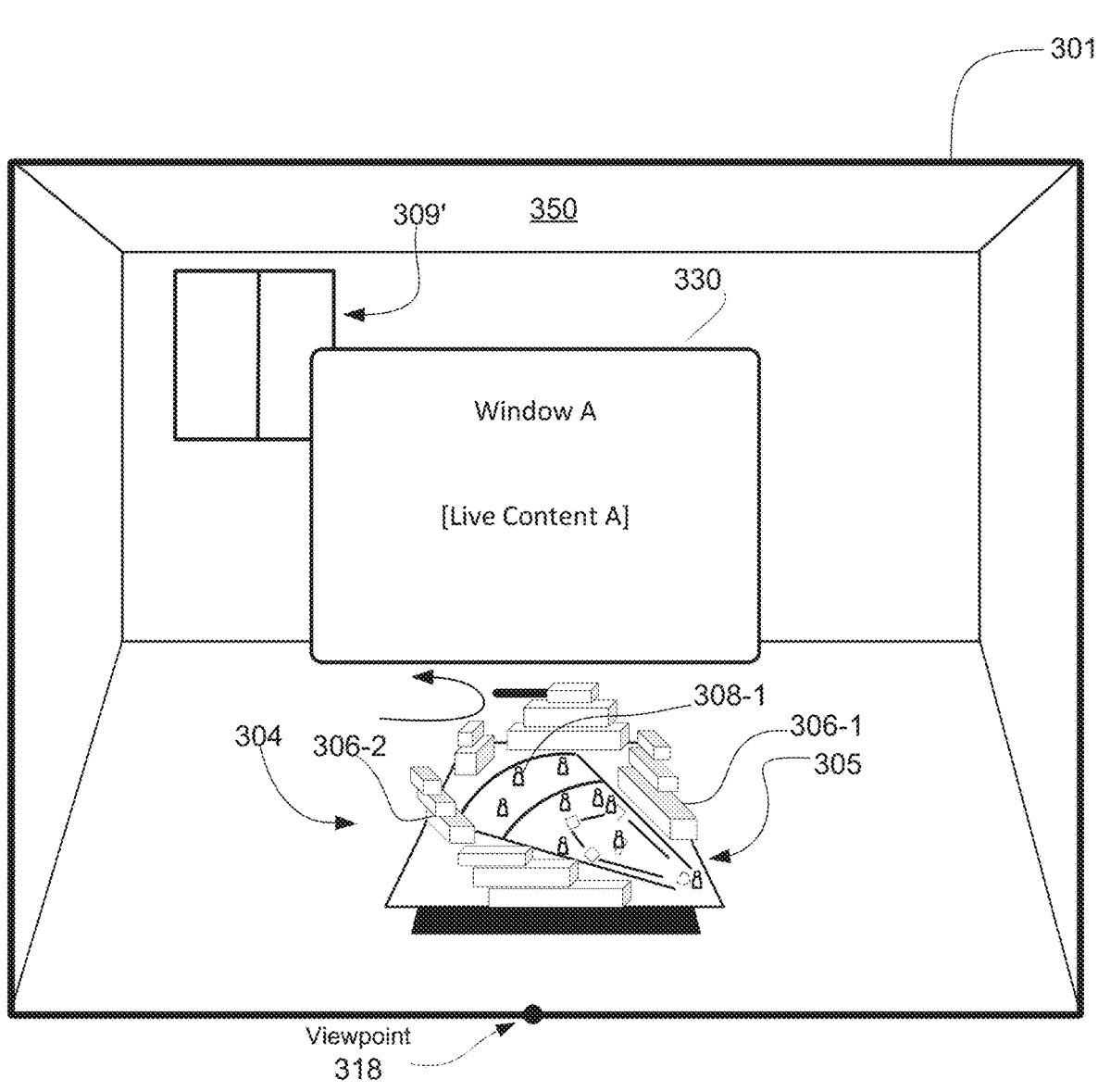
Figure 3K:
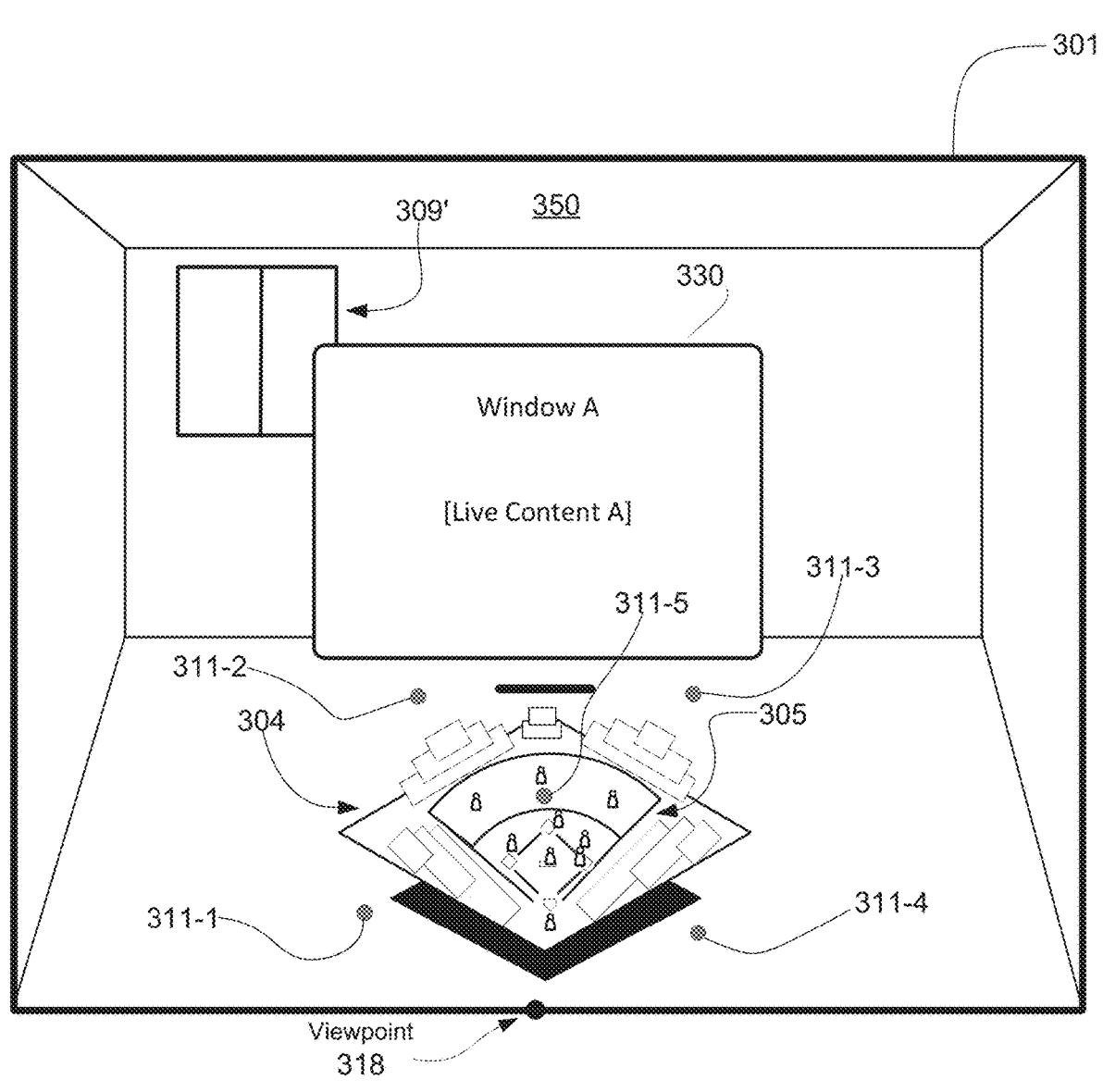
Figure 3L:
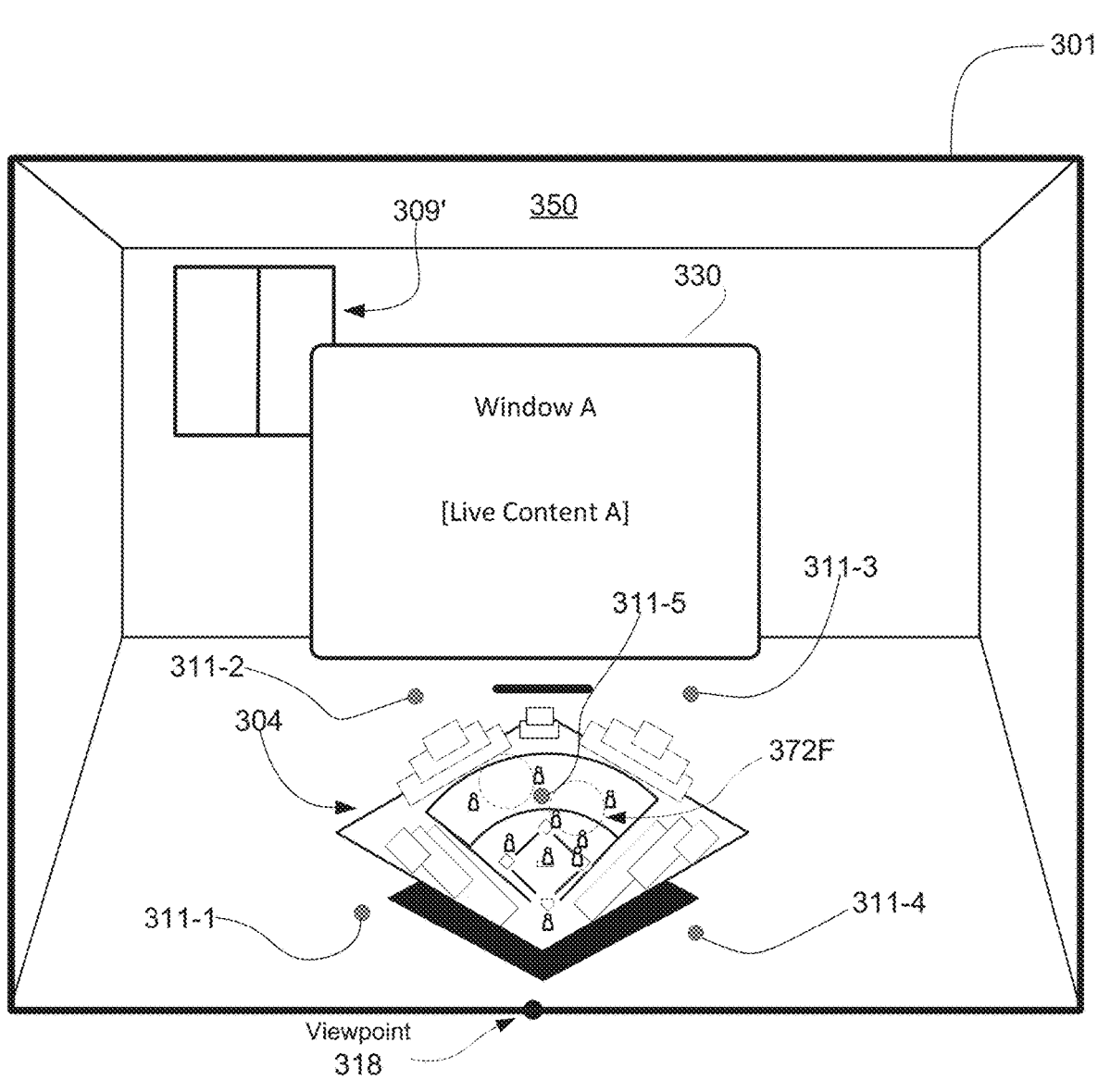
Figure 3M:
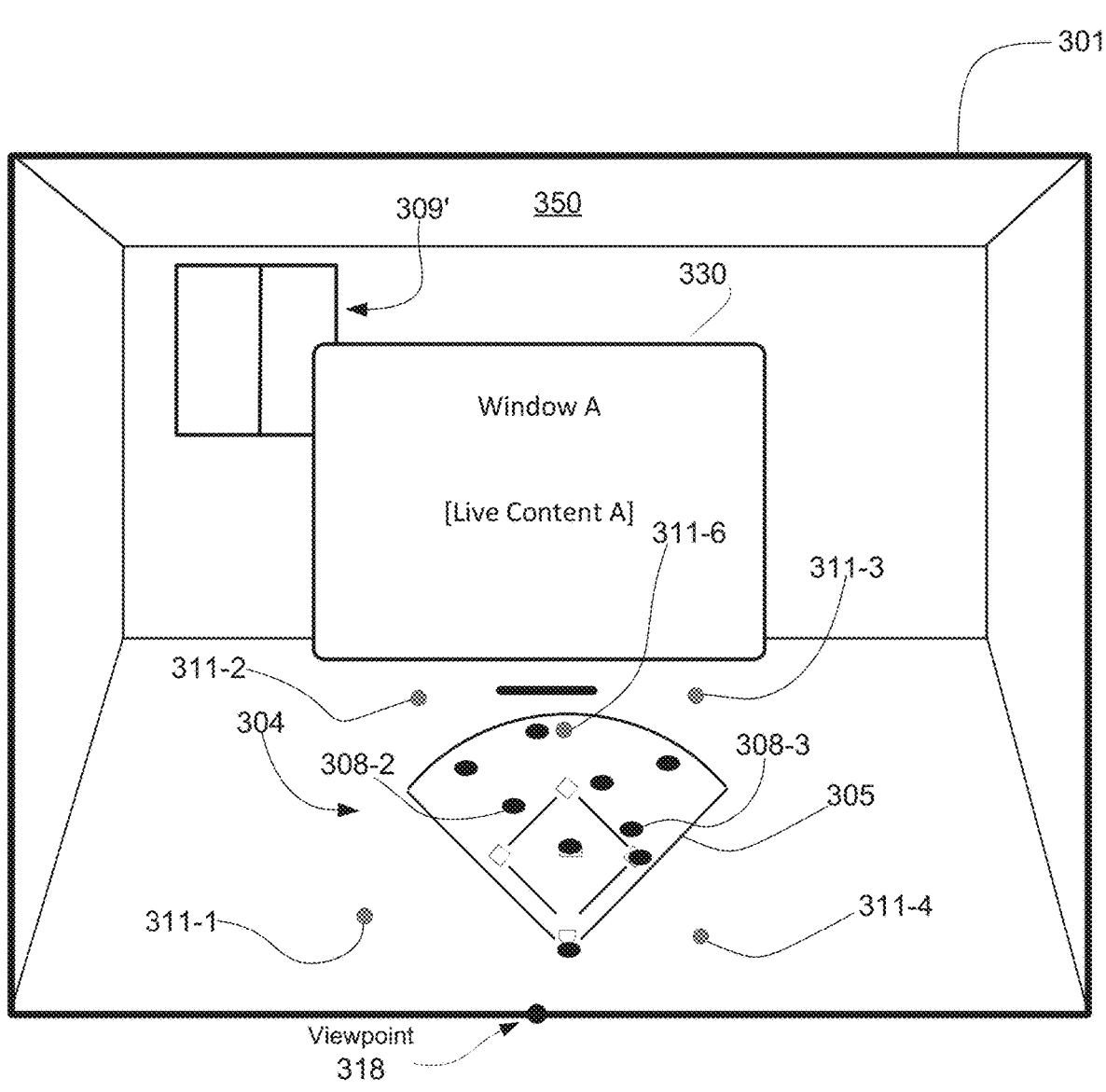
Figure 3N:
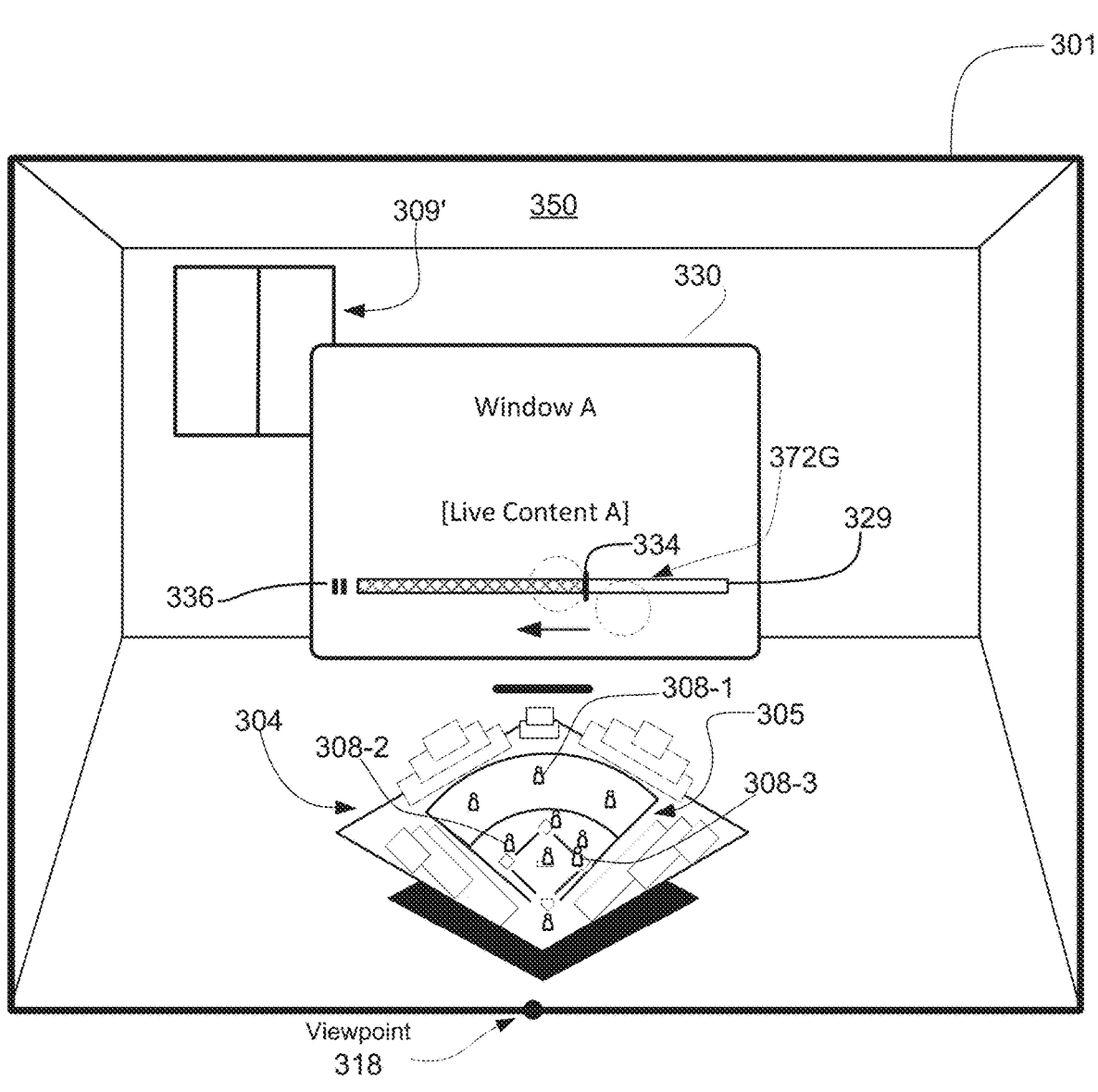
Figure 3O:
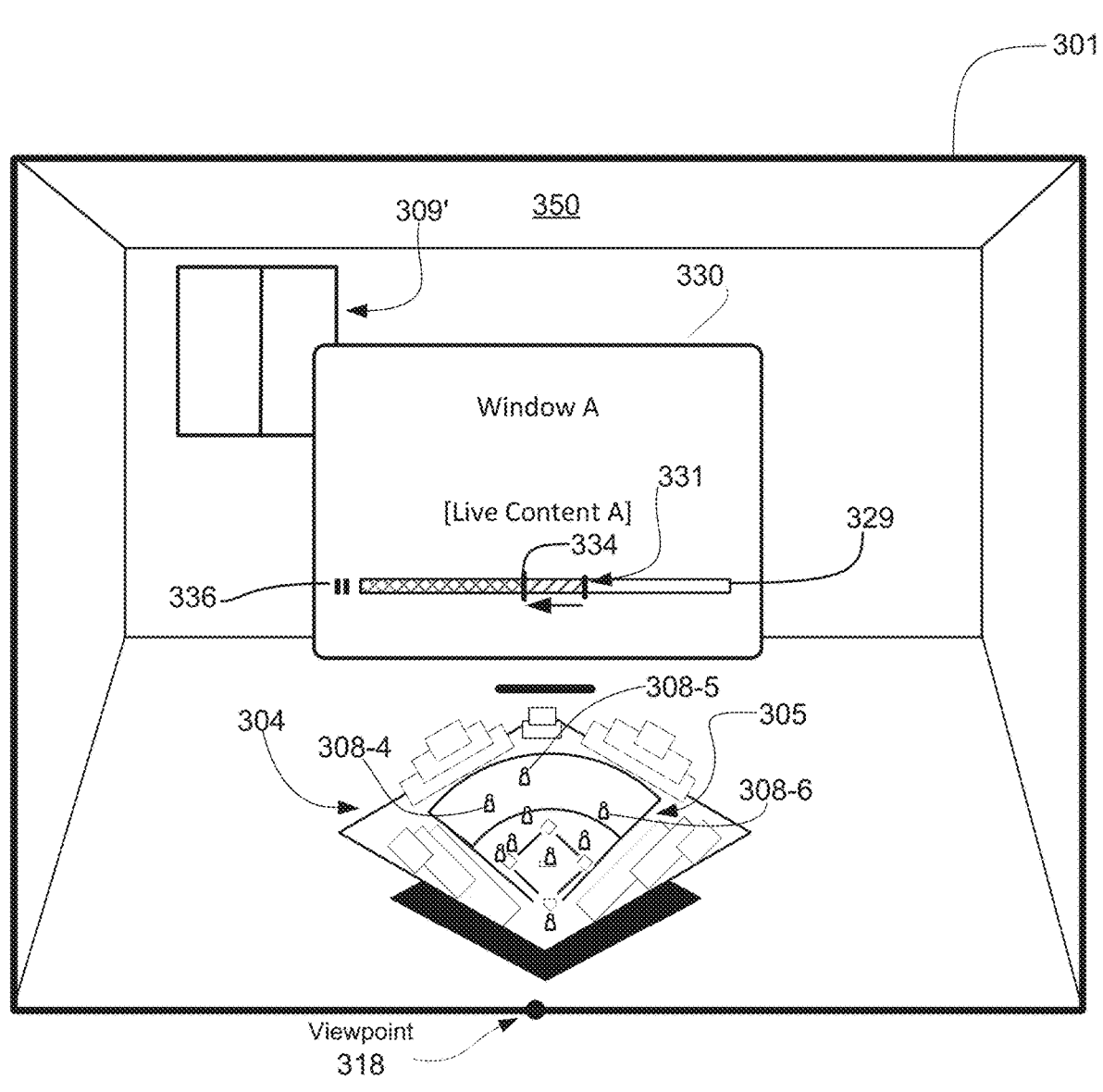
Figure 3P:
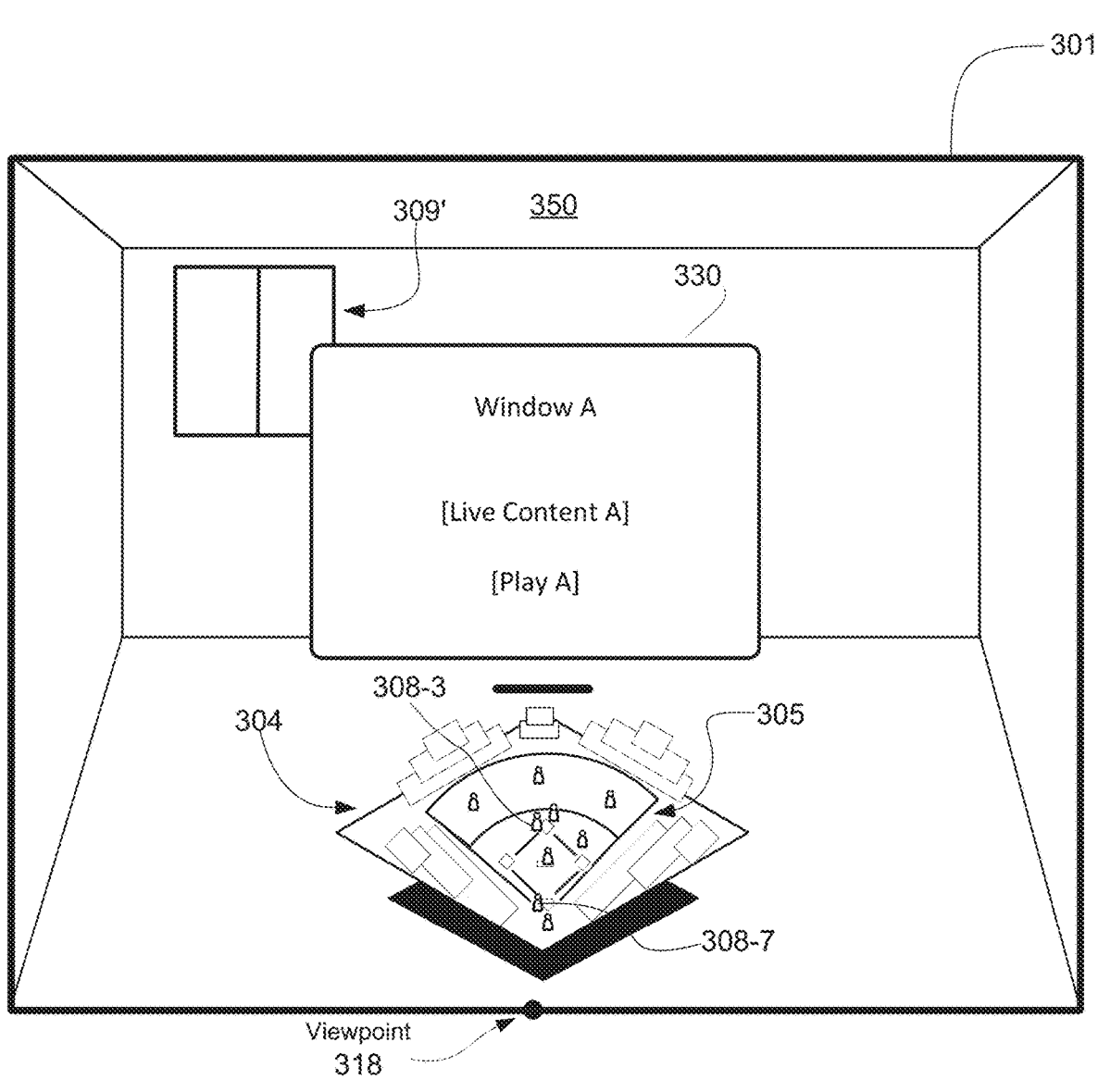
Figure 3Q:
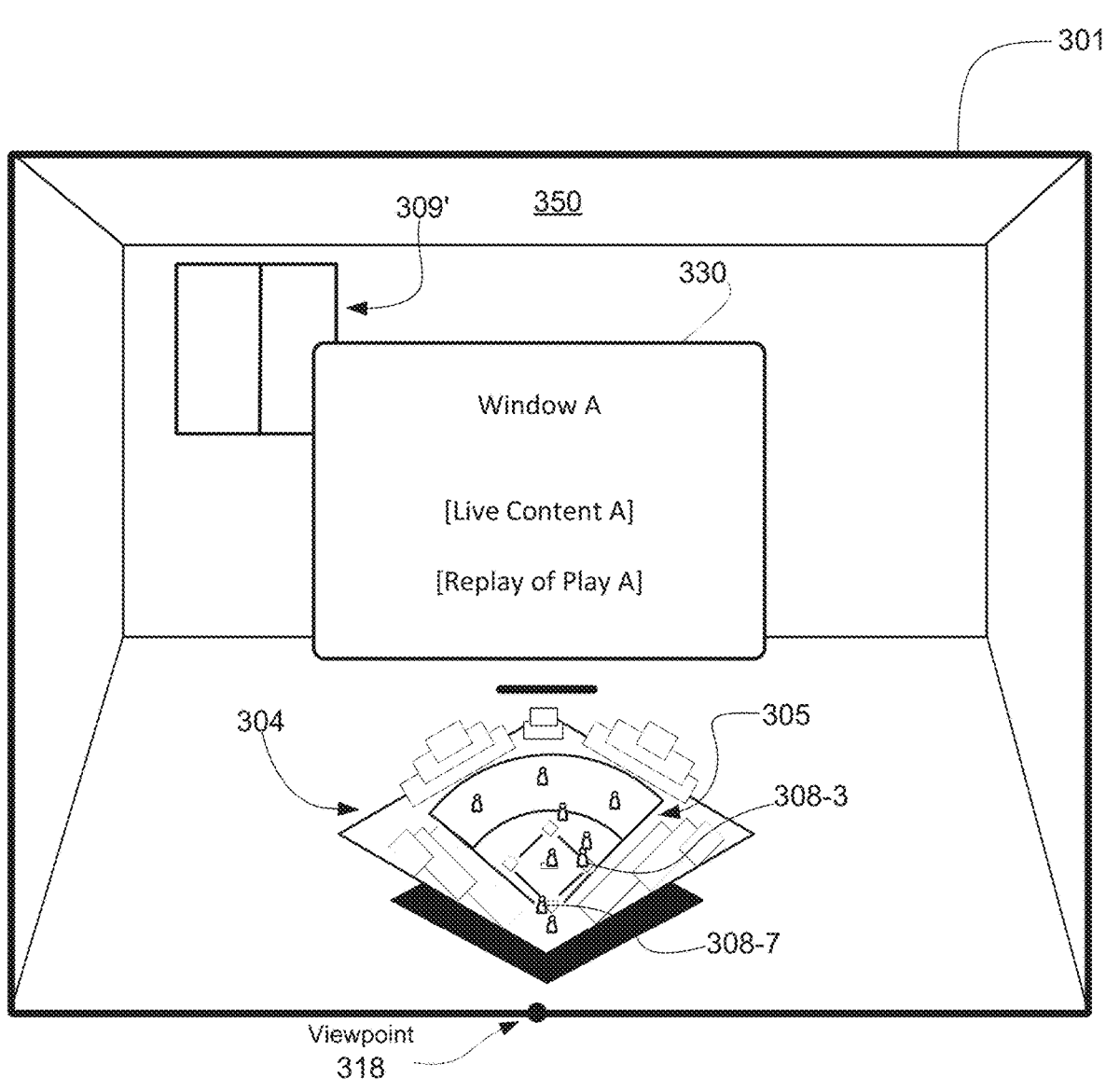
Figure 3R:
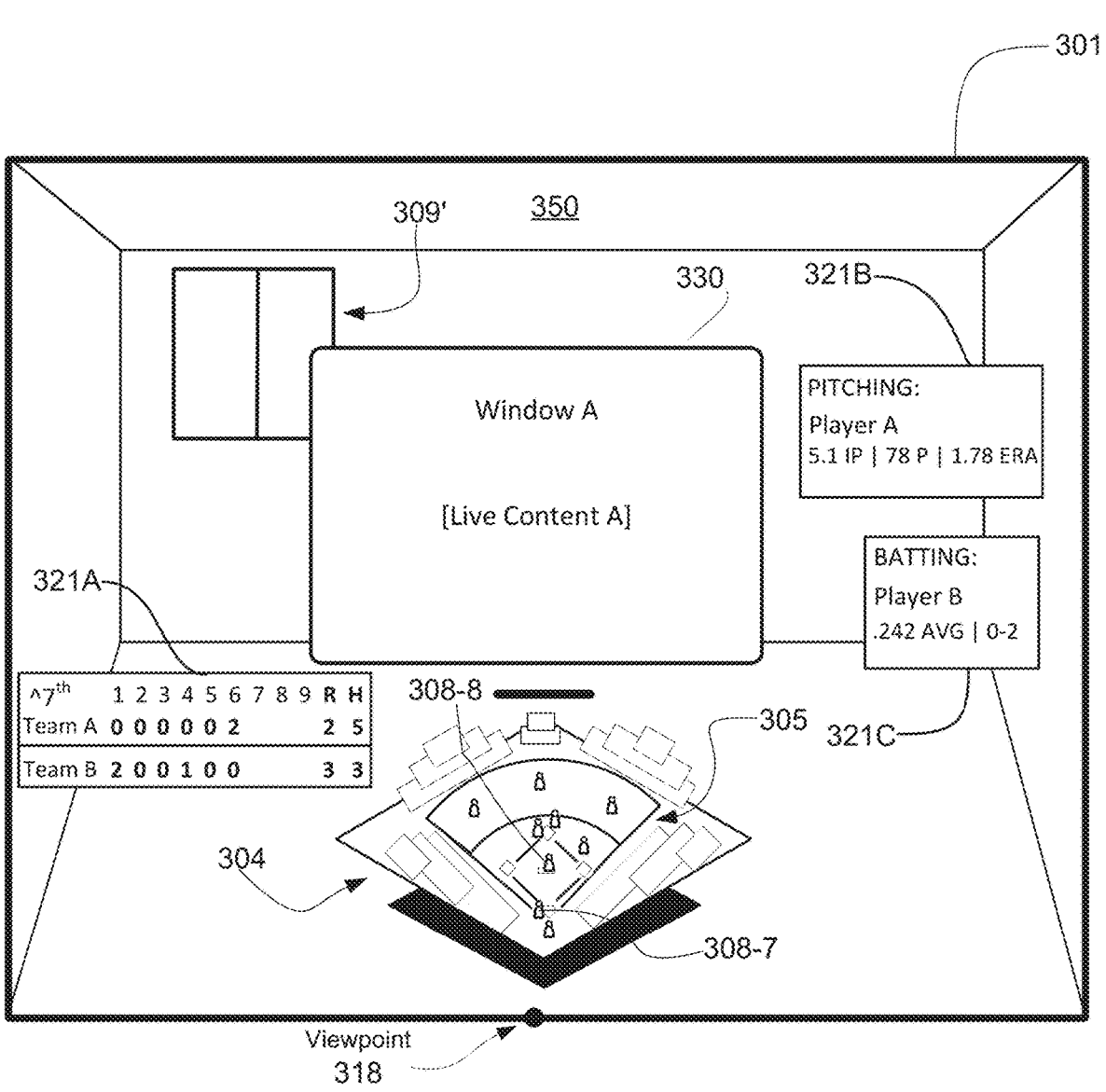
Figure 3S:
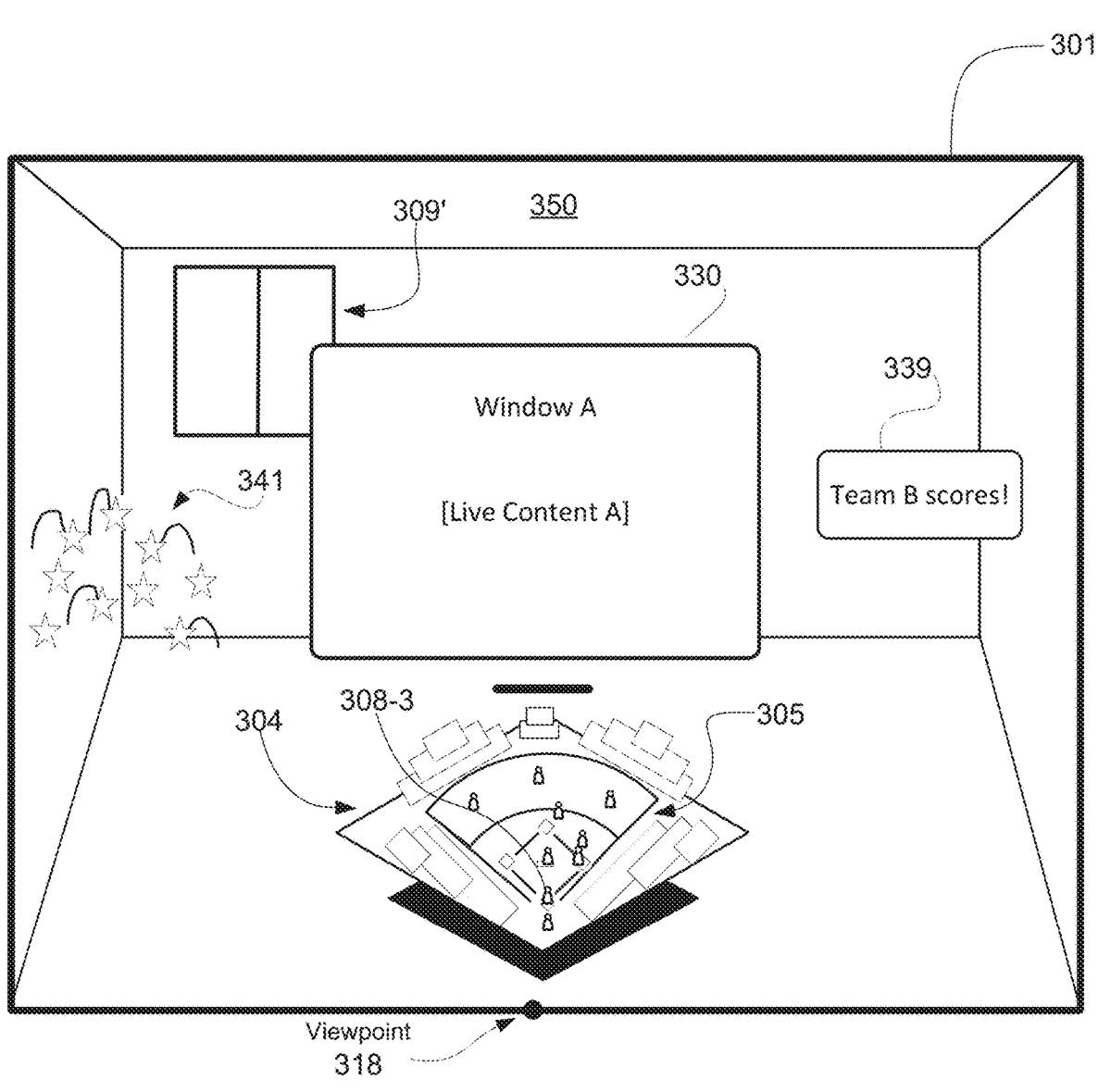

FIGS. 3A-3S illustrate example interactions involving concurrent display of live event content and supplemental content that is associated with the live event content in a computer-generated environment according to some examples of the disclosure. In some examples, electronic device 301 may present a three-dimensional environment 350 (e.g., an extended reality environment). The electronic device 301 may be similar to electronic devices 101 or 201 discussed above, and/or may be a head mountable system/device and/or projection-based system/device (including a hologram-based system/device) configured to generate and present a three-dimensional environment, such as, for example, heads-up displays (HUDs), head mounted displays (HMDs), windows having integrated display capability, or displays formed as lenses designed to be placed on a person's eyes (e.g., similar to contact lenses). In the examples of FIGS. 3A-3S, a user is optionally wearing the electronic device 301, such that the three-dimensional environment 350 can be defined by X, Y and Z axes as viewed from a perspective of the electronic device (e.g., a viewpoint 318 associated with the user of the electronic device 301). Accordingly, as used herein, the electronic device 301 is configured to be movable with six degrees of freedom based on the movement of the user (e.g., the head of the user), such that the electronic device 301 may be moved in the roll direction, the pitch direction, and/or the yaw direction, as well as the front/back, side to side, and up/down directions.

As shown in FIG. 3A, the electronic device 301 may be positioned in a physical environment that includes a window 309. Thus, the three-dimensional environment 350 presented using the electronic device 301 optionally includes captured portions of the physical environment surrounding the electronic device 301, such as a representation of the window 309'. Additionally, as shown in FIG. 3A, the three-dimensional environment 350 may include representations of the floor, ceiling, and walls of the room in which the electronic device 301 is located. In some examples, the representations can include portions of the physical environment viewed through a transparent or translucent display of electronic device 301.

In some examples, the three-dimensional environment 350 may include one or more virtual objects. For example, as shown in FIG. 3A, the electronic device 301 is displaying a virtual playback user interface 330 in the three-dimensional environment 350. In some examples, the virtual playback user interface 330 is associated with a video playback application running on the electronic device 301, such as a media browsing application. In some examples, the virtual playback user interface 330 is configured to display content in the three-dimensional environment 350, such as two-dimensional video content. As shown in FIG. 3A, the virtual playback user interface 330 is displaying a live content item (e.g., "Live Content A"), which is optionally a live sports game, such as a live baseball game. It should be understood that, while a live baseball game is referenced throughout the examples discussed herein, alternative types and/or examples of live content may be displayed in the virtual playback user interface 330 in the three-dimensional environment 350, such as alternative live sports games (e.g., football, soccer, basketball, tennis, golf, etc.), live events (e.g., races, news broadcasts, talk shows, awards shows, political debates, etc.), live movies or television shows, etc. As used herein, live content refers to content that is being broadcast and/or streamed live by a content/media provider (e.g., a network, channel, company, etc.) for the live content. For example, the live baseball game that is being displayed in the virtual playback user interface 330 is not available for playback at the electronic device 301 until it is broadcast/streamed by the content provider for consumption at the electronic device 301. Additionally, it should be understood that, in some examples, the virtual playback user interface 330 is configurable to display content other than live content, such as on-demand content (e.g., movies, television shows, sports games reruns, etc.) that are readily available for consumption at the electronic device 301 (e.g., via a respective media browsing application). As shown in FIG. 3A, the virtual playback user interface 330 may be displayed with a grabber bar 335 (also referred to as a handlebar affordance) which is optionally selectable to initiate movement (e.g., translation or rotation) of the virtual playback user interface 330 within the three-dimensional environment 350.

In some examples, as discussed herein, the live content that is displayed in the virtual playback user interface 330 may be associated with supplemental content that is available for display in the three-dimensional environment 350

(e.g., as supplemental three-dimensional and/or two-dimensional content). In some examples, the supplemental content is available for display in the three-dimensional environment 350 based on broadcast data (e.g., and/or streaming data) for the live content. For example, display data for generating and/or displaying the supplemental content in the three-dimensional environment 350 is provided by the content provider for the live content and is integrated in the broadcast data that is readable by the video playback application. In some examples, the electronic device 301 is configured to generate and display the supplemental content based on the display data read and provided by the video playback application, as discussed in more detail below.

In some examples, the supplemental content that is associated with the live content is displayed and/or is made available for display in the three-dimensional environment 350 based on a current playback position within the live content. For example, the electronic device 301 automatically generates and displays the supplemental content that is associated with the live content when the current playback position within the live content reaches a predetermined playback position (e.g., determined by the content provider of the live content). Alternatively, in some examples, as shown in FIG. 3B, the electronic device 301 provides an alert (e.g., a notification) that supplemental content for the live content is available for display in the three-dimensional environment 350. For example, as shown in FIG. 3B, the electronic device 301 displays notification element 332 that notifies the user of the electronic device 301 that supplemental content for the live baseball game is available for viewing in the three-dimensional environment 350. As shown in FIG. 3B, the notification element 332 optionally includes a first option 333-1 that is selectable to display the supplemental content in the three-dimensional environment 350 and a second option 333-2 that is selectable to cease display of the notification element 332 and forgo displaying the supplemental content in the three-dimensional environment 350. In some examples, if the user provides input for selecting the second option 333-2 of the notification element 332 and ceasing display of the notification element 332 in the three-dimensional environment 350, the electronic device 301 optionally redisplays the notification element 332 (e.g., at a later time) during playback of the live content to provide the user with subsequent opportunities to view the supplemental content associated with the live content.

In FIG. 3B, the electronic device 301 detects a selection input 372A directed to the first option 333-1 in the notification element 332 in the three-dimensional environment 350. For example, the electronic device 301 detects an air pinch gesture (e.g., in which an index finger and thumb of a hand of the user come together and make contact), an air tap or touch gesture (e.g., provided by an index finger of the hand), a verbal command, a gaze and dwell, etc. In some examples, as shown in FIG. 3C, in response to detecting the selection of the first option 333-1 in the notification element 332, the electronic device 301 generates and presents a three-dimensional representation 304 corresponding to the live content that is being displayed in the virtual playback user interface 330 in the three-dimensional environment 350. In some examples, the electronic device 301 displays the three-dimensional representation 304 at a predetermined location in the three-dimensional environment 350 relative to the viewpoint 318 of the user. For example, as shown in FIG. 3C, the electronic device 301 displays the three-dimensional representation 304 at a location that is in front of the virtual playback user interface 330 in the three-dimensional environment 350, though other locations are possible.

In some examples, as shown in FIG. 3C, the three-dimensional representation 304 provides an enhanced viewing experience for the live content displayed in the virtual playback user interface 330. For example, as mentioned above, in the example of FIG. 3C, the live content corresponds to a live baseball game that is being played between two teams (e.g., Team A and Team B). Accordingly, as shown in FIG. 3C, the three-dimensional representation 304 optionally includes a setting or scene of the live baseball game, such as the venue (e.g., stadium) at which the baseball game is being played. In some examples, as shown in FIG. 3C, the three-dimensional representation 304 includes a representation of stadium seating areas 306-1 and 306-2 and a representation of the baseball field 305 (e.g., including the outfield and the infield including the bases). Additionally, in some examples, the three-dimensional representation 304 includes representations of participants in the live content. For example, as shown in FIG. 3C, the three-dimensional representation 304 includes representations of baseball players participating in the live baseball game, such as a representation of a first player 308-1 (e.g., center fielder) and a representation of a second player 308-2 (e.g., third baseman). In some examples, a visual appearance of the representations of the stadium seating areas 306-1 and 306-2 and the baseball field 305 corresponds to (e.g., is the same as or is similar to) a visual appearance of the stadium seating areas and the baseball field of the baseball stadium in the physical world. Similarly, a visual appearance of each of the representations of the baseball players 308 participating in the baseball game corresponds to (e.g., is the same as or is similar to) a visual appearance of the baseball players participating in the baseball game in the physical world. In some examples, the representations of the baseball players 308 may be distinguishable based on jersey number and/or player names rather than necessarily based on visual appearances (e.g., facial structure, body build, stature, etc.). In some examples, as discussed in more detail below, locations of the representations of the participants (e.g., baseball players 308) in the three-dimensional representation 304 are configured to change based on changes in location of the participants in the live content (e.g., based on a progression of the live content).

In some examples, the three-dimensional representation 304 includes a visual indication of a size of the audience in attendance for the live event and/or a visual indication of a size of the audience viewing the game live via broadcast/stream. For example, the stadium seating 306-1 and 306-2 may include volumetric and/or statistical indications of the size of the audience in the baseball stadium (e.g., based on a number of tickets sold and/or a number of tickets scanned at the baseball stadium, image data from the cameras at the stadium, etc.). As another example, the three-dimensional representation 304 may include volumetric and/or statistical indications of the size of the audience viewing the baseball game remotely via a broadcast/stream of the baseball game on an electronic device (e.g., generated based on statistical sampling of viewership for the baseball game). In some examples, the visual indication of the size of the audience in attendance for the live event may be visually delineated (e.g., using color, location of placement, textual label, etc.) from the visual indication of the size of the audience viewing the game live via broadcast/stream.

In some examples, as previously mentioned above, the content provided in the three-dimensional representation

304 is generated based on display data included (e.g., encoded) in the broadcast data for the live content that is provided by the content provider of the live content at the electronic device 301. In some examples, the display data corresponds to volumetric data that is generated based on image data used to create the broadcast/stream of the live content. For example, the volumetric data is generated based on images captured by a plurality of cameras (e.g., the camera feed) at the baseball stadium in which the baseball game is being played. In some examples, the electronic device 301 generates and displays the three-dimensional representation 304 by virtually reconstructing the baseball stadium and the baseball players based on images of the baseball stadium and the baseball players included in the camera feed. Additionally or alternatively, in some examples, the display data corresponds to joint-based data that is generated based on known (e.g., stored) characteristics of the venue and/or the participants in the live content. For example, the joint-based data is generated based on known structural features of the baseball stadium (e.g., size of the baseball stadium and/or field, number of seats within the stadium, etc. known from technical specifications (e.g., blueprints, models, maps, etc.)) and/or known physical features of the baseball players (e.g., based on skeletal tracking and/or player statistics (e.g., player height, weight, name, jersey number, facial features, etc.)). In some examples, the electronic device 301 generates and displays the three-dimensional representation 304 by virtually reconstructing the baseball stadium and the baseball players based on their known technical features, rather than relying exclusively on the camera feed from the baseball game.

In some examples, respective portions of the content provided in the three-dimensional representation 304 are not displayed in the virtual playback user interface 330 during the playback of the live content (e.g., for a given playback position within the live content). For example, as discussed above, the three-dimensional representation 304 includes a representation of the venue of the live baseball game and/or representations of the players participating in the live baseball game. Because the broadcast of the live baseball game may focus on particular players (e.g., the pitcher and the batter) during a particular play during the baseball game, other players and/or portions of the stadium may not be displayed in the virtual playback user interface 330 during the particular play. However, the other players and/or portions of the stadium that are not displayed in the current frame of the live content may be represented via the three-dimensional representation 304 as similarly discussed above. Accordingly, movements and/or actions of certain players, such as players in the outfield, who are not included in the live broadcast/stream during a certain play (e.g., the pitcher pitching to the batter), may be illustrated via the representations of the players in the three-dimensional representation 304, as discussed in more detail below. As another example, the players who are not actively participating in the baseball game but who are on either team may be represented in the three-dimensional representation 304 (e.g., the dugouts of either team including players, coaches, and/or other staff may be represented in the three-dimensional representation 304).

In some examples, the electronic device 301 updates display of the three-dimensional representation 304 based on the playback of the live content in the virtual playback user interface 330. For example, from FIGS. 3C-3D, the player who is batting in the baseball game hits a single and runs to first base in the baseball field. Accordingly, as shown in FIG. 3D, the electronic device 301 updates display of the three-dimensional representation 304 such that the representation of the player 308-3 who hit the single is displayed at first base in the representation of the baseball field 305. Additionally, from FIGS. 3C-3D, other representations of players may be moved within the three-dimensional representation 304 when the player hit the single, such as the representation of the third baseman 308-2. In some examples, as similarly discussed above, the electronic device 301 updates display of the three-dimensional representation 304 based on the playback of the live content using broadcast data provided by the content provider for the live content.

In some examples, the three-dimensional representation 304 is movable in the three-dimensional environment 350 independent of a location of the virtual playback user interface 330 in the three-dimensional environment 350. For example, as shown in FIG. 3E, the three-dimensional representation 304 is optionally displayed with a grabber bar 335 (e.g., similarly discussed above) that is selectable to initiate movement of the three-dimensional representation 304 in the three-dimensional environment 350. In FIG. 3E, the electronic device 301 detects a movement input 372C directed to the three-dimensional representation 304. For example, as shown in FIG. 3E, the electronic device 301 detects a selection of the grabber bar 335 (and/or the three-dimensional representation 304) in a similar manner as discussed above, followed by movement of the grabber bar 335 leftward in the three-dimensional environment 350 relative to the viewpoint 318 of the user. In some examples, the movement of the grabber bar 335 leftward corresponds to movement of the hand of the user providing the input leftward in space relative to a body (e.g., torso) of the user.

In some examples, in response to detecting the movement input 372C, the electronic device 301 moves the three-dimensional representation 304 within the three-dimensional environment 350 in accordance with the movement input 372C. For example, as shown in FIG. 3F, the electronic device 301 moves the three-dimensional representation 304 leftward in the three-dimensional environment 350 relative to the viewpoint 318 of the user. In some examples, as shown in FIG. 3F, the electronic device 301 moves the three-dimensional representation 304 in the three-dimensional environment 350 without moving the virtual playback user interface 330 in accordance with the movement input 372C. In some examples, because the three-dimensional representation 304 is displayed according to the current playback position within the live content, the three-dimensional representation 304 may be movable in the three-dimensional environment 350 but the individual representations of the baseball players 308 may not be movable within the three-dimensional representation 304 (e.g., because movements of the individual representations of the baseball players 308 are controlled by a progression of the live baseball game).

In some examples, the three-dimensional representation 304 is configurable to be scaled in the three-dimensional environment 350 independent of a size (and/or image resolution) of the virtual playback user interface 330 (and/or the live content being displayed in the virtual playback user interface 330). For example, in FIG. 3G, the electronic device 301 detects a scaling input 372D directed to the three-dimensional representation 304 in the three-dimensional environment 350. As shown in FIG. 3G, the electronic device 301 optionally detects a two-handed input that concurrently includes a first input 372D-i and second input 372D-ii. For example, the electronic device 301 detects a selection (e.g., an air pinch) provided by a left hand of the user, followed by movement of the left hand leftward, and a selection provided by a right hand of the user, followed by movement of the right hand rightward. In some examples, the scaling input 372D corresponds to a request to increase a size of the three-dimensional representation 304 relative to the viewpoint 318 of the user.

In some examples, as shown in FIG. 3H, in response to detecting the scaling input 372D, the electronic device 301 scales the three-dimensional representation 304 in the three-dimensional environment 350 in accordance with the scaling input 372D. For example, as shown in FIG. 3H, the electronic device 301 increases the size of the three-dimensional representation 304, including the representation of the baseball stadium and the representation of the baseball players, in the three-dimensional environment 350 relative to the viewpoint 318 of the user based on the separation of the hands of the user. In some examples, the electronic device 301 scales the content of the three-dimensional representation 304 by the same scaling factor (e.g., 1×, 2×, 3×, 4×, etc.) such that display of the representation of the baseball stadium and the representations of the baseball players remains consistent for each factor of scaling. In some examples, as shown in FIG. 3H, the electronic device 301 scales the three-dimensional representation 304 without scaling the virtual playback user interface 330 (e.g., and/or without changing a zoom level of the live content being displayed in the virtual playback user interface 330) in the three-dimensional environment 350. In some examples, the three-dimensional representation 304 is scalable to a minimum scale level and/or to a maximum scale level within the three-dimensional environment 350. For example, the bounds of the scaling levels for the three-dimensional representation 304 may be determined based on the broadcast data provided by the content provider discussed above and/or the display capabilities (e.g., image resolution capabilities and/or power usage) of the electronic device 301.

In some examples, the three-dimensional representation 304 is configurable to be rotated in the three-dimensional environment 350 relative to the viewpoint 318 of the user, such that alternative and/or additional views of the supplemental content associated with the live content may be provided in the three-dimensional environment 350. For example, in FIG. 3I, the electronic device 301 detects a rotation input 372E directed to the three-dimensional representation 304 in the three-dimensional environment 350. As shown in FIG. 3I, the electronic device 301 optionally detects a selection of the three-dimensional representation 304 (e.g., in a similar manner as discussed above), followed by rotational movement of one or more hands of the user corresponding to a request to rotate the three-dimensional representation 304 counterclockwise relative to the viewpoint 318 of the user.

In some examples, as shown in FIG. 3J, in response to detecting the rotation input 372E, the electronic device 301 rotates the three-dimensional representation 304 relative to the viewpoint 318 of the user in accordance with the rotation input 372E. For example, as shown in FIG. 3J, the electronic device 301 rotates the three-dimensional representation 304 counterclockwise in the three-dimensional environment 350 about a vertical axis through (e.g., a center of) the three-dimensional representation 304. In some examples, as shown in FIG. 3J, rotating the three-dimensional representation 304 provides the user with an alternative view of the three-dimensional representation 304 relative to the viewpoint 318. For example, in FIG. 3J, the rotation of the three-dimensional representation 304 enables the user to view the content from a left side of the three-dimensional representation 304, namely the portions of the representation baseball stadium and the representations of the players along the third base line. Additionally, in some examples, the electronic device 301 rotates the three-dimensional representation 304 in accordance with the rotation input 372E without rotating the virtual playback user interface 330 and/or the live content that is being displayed in the virtual playback user interface 330, as shown in FIG. 3J.

Additionally or alternatively, in some examples, the three-dimensional representation 304 may be associated with a plurality of predetermined viewing points 311 in the three-dimensional environment 350. For example, as shown in FIG. 3K, the three-dimensional representation 304 may be associated with a first predetermined viewing point 311-1, a second predetermined viewing point 311-2, a third predetermined viewing point 311-3, a fourth predetermined viewing point 311-4, and/or a fifth predetermined viewing point 311-5. In some examples, the predetermined viewing points are established by the broadcast data by which the three-dimensional representation 304 is displayed. In some examples, the predetermined viewing points are established (e.g., arbitrarily) by the electronic device 301. For example, each predetermined viewing point may be equidistant from an adjacent predetermined viewing point, such that the first predetermined viewing point 311-1 is located 90 degrees from the second predetermined viewing point 311-1 in the three-dimensional environment 450. In some examples, the first predetermined viewing point 311-1 corresponds to a left front view of the three-dimensional representation 304 relative to the viewpoint 318, the second predetermined viewing point 311-2 corresponds to a left rear view of the three-dimensional representation 404 relative to the viewpoint 318, the third predetermined viewing point 311-3 corresponds to a right rear view of the three-dimensional representation 304 relative to the viewpoint 318, the fourth predetermined viewing point 311-4 corresponds to a right front view of the three-dimensional representation 304 relative to the viewpoint 318, and the fifth predetermined viewing point 311-5 corresponds to an overhead (e.g., top-down) view of the three-dimensional representation 304 relative to the viewpoint 318. In some examples, the association of the predetermined viewing points with the three-dimensional representation 304 is independent of a current playback position within the live content and/or a camera view that is in focus within the live content in the three-dimensional environment 350. As shown in the example of FIG. 3K, the view of the three-dimensional representation 304 is currently not associated with any of the plurality of predetermined viewing points 311 in the three-dimensional environment 350 (e.g., and is displaying the three-dimensional representation 304 from a default viewing point).

In some examples, the electronic device 401 transitions to displaying the three-dimensional representation 304 at a respective predetermined viewing point in the three-dimensional environment 350 in response to detecting a selection of the respective predetermined viewing point (e.g., one of the predetermined viewing points 311). For example, in FIG. 3L, the electronic device 301 detects a selection input 372F directed to the fifth predetermined viewing point 311-5 in the three-dimensional environment 350. In some examples, the selection input 372F has one or more characteristics of the selection inputs discussed previously above.

In some examples, as shown in FIG. 3M, in response to detecting the selection of the fifth predetermined viewing point 311-5, the electronic device 301 transitions to displaying the three-dimensional representation 304 from the fifth predetermined viewing point in the three-dimensional environment 350. For example, as shown in FIG. 3M, the electronic device 301 transitions to displaying the three-dimensional representation 304 from an overhead (e.g., top-down) view in the three-dimensional environment 350 relative to the viewpoint 318 of the user. In some examples, displaying the three-dimensional representation 304 from the fifth predetermined viewing point includes updating display of the content of the three-dimensional representation 304. For example, as shown in FIG. 3M, the stadium seating is no longer included in the three-dimensional representation 304 (e.g., the stadium seating is faded out of view in the three-dimensional environment 350) and the representations of the baseball players 308 are visible as circular/oval representations (e.g., due to the overhead view). Accordingly, the user of the electronic device 301 may rotate the three-dimensional representation 304 to view an alternative view of the content of the three-dimensional representation 304 by providing input to manually rotate the three-dimensional representation 304 and/or by interacting with one of the plurality of predetermined viewing points 311. Additionally, as shown in FIG. 3M, the electronic device 301 transitions to displaying the three-dimensional representation 304 without changing an orientation of the virtual playback user interface 330 and/or a camera view of the live content displayed in the virtual playback user interface 330 in the three-dimensional environment 350.

In some examples, the predetermined viewing points 311 may alternatively correspond to predetermined perspectives of participants and/or audience members in attendance at the live event in the live content. For example, one or more of the predetermined viewing points 311 may correspond to viewpoints of one or more baseball players participating in the live baseball game, such as a viewpoint of the current pitcher, a viewpoint of the catcher, a viewpoint of the current batter, and/or a viewpoint of a respective player in one of the dugouts along the sideline of the baseball field. As similarly discussed above, selecting one of such predetermined viewing points optionally causes the electronic device 301 to update display of the three-dimensional representation 304, such that the representations of the baseball field 305 and/or the stadium seating 306-1 and 306-2 and the representations of the baseball players 308 are displayed from the player viewpoint associated with the selected predetermined viewing point. Similarly, as an example, one or more of the predetermined viewing points 311 may correspond to viewpoints from particular seats/areas of the baseball stadium at which the live baseball game is being played. For example, one or more of the predetermined viewing points 311 may correspond to a viewpoint from a seat directly behind the home plate, a viewpoint from a seat in the outfield pavilion, a viewpoint from a seat along third base, etc. As similarly discussed above, selecting one of such predetermined viewing points optionally causes the electronic device 301 to update display of the three-dimensional representation 304, such that the representations of the baseball field 305 and/or the stadium seating 306-1 and 306-2 and the representations of the baseball players 308 are displayed from the seat viewpoint associated with the selected predetermined viewing point. In some such examples, additional display data may be required from the content provider (e.g., and/or additional sources) to enable the electronic device 301 to render such unique/detailed views within the live content in the three-dimensional representation 304. Accordingly, providing the predetermined viewing points discussed above may depend on the broadcast data and/or access to camera views at the baseball stadium.

In some examples, interactions directed to the virtual playback user interface 330 that update the current playback position within the live content displayed in the virtual playback user interface 330 may cause a corresponding operation to be performed on the three-dimensional representation 304. In some examples, one such interaction includes changing a playback position within the live content in the three-dimensional environment 350. For example, in FIG. 3N, the electronic device 301 detects a scrubbing input 372G directed to the live content being displayed in the virtual playback user interface 330. In some examples, the scrubbing input 372G includes interaction with one or more playback controls of the virtual playback user interface 330, which optionally include a player bar 329, a player head 334, and a playback affordance 336 (e.g., a play/pause affordance). For example, as shown in FIG. 3N, the electronic device 301 detects a selection of the player head 334, followed by movement of the player head 334 leftward within the player bar 329 in the virtual playback user interface 330 (e.g., corresponding to leftward movement of the hand of the user as similarly described above.

In some examples, as shown in FIG. 3O, in response to detecting the scrubbing input 372G, the electronic device 301 updates the current playback position (e.g., a position of the player head 334) within the live content in accordance with the scrubbing input 372G. For example, as shown in FIG. 3O, the electronic device 301 rewinds the live baseball game, such that the current playback position (e.g., indicated by the player head 334) is no longer at a live edge 331 within the player bar 329. In some examples, when the electronic device 301 updates the current playback position (e.g., indicated by a position of the player head 334) within the live content in accordance with the scrubbing input 372G from FIGS. 3N-3O, the electronic device 301 updates display of the three-dimensional representation 304 based on the updated position of the playback position (e.g., indicated by player head 334). For example, from FIGS. 3N-3O, the electronic device 301 changes a position of one or more representations of the players in the baseball game when rewinding the live baseball game in the virtual playback user interface 330, such as the representation of the left fielder 308-4, the representation of the center fielder 308-5, and the representation of the right fielder 308-6. In some examples, the electronic device 301 resumes playback of the live content in the virtual playback user interface 330 from and displays the three-dimensional representation 304 based on the current playback position (e.g., indicated by the player head 334) within the live content in the three-dimensional environment 350. It should be understood that the three-dimensional representation 304 is similarly updated in response to detecting an input for scrubbing forward within the live content (e.g., if the current playback position (e.g., indicated by the player head 334) is not at the live edge 331, as similarly shown in FIG. 3O).

Another such interaction updating the current playback position within the live content displayed in the virtual playback user interface 330 that causes a corresponding operation to be performed on the three-dimensional representation 304 includes replays (e.g., instant replays) encoded in the broadcast/stream of the live content. For example, in FIG. 3P, while the live baseball game is displayed in the virtual playback user interface 330 in the three-dimensional environment, a respective play (e.g., "Play A") has occurred in which a player on first base has stolen second base (e.g., the player has run from first base to second base while the pitcher was pitching the baseball to home plate). Accordingly, as shown in FIG. 3P, in the three-dimensional representation 304, the representation of the player 308-3 is positioned at second base within the representation of the baseball field 305 after the respective play (Play A) concludes.

In some examples, in FIG. 3Q, the electronic device 301 detects an indication of a replay of the respective play (Play A) from FIG. 3P. For example, the broadcast/streaming data for the live baseball game is encoded with a replay of Play A that causes the replay to be displayed in the virtual playback user interface 330 (e.g., "Replay of Play A"). As mentioned above, the respective play optionally involved the player stealing second base. Accordingly, in FIG. 3Q, when the replay of the respective play is displayed in the virtual playback user interface 330, the player is optionally positioned back on first base (e.g., immediately prior to running toward second base). In some examples, when the electronic device 301 displays the replay of the respective play in the virtual playback user interface 330, the electronic device 301 updates display of the three-dimensional representation 304 in the three-dimensional environment 350 to correspond to the replay. For example, as shown in FIG. 3Q, the representation of the player 308-3 is repositioned at first base in the representation of the baseball field 305 in the three-dimensional representation 304 in accordance with a beginning of the replay of the respective play.

In some examples, as shown in FIG. 3R, displaying the three-dimensional representation 304 in the three-dimensional environment 350 includes displaying information including one or more statistics corresponding to the live content in the three-dimensional environment 350. For example, in FIG. 3R, while concurrently displaying the virtual playback user interface 330 and the three-dimensional representation 304, the electronic device 301 also displays information that includes game statistics 321A, pitching statistics 321B, and batting statistics 321C in the three-dimensional environment 350. In some examples, as shown in FIG. 3R, the game statistics 321A include a respective progress indicator in the live content (e.g., "$7^{th}$" inning), a score for each team (e.g., 2 runs for Team A and 3 runs for Team B), and/or hits for each team (e.g., 5 hits for Team A and 3 hits for Team B). In some examples, the pitching statistics 321B include pitching statistics (e.g., innings pitched, pitch count, and earned run average) for the current pitcher in the baseball game (e.g., "Pitcher A") and the batting statistics 321C include batting statistics (e.g., batting average, hits and at-bats) for the current batter in the baseball game (e.g., "Player B"). In some examples, as the live content progresses, the information included in the game statistics 321A, pitching statistics 321B, and/or batting statistics 321C optionally update in accordance with the live content updates. For example, if one of the teams scores a run, the total run count will be updated for the team in the game statistics 321A, or if a new pitcher and/or batter joins the baseball game, the statistics included in the pitching statistics 321B and/or the batting statistics 321C will update to correspond to the new player. Additionally, in some examples, as similarly shown in FIG. 3R, the information including the one or more statistics corresponding to the live content may be displayed in windows or other user interface elements that are movable within the three-dimensional environment 350 in response to user input (e.g., such as a movement input as similarly discussed previously herein).

In some examples, the electronic device 301 displays the information including the one or more statistics shown in FIG. 3R based on the broadcast/streaming data provided by the content provider of the live content. For example, the broadcast/streaming data may be encoded with data for displaying and/or updating the statistics displayed in the three-dimensional environment 350. In some examples, the electronic device 301 displays the information including the one or more statistics based on information extracted from web-based sources. For example, the electronic device 301 generates the game statistics 321A, the pitching statistics 321B, and/or the batting statistics 321C using game and/or player data accessed via the internet during the display of the live baseball game in the virtual playback user interface 330.

It should be understood that, in some examples, additional or alternative information corresponding to the live content may be displayed in the three-dimensional environment 350 as supplemental content for the live content. For example, the electronic device 301 may display information indicating each team's place in the standings (e.g., based on record), a lineup of players for each team, coaching/manager information for each team, information for the stadium in which the baseball game is being played, etc.

In some examples, displaying the three-dimensional representation 304 in the three-dimensional environment 350 includes displaying a virtual animation effect based on one or more events in the live content. For example, in FIG. 3S, while the live baseball game is being played back in the virtual playback user interface 330 in the three-dimensional environment 350, one of the teams (e.g., Team B) scores a run. Accordingly, as shown in FIG. 3S, the electronic device 301 updates display of the three-dimensional representation 304 such that the representation of the player 308-3 who scored the run for Team B is positioned at home plate in the representation of the baseball field 305. In some examples, when Team B scores the run in the live baseball game, the electronic device 301 displays a virtual animation effect 341 in the three-dimensional environment 350 as an indication that Team B has scored. For example, the electronic device 301 displays virtual fireworks and/or virtual confetti in the three-dimensional environment 350 as shown in FIG. 3S. In some examples, the display of the virtual animation effect 341 is accompanied by audio (e.g., spatial or stereo audio) corresponding to the virtual animation effect 341 (e.g., the sound of fireworks going off or the sound of confetti popping). In some examples, as shown in FIG. 3S, the electronic device 301 displays a message element 339 along with the virtual animation effect 341 indicating that Team B has scored (e.g., "Team B scores!").

In some examples, the display of the virtual animation effect 341 (e.g., and/or the message element 339) is based on one or more game preferences set by the user of the electronic device 301. For example, the electronic device 301 displays the virtual animation effect 341 because the user is a supporter or fan of Team B, and this preference has been shared with or otherwise made known to the electronic device 301 (e.g., in response to user input). Accordingly, in some examples, if the other team (e.g., Team A) scores a run in the live baseball game, the electronic device 301 would forgo displaying the virtual animation effect 341 and/or the message element 339 in the three-dimensional environment 350, or display a negative reactionary (e.g., unhappy, angry, etc.) virtual animation effect or message element.

In some examples, the one or more events discussed above may be recorded and/or compiled by the electronic device 301 into a highlights reel for the live content that is accessible to the user and/or shareable by the user. For example, the electronic device 301 may generate the highlight reel for events pertinent to the team of which the user is a fan (e.g., based on the one or more game preferences discussed above) or generates the highlight reel for events pertinent to both teams competing in the baseball game. In some examples, the electronic device 301 generates the highlights reel based on audience/crowd reaction during playback of the live content. For example, if the broadcast/streaming data for the live content includes auditory indications of crowd reaction (e.g., cheers, screams, clapping, etc.), the electronic device 301 saves the portion of the live baseball game that solicited the crowd reaction (e.g., a homerun, a base hit, a stolen base, etc.) for adding to the highlights reel. In some examples, the electronic device 301 generates a highlight reel that is specific to a participant in the live content. For example, the electronic device 301 generates a highlight reel for a baseball player based on the one or more game preferences discussed above (e.g., a favorite player of the user) and utilizes character (e.g., text) recognition to identify the player based on the player's jersey number to determine which portions of the live baseball game to save and add to the highlight reel.

It should be understood that, though the three-dimensional representation 304 discussed above represents a baseball stadium during a live baseball game, alternative representations may be provided for alternative media. For example, if a live basketball game is displayed in the virtual playback user interface 330, the three-dimensional representation 304 may include a representation of the basketball arena at which the game is being played and/or representations of basketball players participating in the game. As another example, if a live stream of a concert is displayed in the virtual playback user interface 330, the three-dimensional representation 304 may include a representation of the concert venue, including the stage, and representations of the performer(s) and an indication of the size of the audience (e.g., without displaying any identifying features for particular members of the audience (e.g., for privacy)).

Accordingly, as described above, while displaying the two-dimensional live content in the virtual playback user interface 330, the electronic device 301 may display supplemental three-dimensional content (e.g., the three-dimensional representation 304) that is associated with the two-dimensional live content and that is configured to be interacted with independently of interaction with the two-dimensional live content in the three-dimensional environment 350. As showcased by way of example in the description above, displaying the supplemental three-dimensional and two-dimensional content that is associated with the live content provides varying levels of context (e.g., information) of the live content that is being played back in the three-dimensional environment, including content that otherwise would be unavailable from just the broadcast of the live content, which helps improve the viewing experience of the user. Additionally, displaying the supplemental content that is associated with the live content reduces the number of inputs needed to view particular information (e.g., statistics, participant information, venue information, etc.), which improves user-device interaction, as another benefit.

Attention is now directed to example interactions involving supplemental content that includes a three-dimensional representation of a participant in a live content item that is being played back in a three-dimensional environment (e.g., an extended reality environment).

Figure 4A:
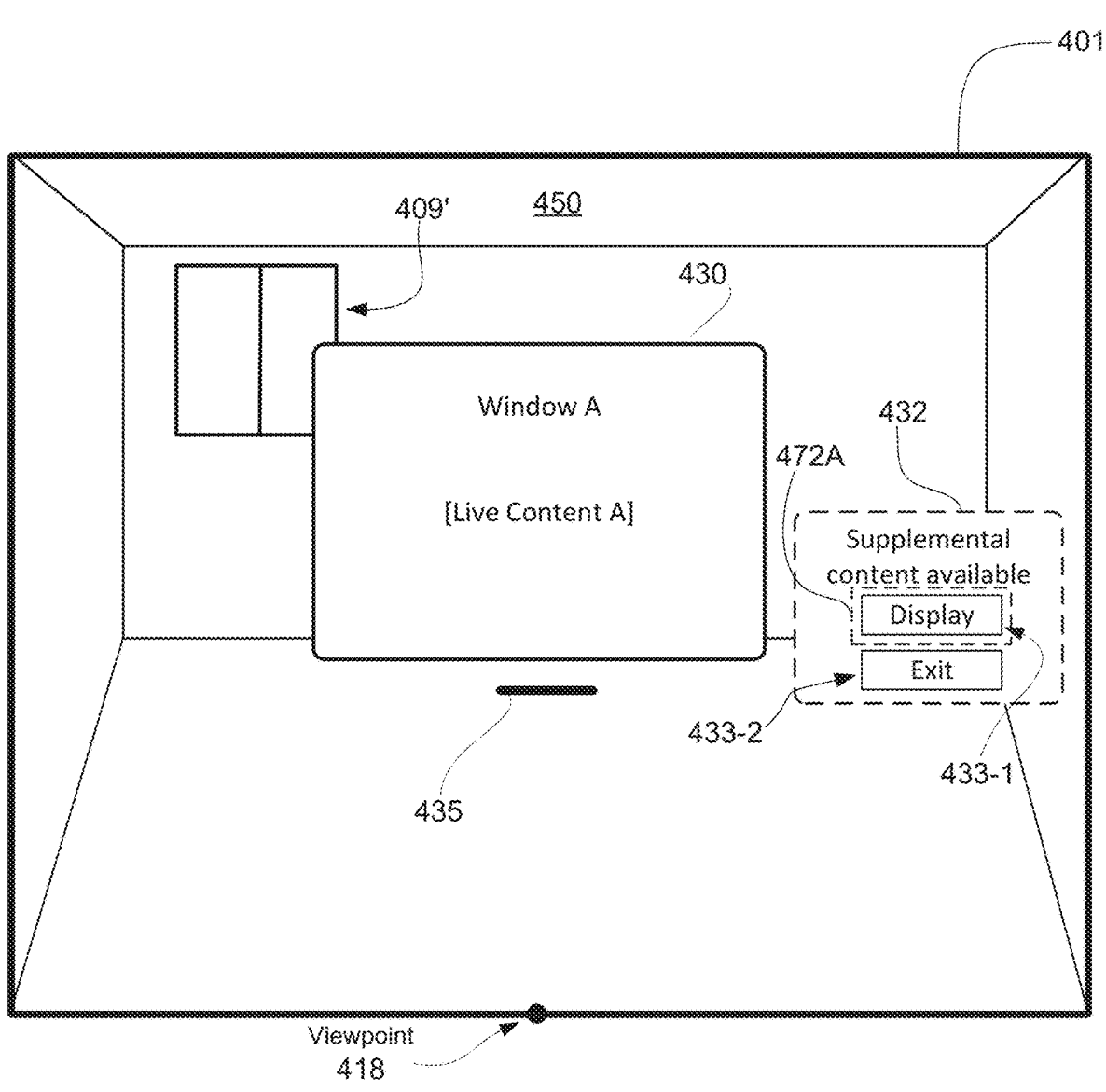
FIGS. 4A-4M illustrate example interactions involving concurrent display of live event content and supplemental content that is associated with the live event content in a computer-generated environment according to some examples of the disclosure.

FIGS. 4A-4M illustrate example interactions involving concurrent display of live event content and supplemental content that is associated with the live event content in a computer-generated environment according to some examples of the disclosure. In some examples, as shown in FIG. 4A, a three-dimensional environment 450 (e.g., an extended reality environment) may be presented using electronic device 401. In some examples, the electronic device 401 optionally corresponds to electronic device 301 discussed above. In some examples, the three-dimensional environment 450 includes captured portions of the physical environment in which electronic device 401 is located. For example, the three-dimensional environment 450 optionally includes a window (e.g., a representation of window 409') and ceiling, floor and walls (e.g., representations of the ceiling, floor and walls), as shown in FIG. 4A. In some examples, the three-dimensional environment 450 optionally corresponds to three-dimensional environment 350 described above. In some examples, the representations of the physical environment can include portions of the physical environment viewed through a transparent or translucent display of electronic device 401 as passthrough.

As similarly discussed above, in some examples, the three-dimensional environment 450 may include one or more virtual objects that are associated with a video playback application operating on the electronic device 401. For example, as shown in FIG. 4A, the three-dimensional environment 450 at the electronic device 401 may include virtual playback user interface 430 that is configured to display video content in the three-dimensional environment 450. As shown in FIG. 4A, the virtual playback user interface 430 is displaying live content (e.g., "Live Content A") in the three-dimensional environment 450. In the examples of FIGS. 4A-4M, as similarly discussed above, the live content corresponds to a live baseball game that is being broadcasted/streamed live by a content provider (e.g., a network, channel, company, etc.) of the live baseball game. In some examples, the virtual playback user interface 430 corresponds to the virtual playback user interface 330 described above. In some examples, the live content corresponds to the live content discussed above. Additionally, as shown in FIG. 4A, the electronic device 401 is optionally displaying notification element 432 that notifies the user of the electronic device 401 that supplemental content for the live content is available for viewing in the three-dimensional environment 450. As shown in FIG. 4A, the notification element 432 optionally includes a first option 433-1 that is selectable to display the supplemental content in the three-dimensional environment 350 and a second option 433-2 that is selectable to cease display of the notification element 432 and forgo displaying the supplemental content in the three-dimensional environment 450. In some examples, the notification element 432 corresponds to the notification element 332 discussed above.

Figure 4B:
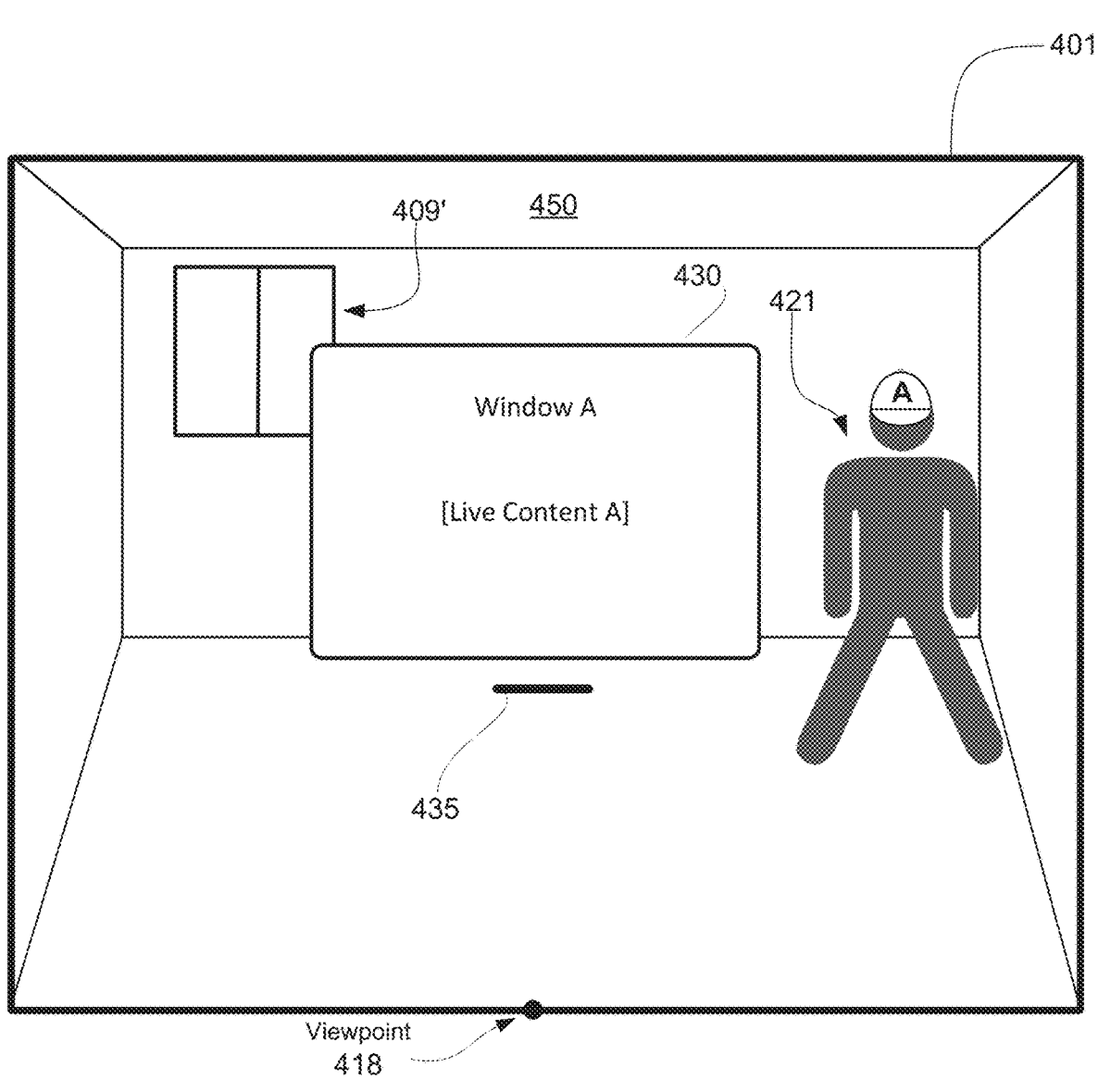

In FIG. 4A, while displaying the notification element 432 in the three-dimensional environment 450, the electronic device 401 detects a selection input 472A directed to the first option 433-1 in the notification element 432. For example, the electronic device 401 detects an air pinch gesture (e.g., in which an index finger and a thumb of a hand of the user come together and make contact) or an air tap or touch gesture (e.g., provided by an index finger of the hand), optionally while a gaze of the user is directed to the first option 433-1, a verbal command, a gaze and dwell, etc. In some examples, as shown in FIG. 4B, in response to detecting the selection of the first option 433-1 in the notification element 432, the electronic device 401 displays supplemental content for the live content in the three-dimensional environment 450, as discussed below.

In some examples, displaying the supplemental content in the three-dimensional environment 450 includes displaying a three-dimensional representation 421 of a first participant in the live content. For example, in FIG. 4B, the first participant is a first baseball player participating in the live baseball game that is being displayed in the virtual playback user interface 430. In some examples, the three-dimensional representation 421 of the first participant is generated and displayed based on one or more physical characteristics of the first participant. For example, a size of the three-dimensional representation 421 corresponds to (e.g., is equal to or is proportional to) a size (e.g., height, weight, width, etc.) of the first baseball player in the physical world. Accordingly, in some examples, the three-dimensional representation 421 is a three-dimensional "life-size" rendering of the first participant that is displayed in the three-dimensional environment 450. Additionally, the three-dimensional representation 421 of the first participant includes one or more visual features of the first participant. For example, the three-dimensional representation 421 is displayed wearing a uniform of the first baseball player, such as a jersey and baseball hat, as similarly shown in FIG. 4B. In some examples, one or more facial features of the three-dimensional representation 421 is based on one or more facial features of the first participant (e.g., facial structure, eye color, nose shape, etc.).

In some examples, the electronic device 401 displays the three-dimensional representation 421 of the first participant based on display data encoded in the broadcast/streaming data for the live content. For example, as similarly discussed above, display data for generating and/or displaying the three-dimensional representation 421 in the three-dimensional environment 450 is provided by the content provider for the live content and is integrated in the broadcast data that is readable by the video playback application. In some examples, the electronic device 401 is configured to generate and display the three-dimensional representation 421 based on the display data read and provided by the video playback application. In some examples, the display data corresponds to volumetric data that is generated based on image data used to create the broadcast/stream of the live content. For example, the volumetric data is generated based on images captured by a plurality of cameras (e.g., the camera feed) at the baseball stadium in which the baseball game is being played. In some examples, the electronic device 401 generates and displays the three-dimensional representation 421 by virtually reconstructing the first baseball player based on images of the baseball stadium and the baseball players included in the camera feed. Additionally or alternatively, in some examples, the display data corresponds to joint-based data that is generated based on known (e.g., stored) characteristics of the participants in the live content. For example, the joint-based data is generated based on known physical features of the first baseball player (e.g., based on skeletal tracking and/or player statistics (e.g., player height, weight, name, jersey number, facial features, etc.)). In some examples, the electronic device 401 generates and displays the three-dimensional representation 404 by virtually reconstructing the baseball players based on their known physical features, rather than relying exclusively on the camera feed from the baseball game.

In some examples, the display of the three-dimensional representation 421 of the first participant is based on one or more game preferences set by the user of the electronic device 401 (e.g., in addition to being based on the display data discussed above). For example, the electronic device 401 displays the three-dimensional representation 421 of the first player because the user is a supporter or fan of the team to which the first player belongs (e.g., Team A), and this preference has been shared with or otherwise made known to the electronic device 401 (e.g., in response to user input). In some examples, the first player has previously been added to a list of "Favorite Players" within the video playback application (or a secondary application that communicates with the video playback application), and display of the three-dimensional representation 421 is triggered (e.g., which includes displaying the notification element 432 above) in accordance with a determination that the first player is actively participating in the live baseball game.

Figure 4C:
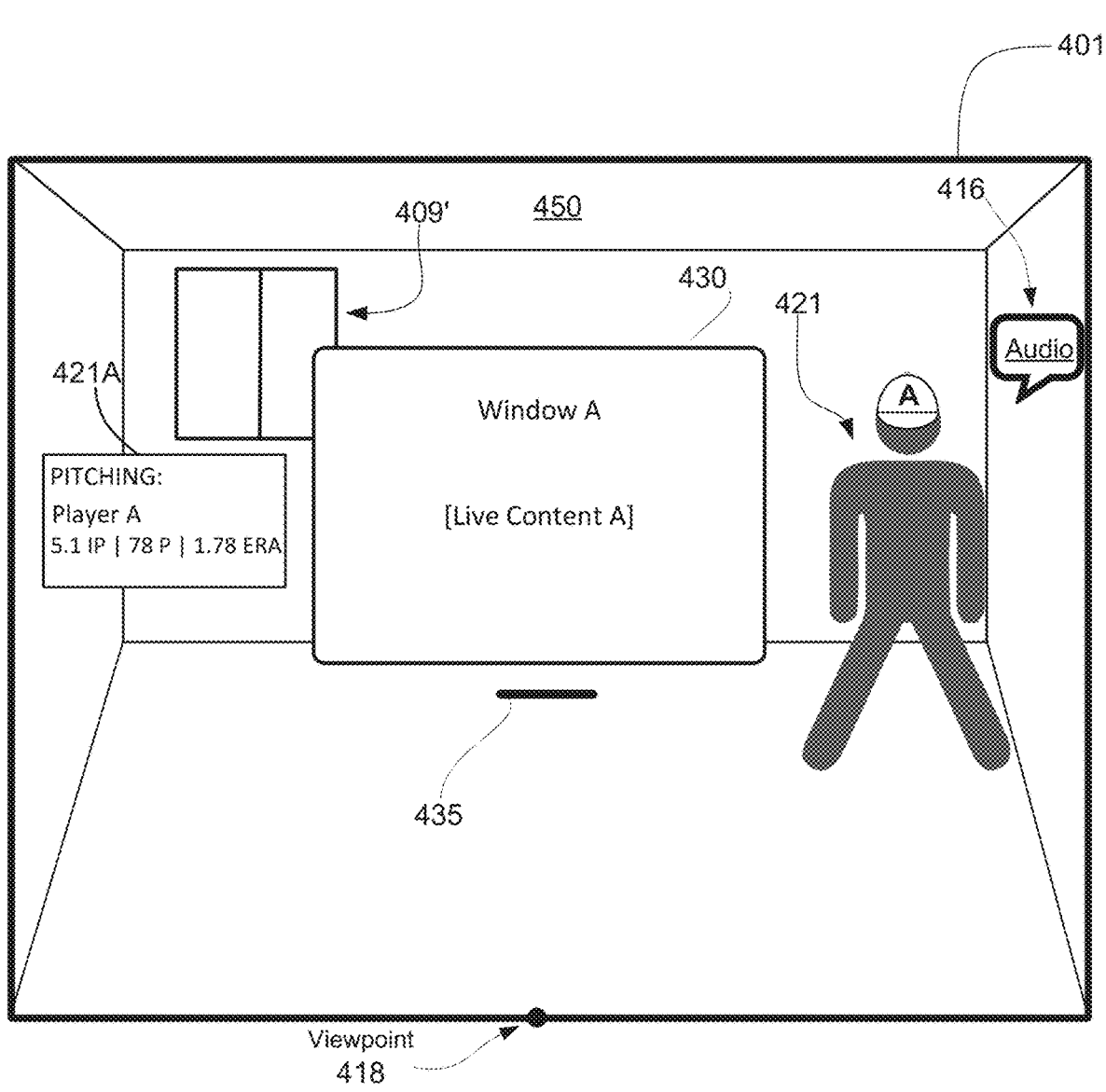

In some examples, displaying the three-dimensional representation 421 of the first participant includes displaying information including one or more statistics corresponding to the first participant in the three-dimensional environment 450. For example, as shown in FIG. 4C, the electronic device 401 displays information including first statistics 421A in the three-dimensional environment 450. In some examples, the display of the first statistics 421A has one or more characteristics of the display of the pitching statistics 321B discussed above. In some examples, the one or more statistics displayed in the three-dimensional environment 450 are specific to the first participant. For example, in FIG. 4C, the first statistics 421A include pitching statistics (e.g., innings pitched, pitch count, and earned run average) because the first baseball player is a pitcher. In some examples, the first statistics 421A include statistics specific to the baseball game being displayed in the virtual playback user interface 430, statistics specific to a career of the first baseball player, and/or statistics specific to a current season of play for the first baseball player.

Additionally, in some examples, displaying the three-dimensional representation 421 of the first participant in the three-dimensional environment 450 includes presenting audio 416 corresponding to the first participant. For example, in FIG. 4C, the electronic device 401 outputs spatial audio (e.g., audio that is output such that it appears to originate from a location of the three-dimensional representation 421 in the three-dimensional environment 450) or stereo audio (e.g., traditional audio that is output via one or more speakers of the electronic device 401) that mimics a voice of the first baseball player. In some examples, the audio 416 is presented based on a recording of the first participant. In some examples, the audio 416 includes a catchphrase or a tagline that is specific to the first baseball player. In some examples, as discussed in more detail below, the audio 416 corresponds to an action or operation of the three-dimensional representation 421 in the three-dimensional environment 450. For example, because the first participant is a baseball player in the live baseball game being played back in the three-dimensional environment 450, the audio 416 includes sound generated from (e.g., virtually generated and/or recorded based on) a baseball hitting a catcher's mitt and/or a baseball bat hitting the baseball.

Figure 4D:
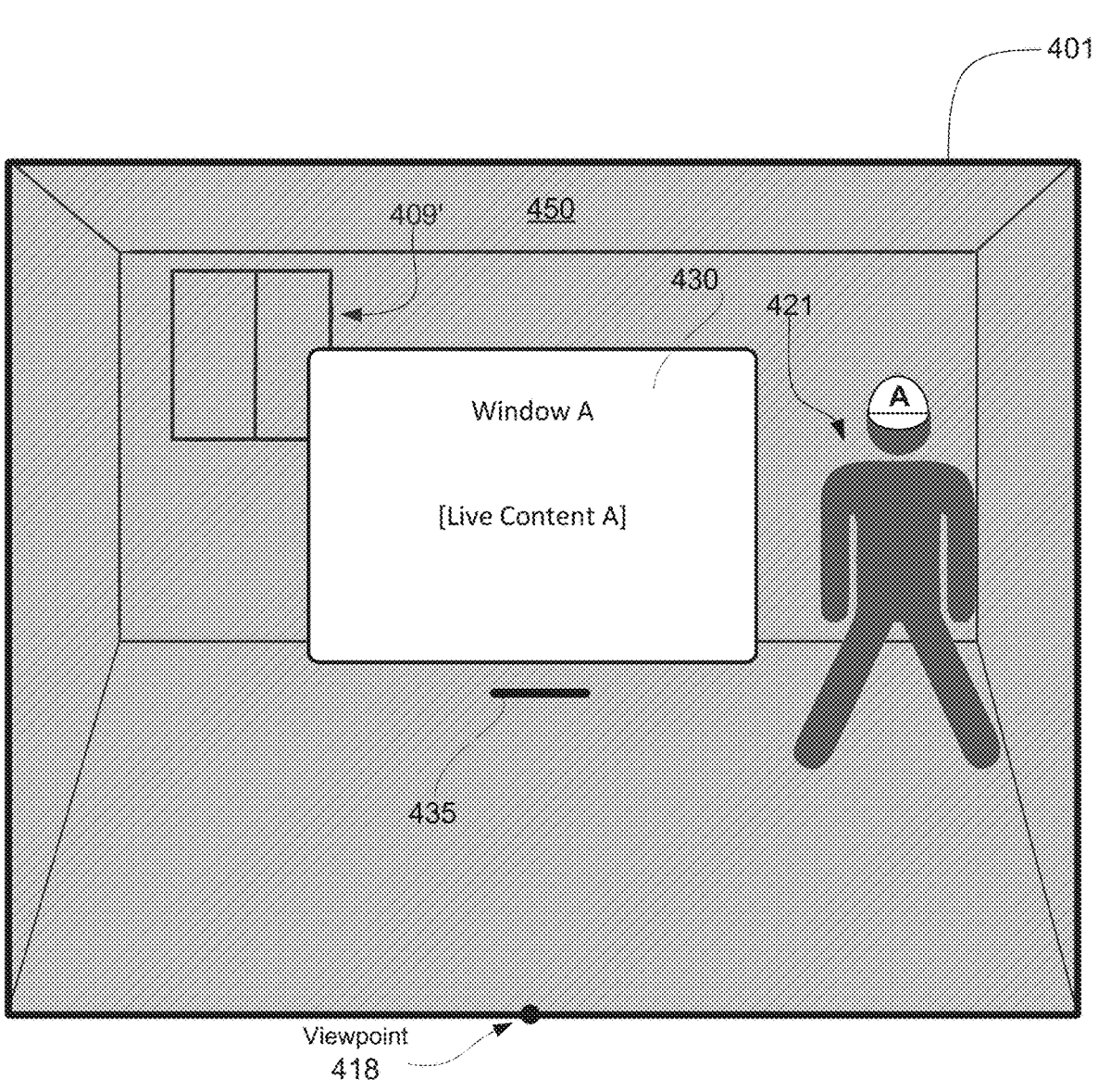

In some examples, as shown in FIG. 4D, displaying the three-dimensional representation 421 of the first participant in the three-dimensional environment 450 includes applying a visual effect to portions of the three-dimensional environment 450 surrounding the virtual playback user interface 430 and the three-dimensional representation 421. In some examples, applying the visual effect includes applying a visual tint or filter to the three-dimensional environment 450, as shown in FIG. 4D. For example, the electronic device 401 tints the passthrough of the three-dimensional environment 450 with a color, brightness, saturation, and/or translucency that draws the attention of the user toward the three-dimensional representation 421 and/or the live content displayed in the virtual playback user interface 430. In some examples, the electronic device 401 tints the passthrough of the three-dimensional environment 450 based on a color associated with the team to which the first participant belongs. For example, in FIG. 4D, if the color of the logo of Team A is blue, the electronic device 401 tints the passthrough using a blue or blueish tint.

Figure 4E:
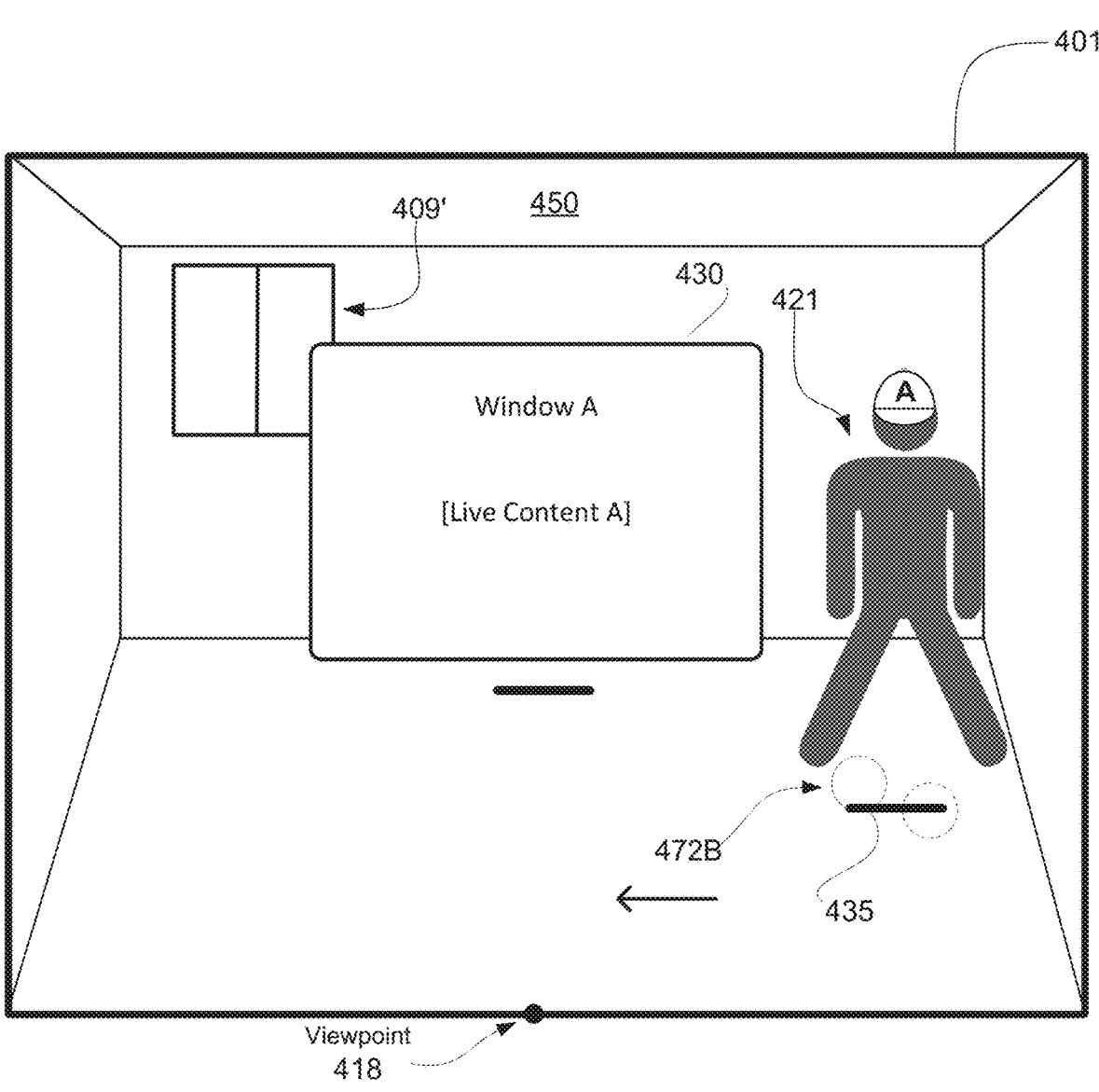

In some examples, the three-dimensional representation 421 of the first participant is configured to be movable within the three-dimensional environment 450. For example, as shown in FIG. 4E, the three-dimensional representation 421 may be displayed with a grabber bar 435 (e.g., a handlebar affordance) that is selectable to initiate movement of the three-dimensional representation 421 within the three-dimensional environment 450. In FIG. 4E, the electronic device 401 detects a movement input 472B directed to the three-dimensional representation 421. For example, as shown in FIG. 4E, the electronic device 401 detects a selection of the grabber bar 435, followed by movement of the grabber bar 435 leftward in the three-dimensional environment 450 relative to a viewpoint 418 of the user. In some examples, the movement input 472B has one or more characteristics of movement inputs described previously above.

Figure 4F:
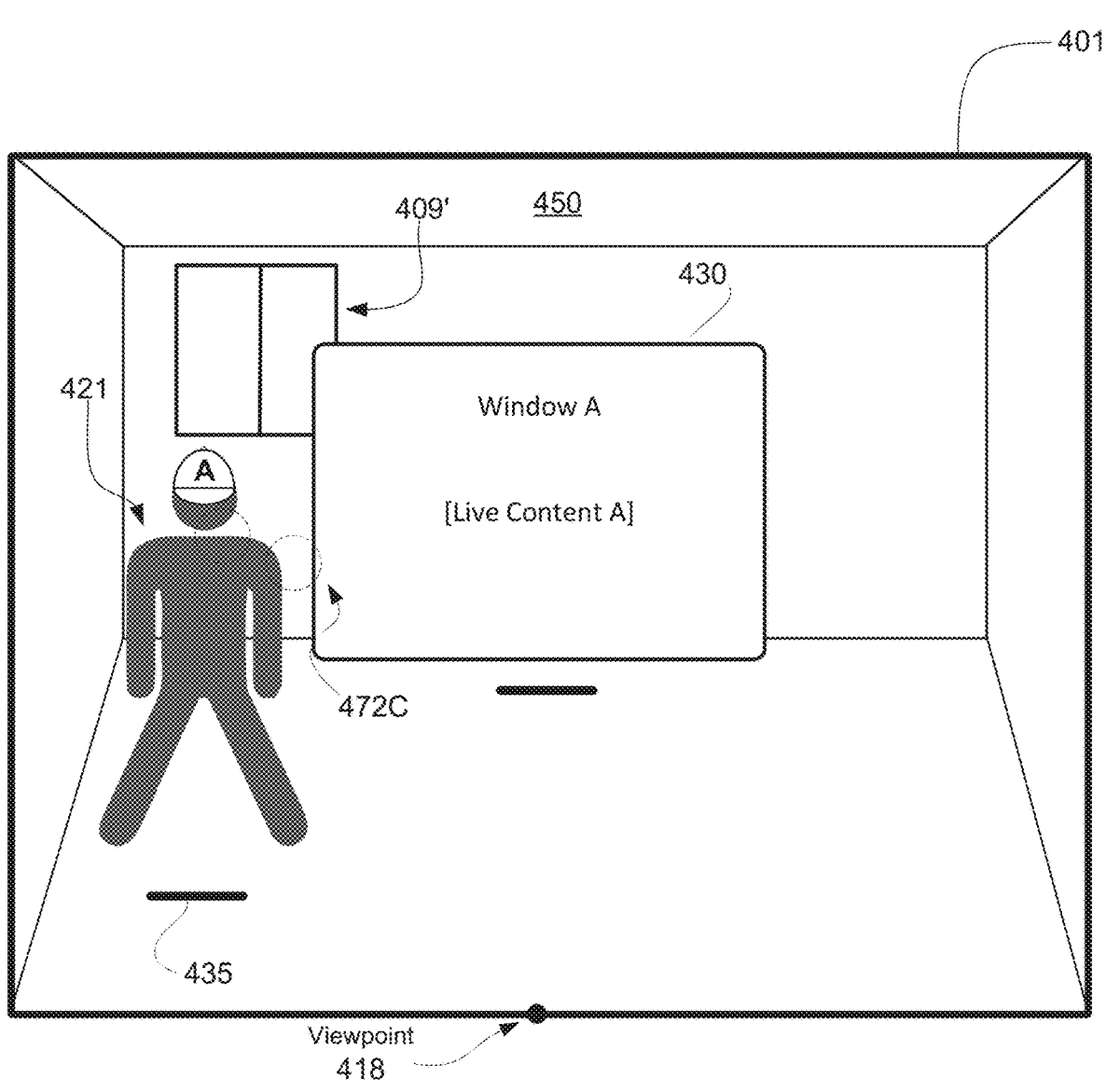

In some examples, as shown in FIG. 4F, in response to detecting the movement input 472B, the electronic device 401 moves the three-dimensional representation 421 in accordance with the movement input 472B. For example, as shown in FIG. 4F, the electronic device 401 moves the three-dimensional representation 421 leftward in the three-dimensional environment 450 relative to the viewpoint 418. Additionally, as shown in FIG. 4F, the electronic device 401 moves the three-dimensional representation 421 without moving the virtual playback user interface 430 in the three-dimensional environment 450.

In some examples, the three-dimensional representation 421 of the first participant may be configured to perform one or more operations within the three-dimensional environment 450. In some examples, as discussed below, the one or more operations are performed based on one or more physical capabilities (e.g., skills) of the first participant. In FIG. 4F, the electronic device 401 detects a selection input 472C directed to the three-dimensional representation 421, as similarly discussed above. In some examples, the electronic device 401 alternatively detects an indication of a replay in the live content. For example, the electronic device 401 detects playback of a replay in the live baseball game of a respective play, as similarly discussed above.

Figure 4G:
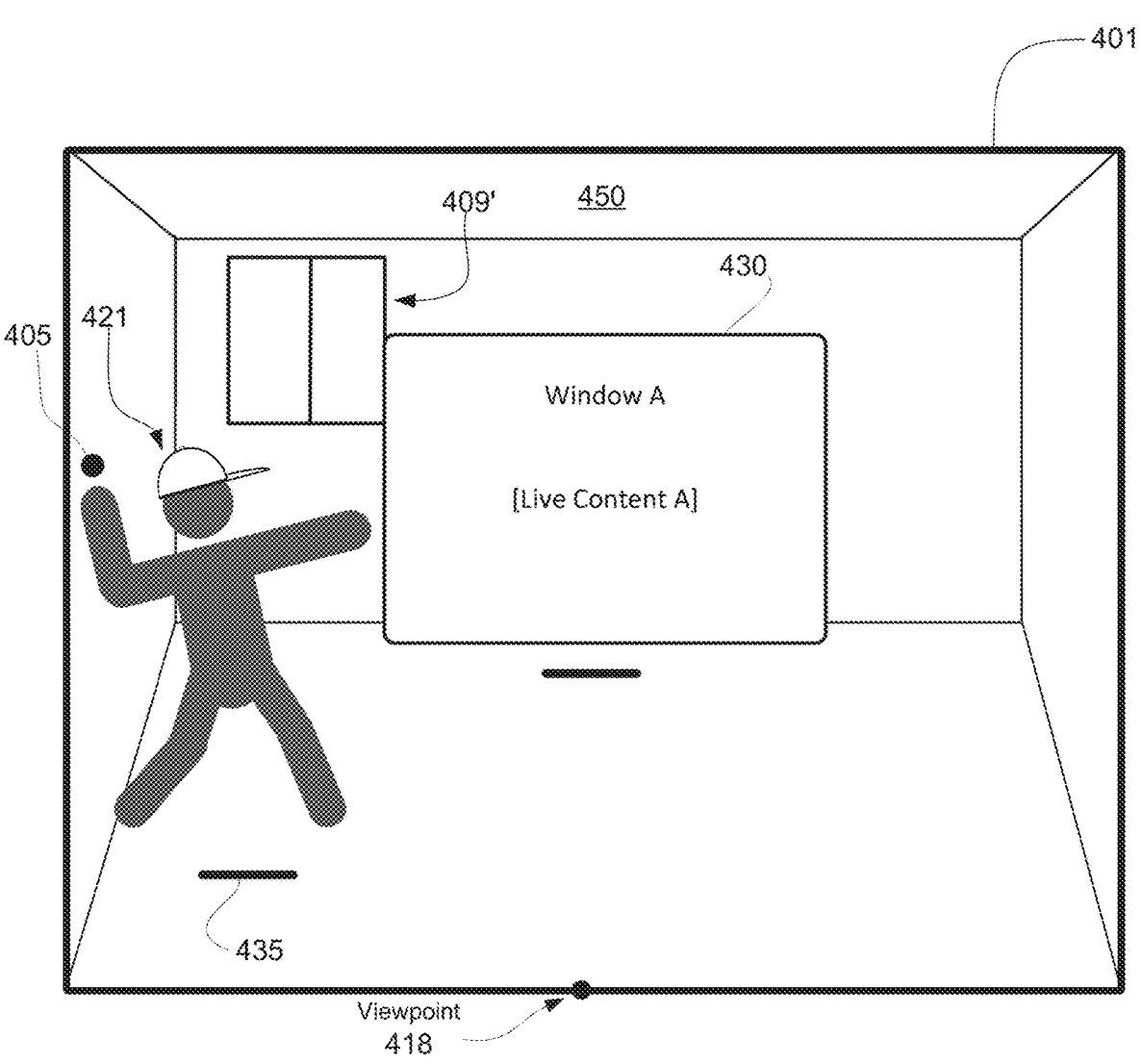

In some examples, as shown in FIG. 4G, in response to detecting the selection of the three-dimensional representation 421 and/or detecting the indication of the replay in the live content, the electronic device 401 causes the three-dimensional representation 421 to perform a first operation in the three-dimensional environment 450. For example, as shown in FIG. 4G, the first operation is specific to the first baseball player, such as pitching a baseball (e.g., represented by virtual baseball 405). Accordingly, from FIGS. 4G-4H, the three-dimensional representation 421 performs the operation of pitching the virtual baseball 405 in accordance with the detection of the selection and/or the indication of the replay. For example, the three-dimensional representation 421 performs the first operation based on the display data that is encoded in the broadcast/streaming data for the live content, as similarly discussed above, and which is triggered in response to detecting the selection and/or the indication of the replay. In some examples, the first operation (e.g., the pitching operation) corresponds to the respective play that is being replayed in the live content. For example, the respective play includes the first player (e.g., the pitcher) pitching a 101-mph fast ball, as indicated in message element 439 in FIG. 4H. Accordingly, when the respective play is replayed in the broadcast/stream of the live baseball game, the electronic device 401 optionally causes the three-dimensional representation 421 to act out/ mimic the respective play, namely pitching the 101-mph fast ball, as shown from FIGS. 4G-4H. In some examples, the pitching of the virtual baseball 405 is performed by the three-dimensional representation 421 as it would be performed in "real time" in the physical world. For example, when the three-dimensional representation 421 moves in the three-dimensional environment to simulate pitching the virtual baseball 405, the movement of the three-dimensional representation 421 and/or the movement of the virtual baseball 405 is modeled after such interactions in the physical world, such that the virtual baseball 405 visually appears to move rightward in the three-dimensional environment 450 relative to the viewpoint 418 with a speed of 101 mph (e.g., including a curvature, elevation (e.g., relative to gravity), and/or point of contact of the movement of the virtual baseball 405), optionally from a different viewing point compared to the camera feed of the live content. In other examples, the pitching of the virtual baseball 405 is performed by the three-dimensional representation 421 in slow motion, as it can appear to do in a replay. Accordingly, as discussed above, in some examples, the electronic device 401 causes the three-dimensional representation 421 to perform the first operation (e.g., the pitching operation) based on one or more physical capabilities of the first participant in the physical world (e.g., in the live event of the live content).

Figure 4H:
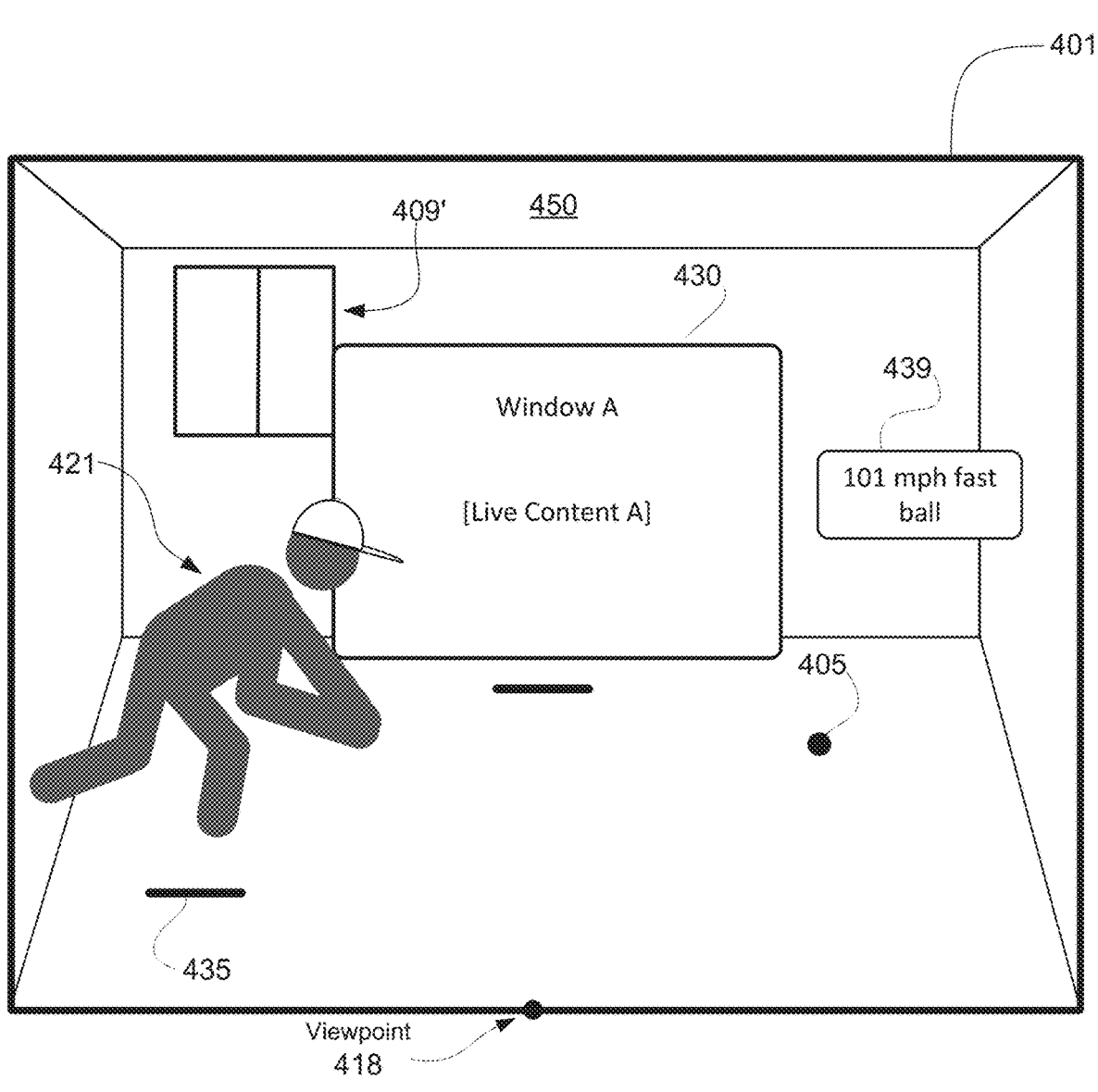
Figure 4I:
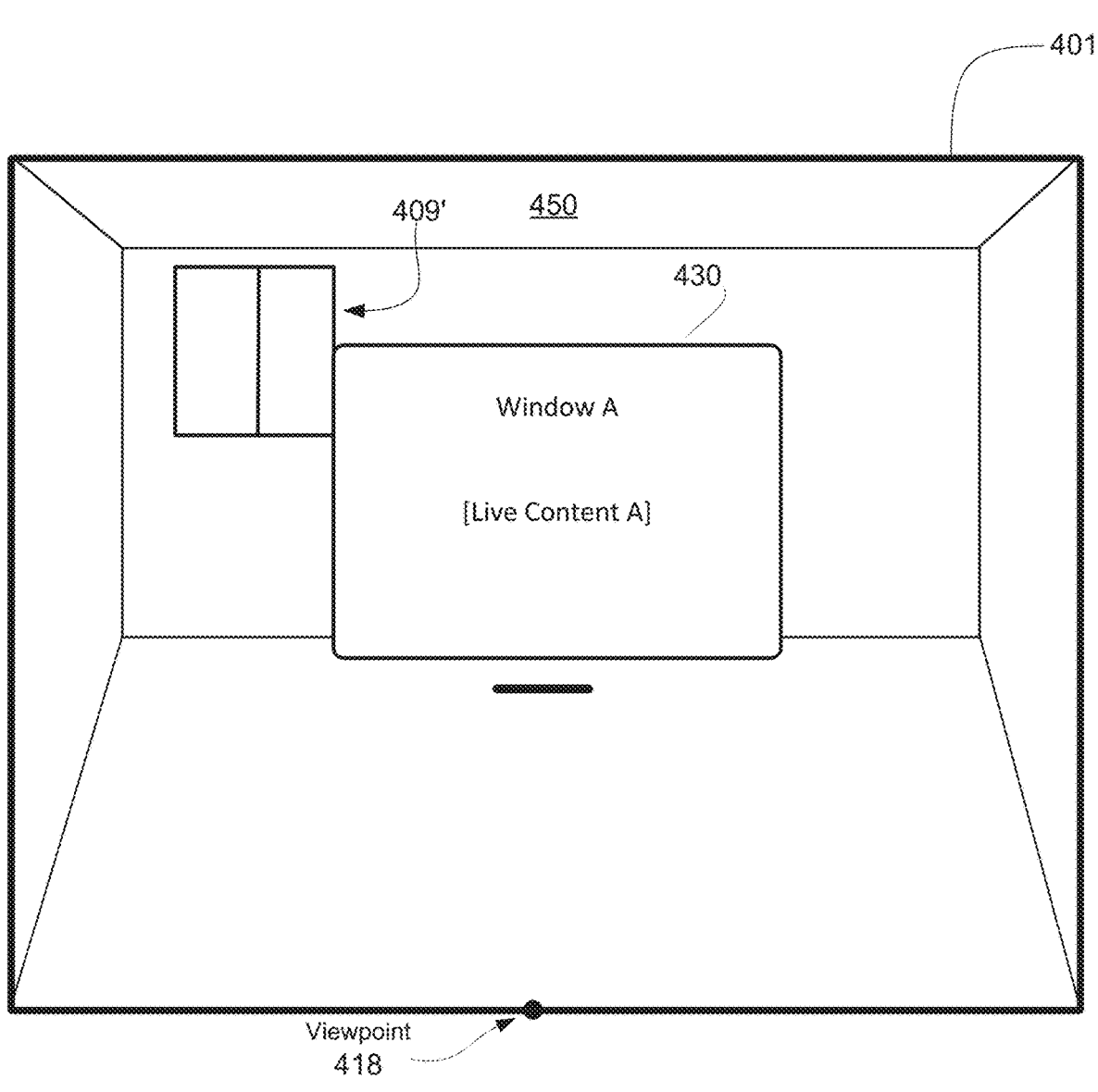
Figure 4J:
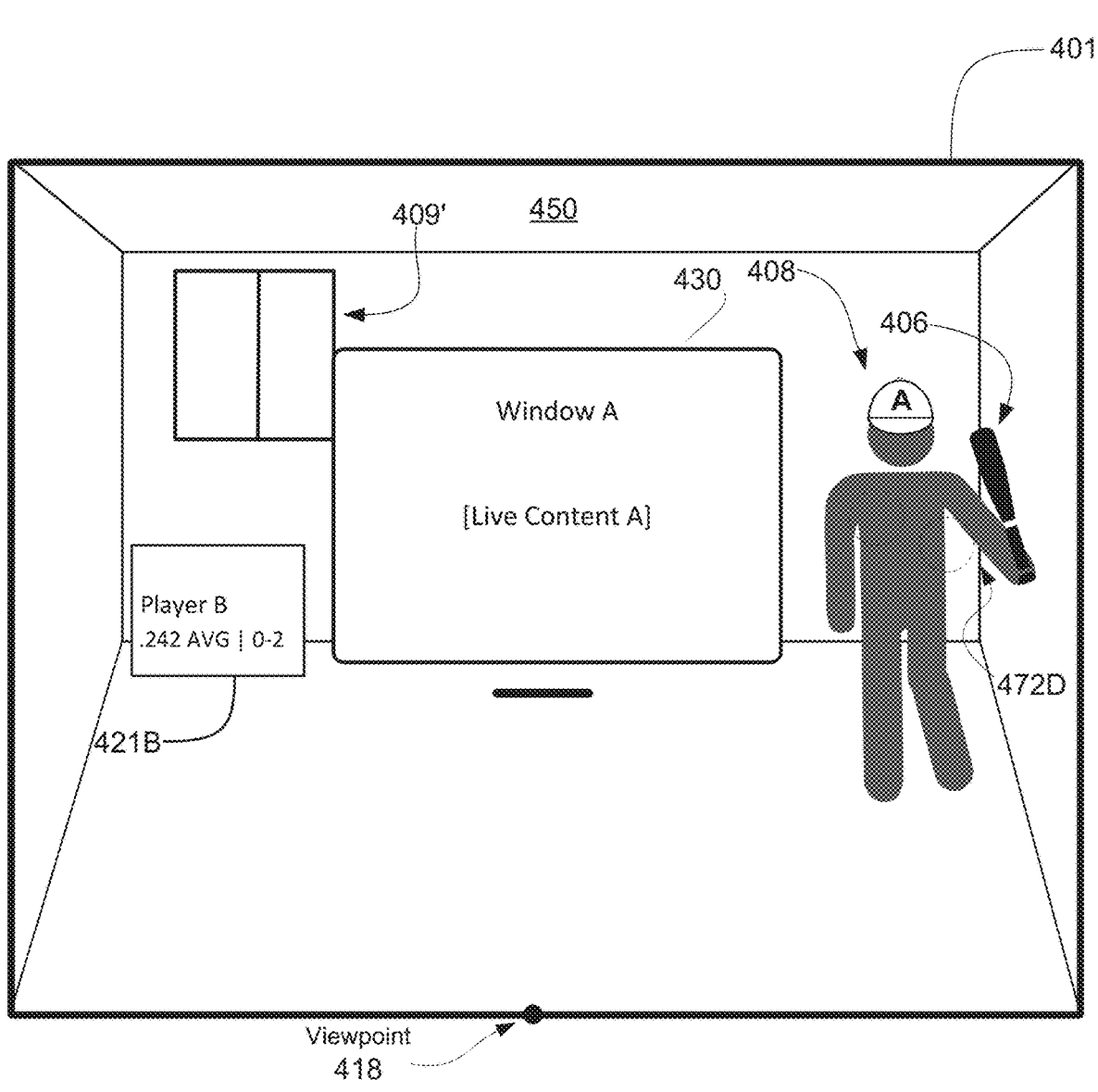

As mentioned above, the electronic device 401 optionally displays the three-dimensional representation 421 of the first participant based on display data that is encoded in the broadcast/streaming data for the live content (e.g., provided by the content provider for the live content). In some examples, the electronic device 401 ceases display of the three-dimensional representation 421 based on the display data encoded in the broadcast/streaming data. For example, in FIG. 4I, while the live baseball game is displayed in the virtual playback user interface 430, the electronic device 401 ceases display of the three-dimensional representation 421 in the three-dimensional environment 450 after determining that the first player is no longer actively participating in the baseball game (e.g., the first player is no longer pitching). In some examples, as shown in FIG. 4J, when the electronic device 401 ceases displaying the three-dimensional representation 421 of the first participant, the electronic device 401 displays a three-dimensional representation 408 of a second participant, different from the first participant, in the three-dimensional environment 450. For example, in FIG. 4J, the electronic device 401 displays a three-dimensional representation of a second player who is participating in the live baseball game being displayed in the virtual playback user interface 430. In some examples, as similarly discussed above with reference to the three-dimensional representation 421, the electronic device 401 displays the three-dimensional representation 408 of the second participant based on display data encoded in the broadcast/streaming data for the live content and/or based on one or more game preferences set by the user of the electronic device 401 (e.g., the second participant that is represented by the three-dimensional representation 408 is a member of the same team as the first participant discussed above (e.g., Team A).

In some examples, the three-dimensional representation 408 is displayed with information including one or more statistics corresponding to the second participant in the three-dimensional environment 450. For example, in FIG. 4J, the electronic device 401 displays second statistics 421B, different from the first statistics 421A discussed above, that include batting statistics (e.g., batting average, hits and at-bats) because the second player is a current batter in the live baseball game (e.g., as indicated by virtual baseball bat 406 that is displayed with the three-dimensional representation 408). In some examples, the display of the second statistics 421B has one or more characteristics of the display of the batting statistics 321B discussed previously above. It should be understood that the description and behaviors provided above with reference to the three-dimensional representation 421 of the first participant optionally apply to the three-dimensional representation 408 of the second participant. For example, the three-dimensional representation 408 is configured to perform a respective operation in the three-dimensional environment (e.g., swinging the virtual baseball bat 406) in response to detecting a trigger (e.g., selection input and/or indication of a replay), and/or is movable within the three-dimensional environment 450, as similarly discussed above.

In some examples, the three-dimensional representation 408 is selectable to initiate a process for generating and saving a virtual figurine of the three-dimensional representation 408. For example, in FIG. 4J, the electronic device 401 detects a selection input 472D directed to the three-dimensional representation 408 in the three-dimensional environment 450. In some examples, the electronic device 401 detects a selection and hold directed to the three-dimensional representation 408 (e.g., a hold of the air pinch gesture for a threshold amount of time, such as 1, 2, 3, 4, 5, etc. seconds).

Figure 4K:
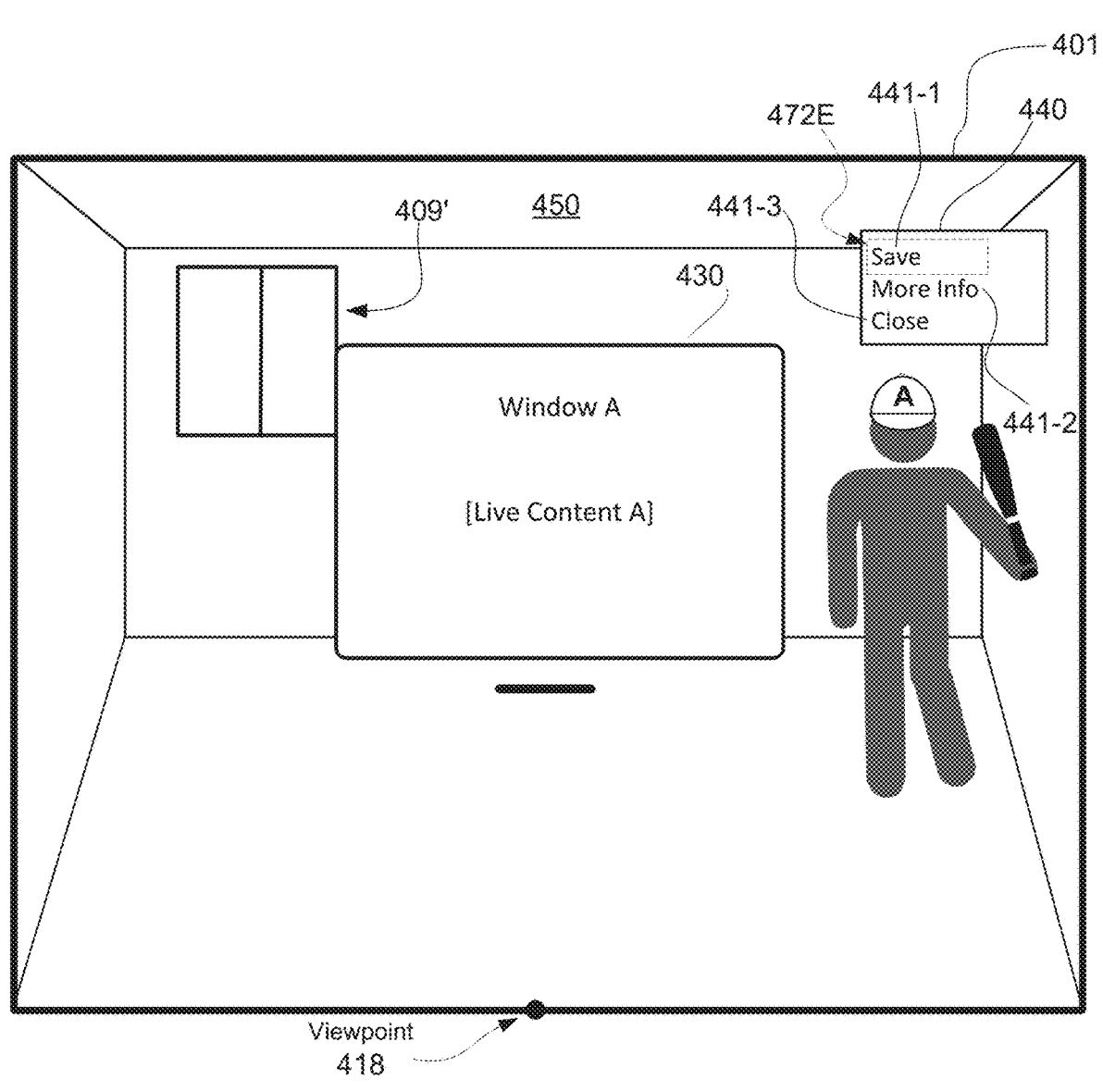

In some examples, in response to detecting the selection input 472D, the electronic device 401 displays menu 440 that includes a plurality of selectable options. For example, as shown in FIG. 4K, the electronic device 401 displays the menu 440 that includes a first option 441-1 that is selectable to save the three-dimensional representation 408 as a virtual figurine, a second option 441-2 that is selectable to display additional information corresponding to the second player (e.g., statistics, height and weight, age, hometown, career span, etc.), and a third option 441-3 that is selectable to cease display of the menu 440 in the three-dimensional environment 450. In FIG. 4K, while displaying the menu 440 in the three-dimensional environment 450, the electronic device 401 detects a selection input 472E (e.g., as similarly discussed above) directed to the first option 441-1 in the menu 440.

Figure 4L:
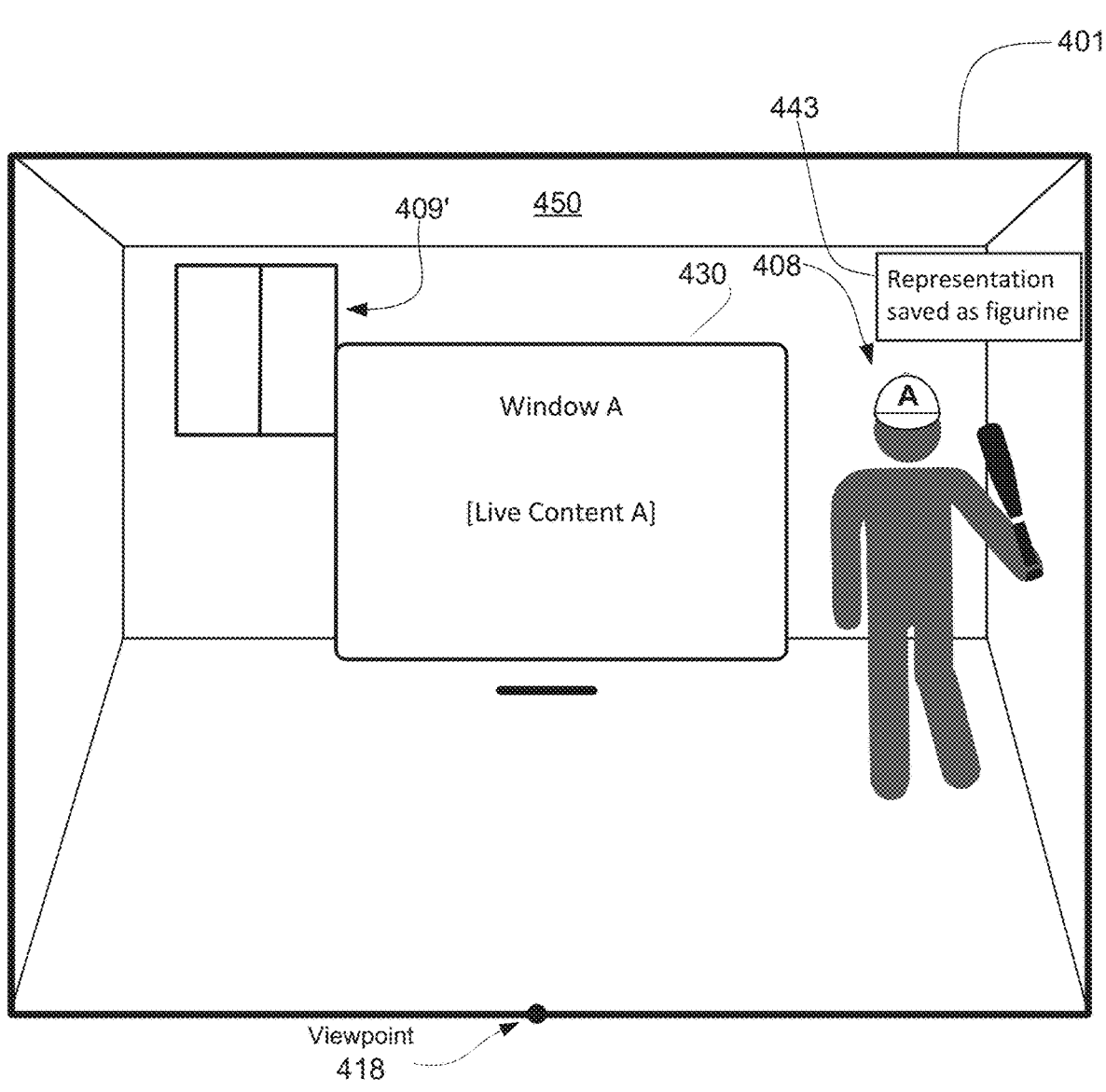
Figure 4M:
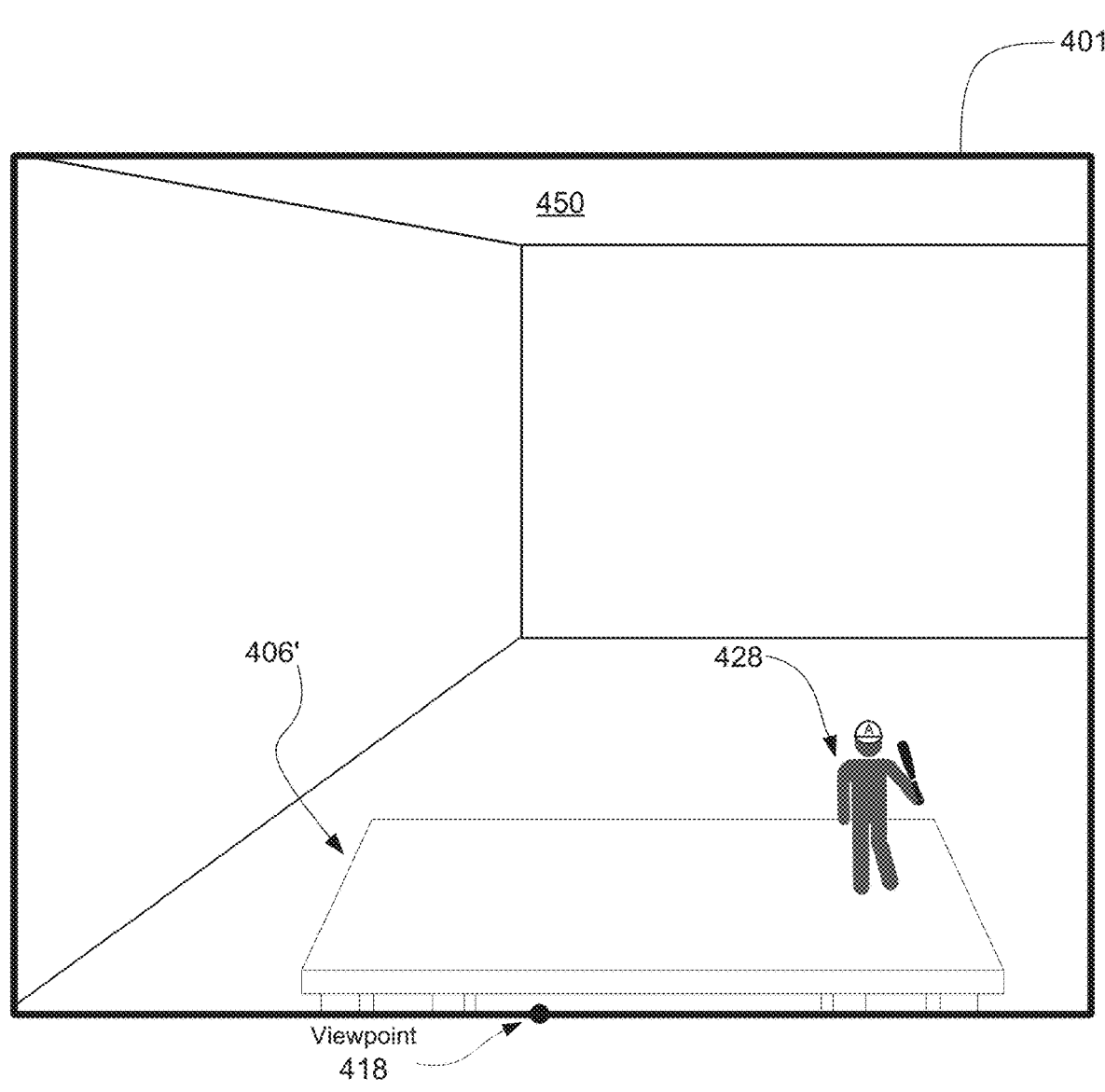

In some examples, in response to detecting the selection input 472E, the electronic device 401 generates and saves a virtual figurine of the three-dimensional representation 408, as shown in FIG. 4L. For example, as shown in FIG. 4L, the electronic device 401 displays confirmation element 443 indicating that the virtual figurine has been saved (e.g., locally to a memory of the electronic device 401) and is accessible to the user of the electronic device 401 (e.g., "Representation saved as figurine"). In some examples, generating and saving the virtual figurine includes associating display of the virtual figurine with a physical surface of a physical object in the physical environment surrounding the electronic device 401. For example, as shown in FIG. 4M, the physical environment includes a real-world table (e.g., corresponding to representation of table 406'), such as the table 106 discussed previously with reference to FIG. 1. In some examples, the electronic device 401 automatically associates the display of the virtual figurine 428 with the surface of the table 406'. In some examples, the electronic device 401 associates the display of the virtual figurine 428 with the surface of the table 406' in response to detecting an input (e.g., provided by the user) for associating the display of the virtual figurine 428 with the surface of the table 406' specifically.

In some examples, when the display of the virtual figurine 428 is associated with the surface of the table 406' in the three-dimensional environment 450, as shown in FIG. 4M, the electronic device 401 displays the virtual figurine 428 while the surface of the table 406' is in the field of view of the user of the electronic device 401. For example, from FIGS. 4L-4M, the user of the electronic device 401 moves within the physical environment surrounding the electronic device 401, which causes the display of the electronic device 401 to be repositioned such that the table 406' is visible in the user's field of view of the three-dimensional environment 450, and the electronic device 401 thereafter displays the virtual figurine 428 atop the surface of the table 406'. In some examples, if the user of the electronic device 401 moves again within the physical environment, which causes the display of the electronic device 401 to be repositioned such that the table 406' is no longer visible in the user's field of view of the three-dimensional environment 450, the electronic device 401 would cease display of the virtual figurine 428 in the three-dimensional environment 450. It should be understood that a similar process may be utilized for generating and saving a virtual figurine of the three-dimensional representation 421 of the first participant discussed previously above.

It should be understood that, though the three-dimensional representations 421/408 discussed above represent baseball players who are participating in a live baseball game, alternative representations may be provided for alternative media. For example, if a live basketball game is displayed in the virtual playback user interface 430, the three-dimensional representations 421/408 may correspond to representations of basketball players participating in the game. As another example, if a live stream of a concert is displayed in the virtual playback user interface 330, the three-dimensional representation 421/408 may correspond to representation(s) of the performer(s).

Accordingly, as described above, while displaying the two-dimensional live content in the virtual playback user interface 430, the electronic device 401 may display supplemental three-dimensional content (e.g., the three-dimensional representations 421/408) that is associated with the two-dimensional live content and that is configured to be interacted with independently of interaction with the two-dimensional live content in the three-dimensional environment 450. As showcased by way of example in the description above, displaying the supplemental three-dimensional and two-dimensional content that is associated with the live content provides varying levels of context (e.g., information) of the live content that is being played back in the three-dimensional environment, including content that otherwise would be unavailable from just the broadcast of the live content, which helps improve the viewing experience of the user. Additionally, displaying the supplemental content that is associated with the live content reduces the number of inputs needed to view particular information and/or demonstratives (e.g., player statistics, player size, player capabilities, etc.), which improves user-device interaction, as another benefit.

Attention is now directed to example interactions involving supplemental content associated with a live content item that is being played back in a three-dimensional environment (e.g., an extended reality environment) within a multi-user communication session.

Figure 5A:
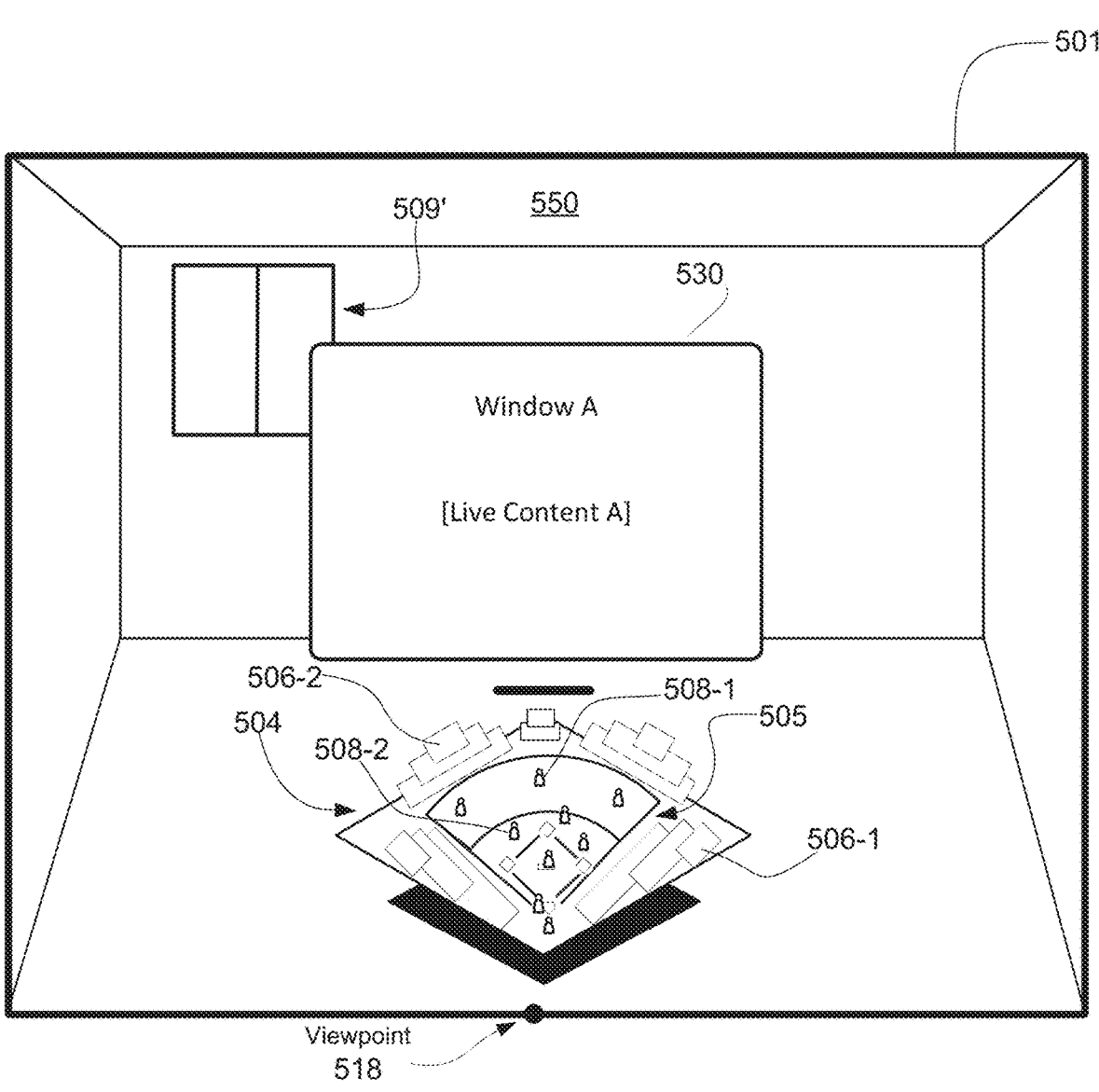
FIGS. 5A-5E illustrate example interactions involving concurrent display of live event content and supplemental content that is associated with the live event content in a computer-generated environment within a multi-user communication session according to some examples of the disclosure.

FIGS. 5A-5E illustrate example interactions involving concurrent display of live event content and supplemental content that is associated with the live event content in a computer-generated environment within a multi-user communication session according to some examples of the disclosure. In some examples, as shown in FIG. 5A, a three-dimensional environment 550 (e.g., an extended reality environment) may be presented using electronic device 501. In some examples, the electronic device 501 optionally corresponds to electronic devices 301 and/or 401 discussed above. In some examples, the three-dimensional environment 550 includes captured portions of the physical environment in which electronic device 501 is located. For example, the three-dimensional environment 550 optionally includes a window (e.g., a representation of window 509') and ceiling, floor and walls (e.g., representations of the ceiling, floor and walls), as shown in FIG. 5A. In some examples, the three-dimensional environment 550 optionally corresponds to three-dimensional environment 450/350 described above. In some examples, the representations of the physical environment can include portions of the physical environment viewed through a transparent or translucent display of electronic device 501 as passthrough.

As similarly discussed above, in some examples, the three-dimensional environment 550 may include one or more virtual objects that are associated with a video playback application operating on the electronic device 501. For example, as shown in FIG. 5A, the three-dimensional environment 550 at the electronic device 501 may include virtual playback user interface 530 that is configured to display video content in the three-dimensional environment 550. As shown in FIG. 5A, the virtual playback user interface 530 is displaying live content (e.g., "Live Content A") in the three-dimensional environment 550. In the examples of FIGS. 5A-5E, as similarly discussed above, the live content corresponds to a live baseball game that is being broadcasted/streamed live by a content provider (e.g., a network, channel, company, etc.) of the live baseball game. In some examples, the virtual playback user interface 530 corresponds to the virtual playback user interface 430/330 described above. In some examples, the live content corresponds to the live content discussed above.

Additionally, in some examples, as shown in FIG. 5A, the electronic device 501 is displaying supplemental content for the live content in the three-dimensional environment 550. For example, as shown in FIG. 5A, the electronic device 501 is displaying three-dimensional representation 504 corresponding to the live content that is displayed in the virtual playback user interface 530. In some examples, the three-dimensional representation 504 corresponds to the three-dimensional representation 304 described above. For example, as similarly discussed above with reference to FIGS. 3A-3S, the three-dimensional representation 504 includes representations of the stadium seating 506-1 and 506-2, a representation of the baseball field 505, and representations of players participating in the baseball game, including a representation of a first player 508-1 and a representation of a second player 508-2, as shown in FIG. 5A.

Figure 5B:
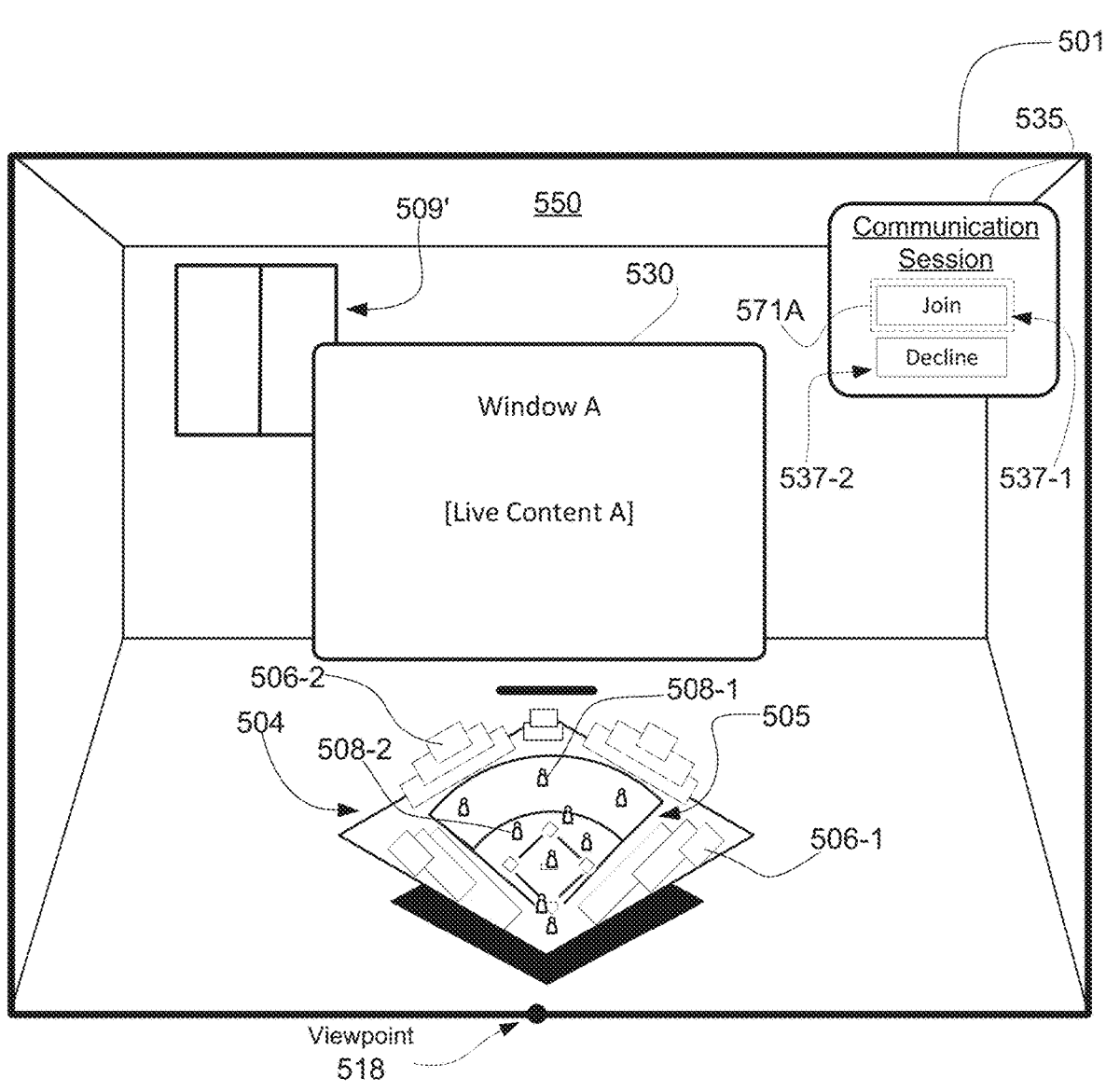

From FIGS. 5A-5B, while concurrently displaying the virtual playback user interface 530 and the three-dimensional representation 504 in the three-dimensional environment 550, the electronic device 501 detects an indication from a second electronic device (not shown), different from the electronic device 501, inviting the user of the electronic device 501 to join a user of the second electronic device in a multi-user communication session. In some examples, as shown in FIG. 5B, in response to detecting the indication from the second electronic device, the electronic device 501 displays invitation element 535 corresponding to the invitation to join the second electronic device in the multi-user communication session. In some examples, as shown in FIG. 5B, the invitation element 535 includes a first option 537-1 that is selectable to accept the invitation to join the multi-user communication session and a second option 537-2 that is selectable to decline the invitation to join the multi-user communication session (e.g., including ceasing display of the invitation element 535 in the three-dimensional environment 550).

Figure 5C:
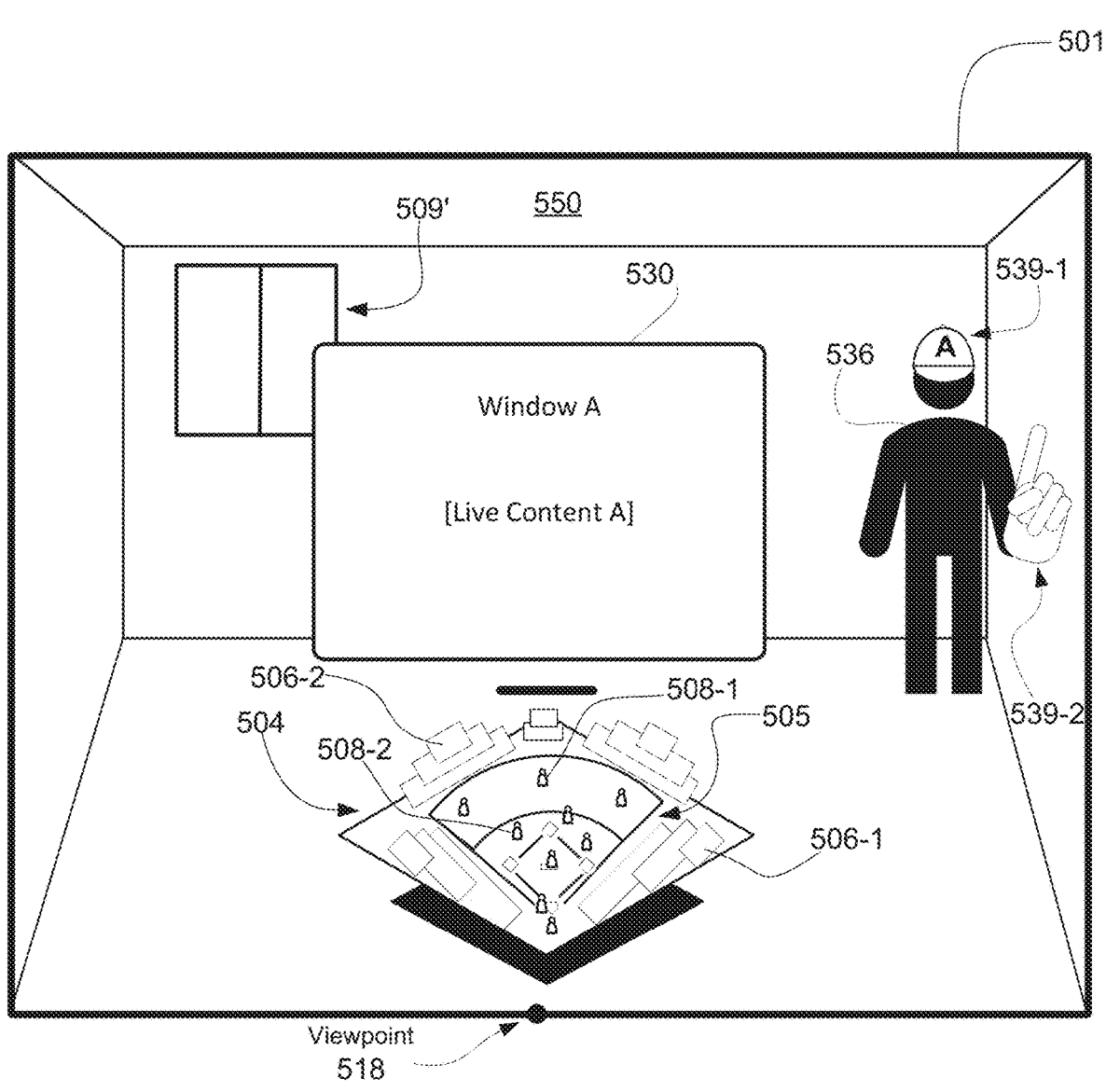

In FIG. 5B, while displaying the invitation element 535 in the three-dimensional environment 550, the electronic device 501 detects a selection input 571A directed to the first option 537-1 of the invitation element 535. For example, the electronic device 501 detects, via one or more sensors of the electronic device 501, an air pinch gesture performed by a hand of the user, a tap or touch gesture performed by the hand, a verbal command, a gaze dwell directed to the first option 537-1, etc., as similarly described previously herein. In some examples, as shown in FIG. 5C, in response to detecting the selection of the first option 537-1, the electronic device 501 joins the second electronic device in the multi-user communication session, as discussed below.

In some examples, when the electronic device 501 joins the multi-user communication session with the second electronic device (not shown), the electronic device 501 and the second electronic device are configured to present a shared three-dimensional environment that includes one or more shared virtual objects (e.g., content such as images, video, audio and the like, representations of user interfaces of applications, etc.). As used herein, the term "shared three-dimensional environment" refers to a three-dimensional environment that is independently presented, displayed, and/or visible at two or more electronic devices via which content, applications, data, and the like may be shared and/or presented to users of the two or more electronic devices. In some examples, while the electronic device 501 is in the multi-user communication session with the second electronic device, an avatar corresponding to the user of one electronic device is optionally displayed in the three-dimensional environment that is displayed via the other electronic device. For example, as shown in FIG. 5C, at the electronic device 501, an avatar 536 corresponding to the user of the second electronic device is displayed in the three-dimensional environment 550.

In some examples, the presentation of avatar 536 in the shared three-dimensional environment 550 using the electronic device 501 is optionally accompanied by an audio effect corresponding to the voice of the user of the second electronic device. In some such examples, when the user of the second electronic device speaks, the voice of the user may be detected by the second electronic device (e.g., via a microphone) and transmitted to the electronic device 501 (e.g., directly or via a server (e.g., a wireless communications terminal)), such that the detected voice of the user of the second electronic device may be presented as audio (e.g., using speaker(s) 216) to the user of the electronic device 501 in three-dimensional environment 550. In some examples, the audio effect corresponding to the voice of the user of the second electronic device may be spatialized such that it appears to the user of the electronic device 501 to emanate from the location of avatar 536 in the three-dimensional environment 550 (e.g., despite being outputted from the speakers of the electronic device 501. In some examples, the audio effect corresponding to the voice of the user of the second electronic device may alternatively be presented in mono or stereo at the electronic device 501.

In some examples, while the electronic device 501 and the second electronic device are in the multi-user communication session, the avatar 536 is displayed in the three-dimensional environment 550 with a respective orientation that corresponds to and/or is based on an orientation of the second electronic device (and/or the user of the second electronic device) in a physical environment surrounding the second electronic device. For example, in FIG. 5C, in the three-dimensional environment 550, the avatar 536 is optionally facing toward the viewpoint of the user of the electronic device 501. Within a multi-user communication session, as a particular user moves the electronic device (and/or themself) in the physical environment, the viewpoint of the user changes in accordance with the movement, which may thus also change an orientation of the user's avatar in the three-dimensional environment. For example, with reference to FIG. 5C, if the user of the second electronic device were to look leftward in the three-dimensional environment such that the second electronic device is rotated (e.g., a corresponding amount) to the left (e.g., counterclockwise), the user of the electronic device 501 would see the avatar 536 corresponding to the user of the second electronic device rotate to the right (e.g., clockwise) relative to the viewpoint 518 of the user of the electronic device 501 in accordance with the movement of the second electronic device.

Additionally, in some examples, while the electronic device 501 and the second electronic device are in the multi-user communication session, a field of view of the shared three-dimensional environment and/or a location of a viewpoint of a user in the shared three-dimensional environment optionally change in accordance with movement of the electronic devices (e.g., by the users of the electronic devices). For example, while in the communication session, if the electronic device 501 is moved closer toward the representation of the window 509' and/or the avatar 536 (e.g., because the user of the electronic device 501 moved forward in the physical environment surrounding the electronic device 501), the field of view of the three-dimensional environment 550 would change accordingly, such that the representation of the window 509' and the avatar 536 appear larger in the field of view. In some examples, each user may independently interact with the shared three-dimensional environment, such that changes in viewpoints in the three-dimensional environment 550 and/or interactions with virtual objects in the three-dimensional environment 550 by the electronic device 501 optionally do not affect what is shown in the three-dimensional environment at the second electronic device, and vice versa.

In some examples, the avatar 536 is a representation (e.g., a full-body rendering) of the user of the second electronic device. In some examples, the avatar 536 is a representation of a portion (e.g., a rendering of a head, face, head and torso, etc.) of the user of the second electronic device. In some examples, the avatar 536 is a user-personalized, user-selected, and/or user-created representation displayed in the three-dimensional environment 550 that is representative of the user of the second electronic device. It should be understood that, while the avatar 536 illustrated in FIG. 5C corresponds to a full-body representation of the user of the second electronic device, an alternative avatar may be provided, such as one of those described above.

In some examples, as shown in FIG. 5C, the avatar 536 may be user-personalized (e.g., by the user of the second electronic device discussed above) such that the avatar 536 is displayed with adornments and/or accessories associated with the live content being played back in the three-dimensional environment 450. For example, as shown in FIG. 5C, the avatar 536 is displayed with a virtual baseball hat 539-1 and a virtual foam finger 539-2 associated with Team A that is competing in the baseball game. It should be understood that the accessories shown in FIG. 5C are exemplary and that additional and/or alternative accessories may be displayed with the avatar 536, such as a jersey, necklace, t-shirt, glasses, etc. indicating that the user of the second electronic device is a fan of Team A. Additionally, as another example, the avatar 536 may be displayed with virtual face paint that indicates the user of the second electronic device is a fan of Team A (e.g., face painting of a logo or color of Team A).

Figure 5D:
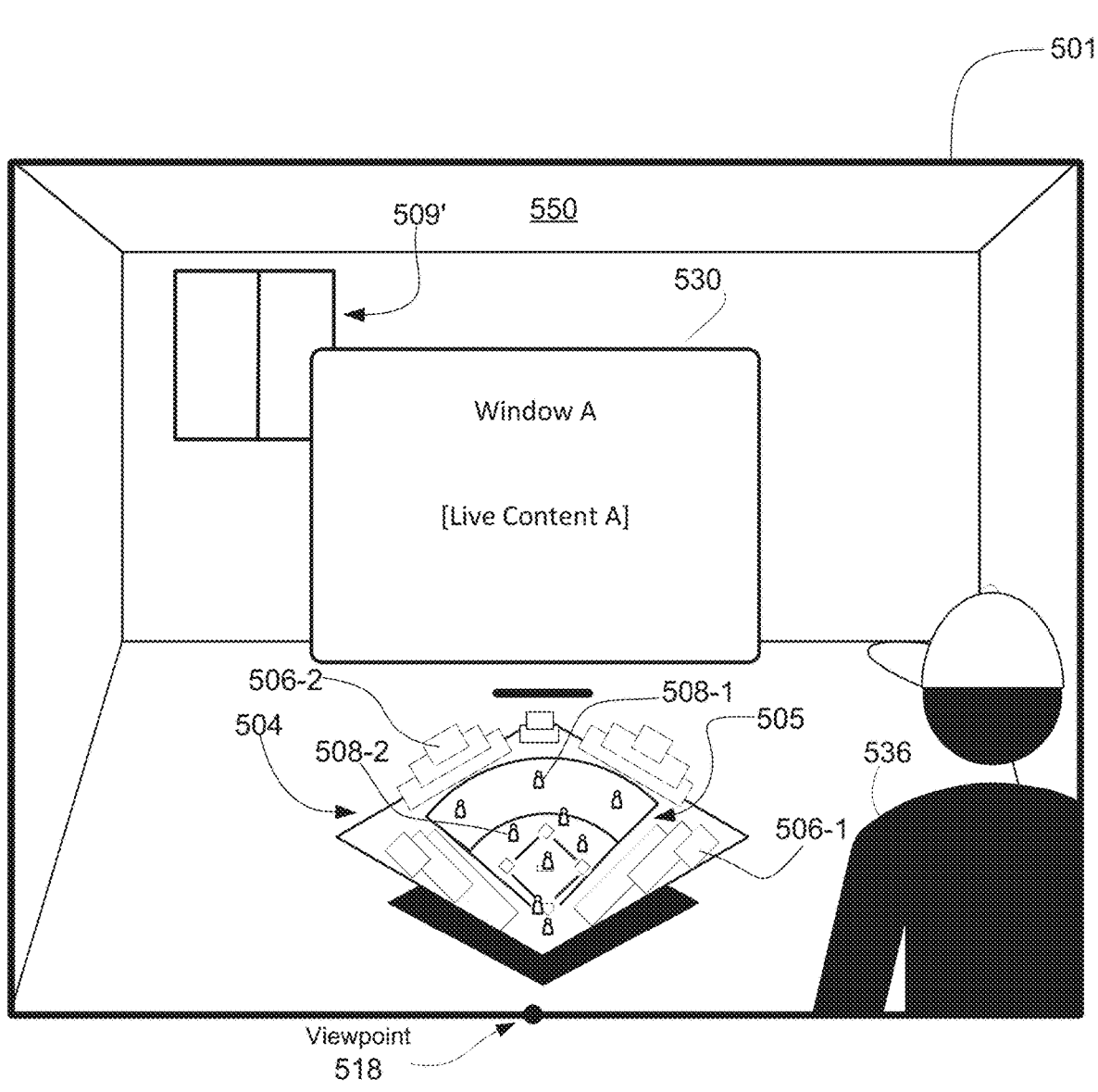

In some examples, while the electronic device 501 and the second electronic device are in the multi-user communication session, content that is viewed by one user at one electronic device may be shared with another user at the other electronic device in the multi-user communication session. In some such examples, the content may be experienced (e.g., viewed and/or interacted with) by both users (e.g., via their respective electronic devices) in the shared three-dimensional environment (e.g., the content is shared content in the three-dimensional environment). For example, in FIG. 5D, the virtual playback user interface 530 and the three-dimensional representation 504 corresponding to the live content in the virtual playback user interface 530 have been shared with the user of the second electronic device (not shown). Accordingly, in some examples, as shown in FIG. 5D, the user of the electronic device 501 and the user of the second electronic device are both viewing the virtual playback user interface 530 and the three-dimensional representation 504 (e.g., as indicated by a positioning of the avatar 536 corresponding to the second electronic device adjacent to the viewpoint 418 of the user of the electronic device 501).

In some examples, while the virtual playback user interface 530 and the three-dimensional representation 504 are shared between the user of the electronic device 501 and the user of the second electronic device (not shown) in the multi-user communication session, the virtual playback user interface 530 and/or the three-dimensional representation 504 are configured to be interacted with by the users, in which such interactions are visible to both users in their respective three-dimensional environments. For example, in FIG. 5E, the electronic device 501 detects an indication (e.g., from the second electronic device or a server (e.g., a wireless communications terminal) in communication with the second electronic device) of respective input directed to the three-dimensional representation 504 that is detected via one or more input devices of the second electronic device. As an example, the second electronic device detects an input corresponding to a request to add an annotation or markup to the three-dimensional representation 504 that is displayed at the second electronic device.

Figure 5E:
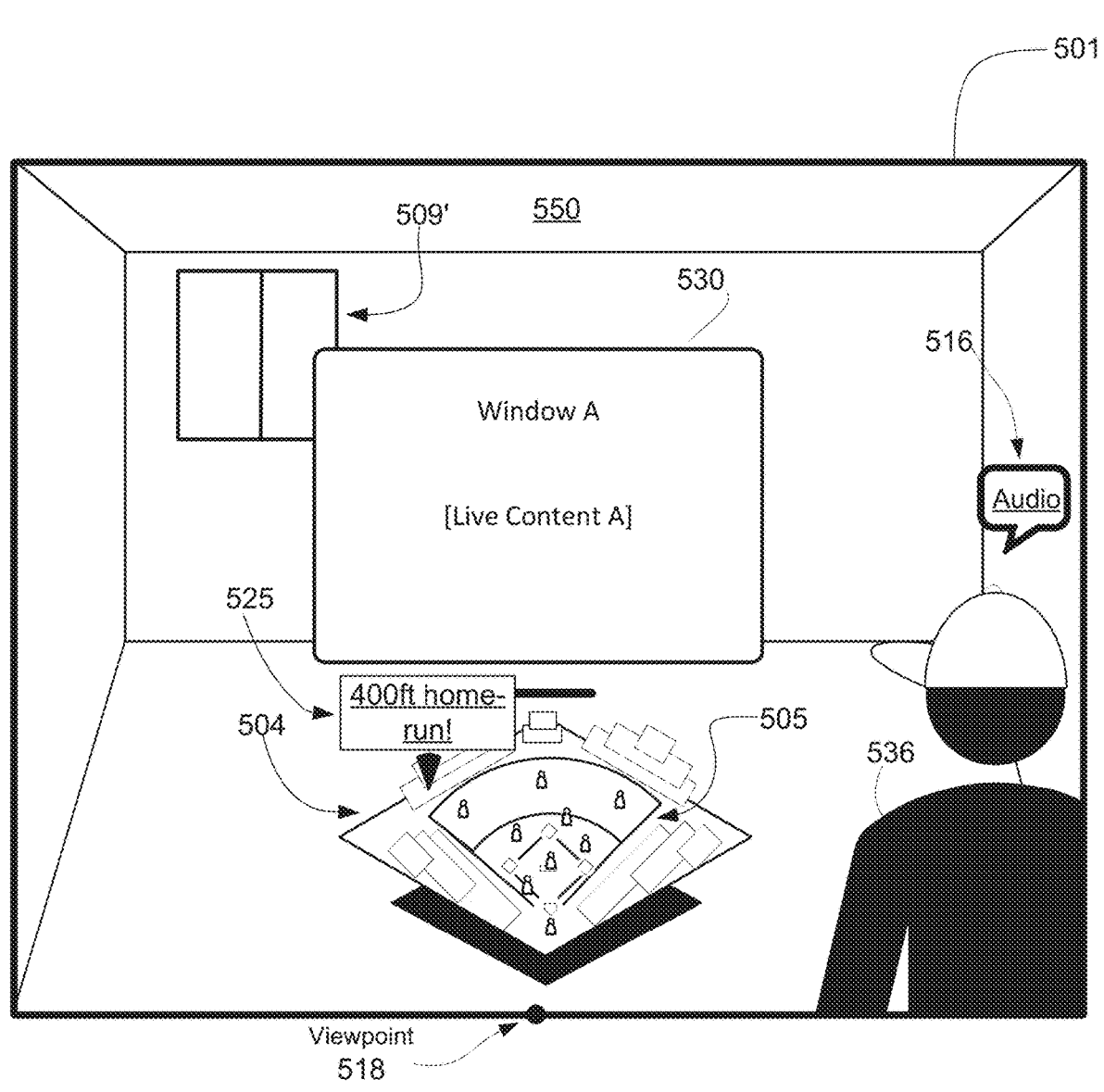

In some examples, as shown in FIG. 5E, in response to detecting the indication of the respective input detected at the second electronic device, the electronic device 501 updates display of the three-dimensional representation 504 to include annotation 525 in the three-dimensional environment 550. For example, while the live baseball game is being played back within the multi-user communication session, a respective player hits a homerun in which the baseball travels 400 ft from a point of contact with the baseball. In some examples, the user of the second electronic device (not shown) provides input to add an annotation 525 to the three-dimensional representation 504 to indicate a location in the baseball stadium that the baseball landed after being hit. Accordingly, because the three-dimensional representation 504 is shared between the two users, the electronic device 501 updates the three-dimensional representation 504 to include the annotation 525 added by the user of the second electronic device. In some examples, the annotated three-dimensional representation 504 is configured to be saved and/or shared between the users in the multi-communication session and/or shared with a different user who is not currently participating in the multi-user communication session. It should be understood that other inputs directed to the three-dimensional representation 504 would also be reflected at both electronic devices, such as, for example, movement of the three-dimensional representation 504, scaling of the three-dimensional representation, rotation of the three-dimensional representation 504, etc.

In some examples, while the live content is being played back in the virtual playback user interface 530, the live content is presented with audio that is integrated with the broadcast/stream of the live content. For example, the presentation of the live baseball game in the three-dimensional environment 550 is accompanied by audio of one or more sports telecasters or commentators, as well as audio of the audience in attendance (e.g., cheers, claps, roars, etc. of the people in attendance) and/or audio of the baseball game itself (e.g., contact of a bat hitting the baseball). In some examples, while the user of the electronic device 501 and the user of the second electronic device (not shown) are watching the live content within the multi-user communication session, the audio of the one or more sports telecasters or commentators may be suppressed to enable the user(s) to call (e.g., verbally indicate whether a pitch is a strike or a ball) and/or provide commentary on the live content. For example, as shown in FIG. 5E, the electronic device 501 has provided for allowing the user of the second electronic device, represented by the avatar 536, to call and/or provide commentary on the live baseball game (e.g., in response to detecting user input and/or activation of a respective mode of operation), as indicated by audio bubble 516. In some examples, as similarly discussed above, the audio corresponding to audio bubble 516 may be presented as spatial audio or as stereo or mono audio.

It should be understood that the interactions discussed above optionally apply for other forms and variations of supplemental content for the live content in the multi-user communication session. For example, if the three-dimensional representation 421 of the first participant discussed previously with reference to FIGS. 4A-4M is displayed in the shared three-dimensional environment in place of the three-dimensional representation 504, interactions directed to the three-dimensional representation 421 (e.g., movement interactions, selection interactions, etc.) provided by one user in the multi-user communication session would be viewable by all users in the multi-user communication session, as similarly discussed above (e.g., because the three-dimensional representation 421 is a shared virtual object). Additionally, the two-dimensional examples of supplemental content (e.g., game and/or player statistics) discussed above may also be provided in the shared three-dimensional environment, such that such supplemental content is optionally viewable by and interactive for all users in the multi-user communication session.

In some examples, additional or alternative interactions may be provided for within the multi-user communication session that relate to the shared viewing experience of the live content. For example, prior to a beginning of the broadcast/stream of the live baseball game in the shared three-dimensional environment, the users, including the user of the electronic device 501, may engage in a virtual party or gathering (e.g., such as a virtual tailgate) within the multi-user communication session. As another example, the users, including the user of the electronic device 501, may engage in digital commerce to purchase digital and/or physical accessories associated with the live content. For example, the users in the multi-user communication session may purchase digital and/or physical hats, jerseys, necklaces, glasses, gloves, etc. associated with the teams playing in the baseball game (e.g., from an authorized vendor). Such digital accessories may then be used to further customize each user's avatar in the multi-user communication session, as similarly shown by the avatar 536 in FIG. 5C. Additionally, the electronic device 501 provides for virtual celebrations within the multi-user communication session. For example, as similarly described above with reference to FIG. 3S, when a respective event occurs (e.g., when a particular team scores a run or earns an on-base) within the live baseball game, the electronic device 501 and the second electronic device (not shown) generate and display virtual confetti, fireworks, balloons, etc. (e.g., based on user/game preferences) in the multi-user communication session that are indicative of celebration.

It is understood that the examples shown and described herein are merely exemplary and that additional and/or alternative elements may be provided within the three-dimensional environment that supplement the viewing experience of the live content for the user. It should be understood that the appearance, shape, form, and size of each of the various user interface elements and objects shown and described herein are exemplary and that alternative appearances, shapes, forms and/or sizes may be provided. For example, the virtual objects representative of application windows (e.g., virtual playback user interface 330/430/530) and/or the user interface elements (e.g., notification element 332/432 and/or message element 339) may be provided in alternative shapes than those shown, such as a rectangular shape, circular shape, triangular shape, etc. In some examples, the various selectable affordances (e.g., first and second options 333-1/433-1 and 333-2/433-2, grabber bar 335/435/535, and/or predetermined viewing points 311) described herein may be selected verbally via user verbal commands (e.g., "select option" or "select virtual object" verbal command). Additionally or alternatively, in some examples, the various options, user interface elements, control elements, etc. described herein may be selected and/or manipulated via user input received via one or more input devices in communication with the electronic device(s). For example, selection input may be received via physical input devices, such as a mouse, trackpad, keyboard, etc. in communication with the electronic device(s), or a physical button integrated with the electronic device(s).

FIG. 6 is a flow diagram illustrating an example process for facilitating interaction with supplemental content that is associated with live event content in a computer-generated environment according to some examples of the disclosure. In some examples, process 600 begins at an electronic device in communication with a display and one or more input devices. In some examples, the electronic device is optionally a head-mounted display similar or corresponding to electronic device 201 of FIG. 2. As shown in FIG. 6, in some examples, at 602, the electronic device presents, via the display, computer-generated environment including a virtual playback user interface that is configured to display content. For example, the electronic device (e.g., electronic device 301 in FIG. 3A) presents a three-dimensional environment, such as three-dimensional environment 350, that includes a virtual playback user interface displaying live content in the three-dimensional environment, such as virtual playback user interface 330 that is displaying a live baseball game in FIG. 3A.

In some examples, at 604, while displaying a live event content item in the virtual playback user interface in the computer-generated environment, the electronic device presents, via the display, a three-dimensional representation corresponding to the live content item, wherein the three-dimensional representation includes at least one of: representations of participants in the live event and a representation of a venue in the live event, and wherein at least a subset of the representations of the participants in the live event and/or the representation of the venue of the live event is not currently displayed in the live content item. For example, as shown in FIG. 3C, such as in response to detecting a selection of first option 333-1 in FIG. 3B, the electronic device 301 displays three-dimensional representation 304 corresponding to the live baseball game and that includes a representation of baseball field 305 and representations of stadium seating 306-1 and 306-2, and representations of baseball players 308 that are at least partially displayed in the broadcast of the live baseball game.

In some examples, at 606, while concurrently presenting the virtual playback user interface that is displaying the live event content item and the three-dimensional representation in the computer-generated environment, the electronic device detects, via the one or more input devices, a first input corresponding to a request to change one or more visual characteristics of the three-dimensional representation. For example, as shown in FIG. 3G, the electronic device 301 detects a scaling input 372D corresponding to a request to change a size of the three-dimensional representation 304 in the three-dimensional environment 350. In some examples, at 608, in response to detecting the first input, at 610, the electronic device updates display of the three-dimensional representation in the computer-generated environment based on changes to the one or more visual characteristics of the three-dimensional representation in accordance with the first input, without updating display of the live event content item in the virtual playback user interface. For example, as shown in FIG. 3H, the electronic device 301 increases the size of the three-dimensional representation 304 in the three-dimensional environment 350 without increasing a size of the virtual playback user interface 330 (e.g., or a zoom level of the live baseball game displayed in the virtual playback user interface 330).

It is understood that process 600 is an example and that more, fewer, or different operations can be performed in the same or in a different order. Additionally, the operations in process 600 described above are, optionally, implemented by running one or more functional modules in an information processing apparatus such as general-purpose processors (e.g., as described with respect to FIG. 2) or application specific chips, and/or by other components of FIG. 2.

FIG. 7 is a flow diagram illustrating an example process for facilitating interaction with supplemental content that is associated with live event content in a computer-generated environment according to some examples of the disclosure. In some examples, process 700 begins at an electronic device in communication with a display and one or more input devices. In some examples, the electronic device is optionally a head-mounted display similar or corresponding to electronic device 201 of FIG. 2. As shown in FIG. 7, in some examples, at 702, the electronic device presents, via the display, computer-generated environment including a virtual playback user interface that is configured to display content. For example, the electronic device (e.g., electronic device 401 in FIG. 4A) presents a three-dimensional environment, such as three-dimensional environment 450, that includes a virtual playback user interface displaying live content in the three-dimensional environment, such as virtual playback user interface 430 that is displaying a live baseball game in FIG. 4A.

In some examples, at 704, while displaying a live event content item in the virtual playback user interface in the computer-generated environment, the electronic device presents, via the display, a first three-dimensional representation of a first participant in the live event, wherein the first three-dimensional representation has a size that corresponds to a size of the first participant. For example, as shown in FIG. 4B, such as in response to detecting a selection of first option 433-1 in FIG. 4A, the electronic device 401 displays three-dimensional representation 421 of a first baseball player participating in the live baseball game in the three-dimensional environment 450. In some examples, as shown in FIG. 4B, the three-dimensional representation 421 may be a life-size rendering of the first baseball player.

In some examples, at 706, while concurrently presenting the virtual playback user interface that is displaying the live event content item and the first three-dimensional representation in the computer-generated environment, the electronic device detects, via the one or more input devices, a first input directed to the first three-dimensional representation. For example, as shown in FIG. 4F, the electronic device 401 detects a selection input 472C directed to the three-dimensional representation 421 in the three-dimensional environment 450. In some examples, at 708, in response to detecting the first input, at 710, the electronic device causes the first three-dimensional representation of the first participant to perform a first operation in the computer-generated environment. For example, as shown in FIGS. 4G-4H, the electronic device 401 causes the three-dimensional representation 421 to perform a pitching operation (e.g., simulation of pitching virtual baseball 405) in the three-dimensional environment 450. In some examples, the first three-dimensional representation of the first participant performs the first operation based on one or more physical capabilities (e.g., skills) of the first participant in the real world.

It is understood that process 700 is an example and that more, fewer, or different operations can be performed in the same or in a different order. Additionally, the operations in process 700 described above are, optionally, implemented by running one or more functional modules in an information processing apparatus such as general-purpose processors (e.g., as described with respect to FIG. 2) or application specific chips, and/or by other components of FIG. 2.

Attention is now directed to examples of presenting spatial animation effects in accordance with detecting particular events associated with a live content item that is being played back in a three-dimensional environment (e.g., a computer-generated environment) at an electronic device.

Figure 8A:
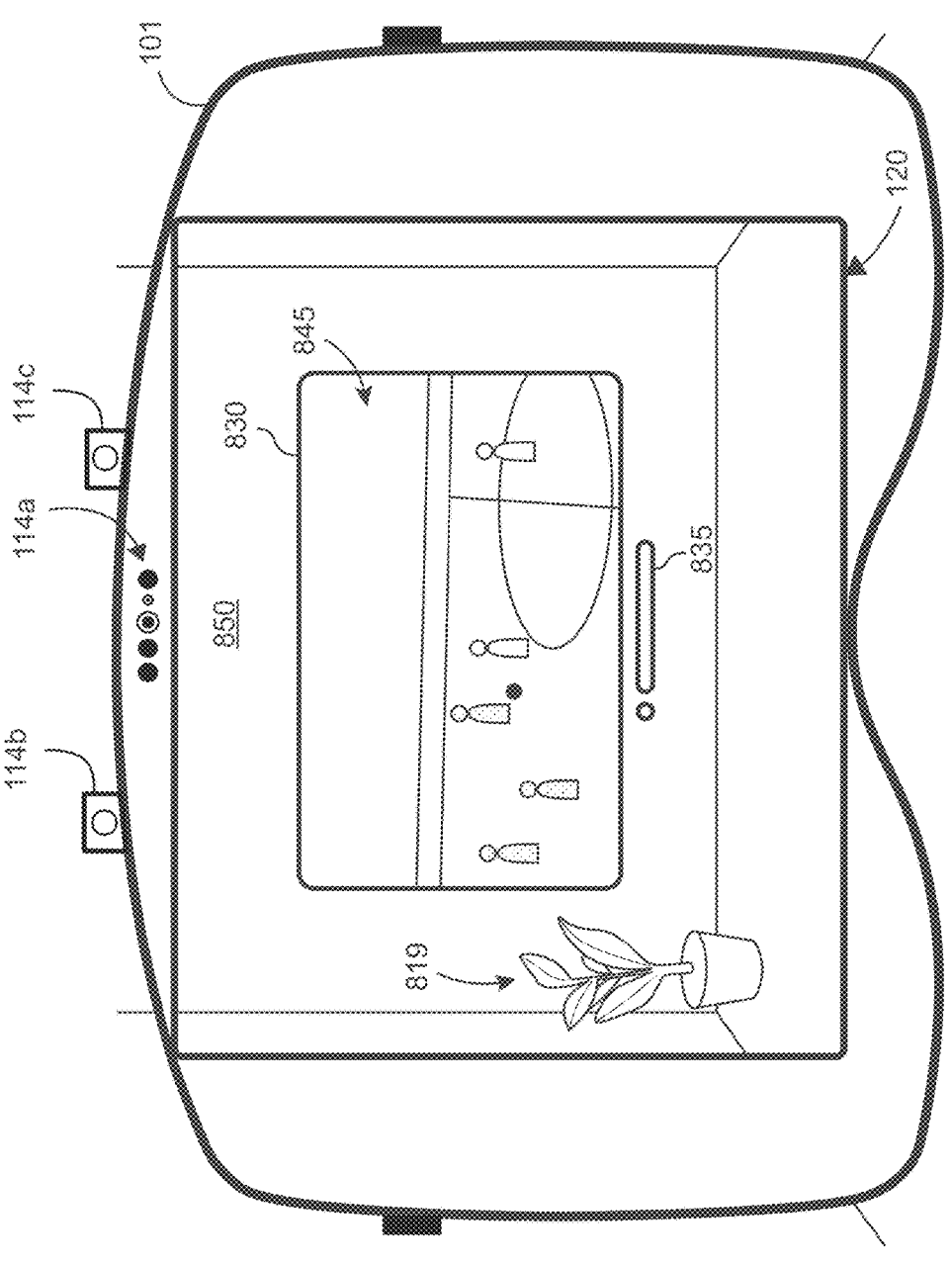

FIGS. 8A-8J illustrate examples of presenting spatial animation effects in accordance with detecting respective events associated with live event content according to some examples of the disclosure. In some examples, as shown in FIG. 8A, a three-dimensional environment 850 (e.g., an extended reality environment) may be presented using electronic device 101. In some examples, the electronic device 101 optionally corresponds to or is similar to electronic devices 301, 401 and/or 501 discussed above. In some examples, the three-dimensional environment 850 includes captured portions of the physical environment in which electronic device 101 is located. For example, the three-dimensional environment 850 optionally includes a plant 819 and floor and walls (e.g., representations of the plant 819, floor and walls), as shown in FIG. 8A. In some examples, the three-dimensional environment 850 has one or more characteristics of three-dimensional environment 550/450/350 described above. In some examples, the representations of the physical environment can include portions of the physical environment viewed through a transparent or translucent display of electronic device 101 as passthrough.

In some examples, as shown in FIG. 8A, electronic device 101 is a head-mounted display or other head-mountable device configured to be worn on a head of a user of the electronic device 101. In some examples, as shown in FIG. 8A, electronic device 101 includes one or more internal image sensors 114a oriented towards a face of the user (e.g., eye tracking cameras described below with reference to FIG. 2). In some examples, internal image sensors 114a are used for eye tracking (e.g., detecting a gaze of the user). Internal image sensors 114a are optionally arranged on the left and right portions of display 120 to enable eye tracking of the user's left and right eyes. In some examples, electronic device 101 also includes external image sensors 114b and 114c facing outwards from the user to detect and/or capture the physical environment of the electronic device 101 and/or movements of the user's hands or other body parts.

In some examples, display 120 has a field of view visible to the user (e.g., that may or may not correspond to a field of view of external image sensors 114b and 114c). Because display 120 is optionally part of a head-mounted device, the field of view of display 120 is optionally the same as or similar to the field of view of the user's eyes. In other examples, the field of view of display 120 may be smaller than the field of view of the user's eyes. In some examples, electronic device 101 may be an optical see-through device in which display 120 is a transparent or translucent display through which portions of the physical environment may be directly viewed. In some examples, display 120 may be included within a transparent lens and may overlap all or only a portion of the transparent lens. In other examples, electronic device may be a video-passthrough device in which display 120 is an opaque display configured to display images of the physical environment captured by external image sensors 114b and 114c. While a single display 120 is shown, it should be appreciated that display 120 may include a stereo pair of displays.

As similarly discussed above, in some examples, the three-dimensional environment 850 may include one or more virtual objects that are associated with a video playback application operating on the electronic device 101. For example, as shown in FIG. 8A, the three-dimensional environment 850 at the electronic device 101 may include virtual playback user interface 830 that is configured to display video content in the three-dimensional environment 850. As shown in FIG. 8A, the virtual playback user interface 830 is displaying live content 845 in the three-dimensional environment 850. In the examples of FIGS. 8A-8J, as similarly discussed above, the live content corresponds to an athletic event, such as a live soccer game that is being broadcasted/streamed live by a content provider (e.g., a network, channel, company, etc.) of the live soccer game. Additionally, as shown in FIG. 8A, the virtual playback user interface 830 is optionally displayed with grabber or handlebar 835 that is selectable to initiate movement of the virtual playback user interface 830 within the three-dimensional environment 850, as similarly discussed above. In some examples, the virtual playback user interface 830 has one or more characteristics of the virtual playback user interface 530/430/330 described above. In some examples, the playback of the live content 845 has one or more characteristics of the playback of the live content (e.g., the live baseball game) discussed above.

In some examples, the electronic device 101 is configured to present spatial animation effects in the three-dimensional environment 850 based on the playback of the live content 845. Particularly, as discussed below, the electronic device 101 may present spatial animation effects in response to detecting initiation and/or an occurrence of an event that is associated with the live content 845. For example, as discussed above, the live content 845 corresponds to a live athletic event (e.g., a live soccer game); accordingly, an event associated with the live content 845 corresponds to a particular play within the live soccer game. For other types of athletic events, such as track and field meets, for example, the event associated with the live content 845 may correspond to a particular event of the track and field meet, such as relays, long jump, pole vault, high jump, etc. As an alternative example, for live content that corresponds to live performance events, such as concerts, theater productions, musicals, and the like, the event associated with the live content 845 may correspond to a particular song, a particular scene, a particular musical piece, etc. Additional details regarding the detection of the initiation and/or occurrence of an event that is associated with the live content 845 are provided below.

Figure 8B:
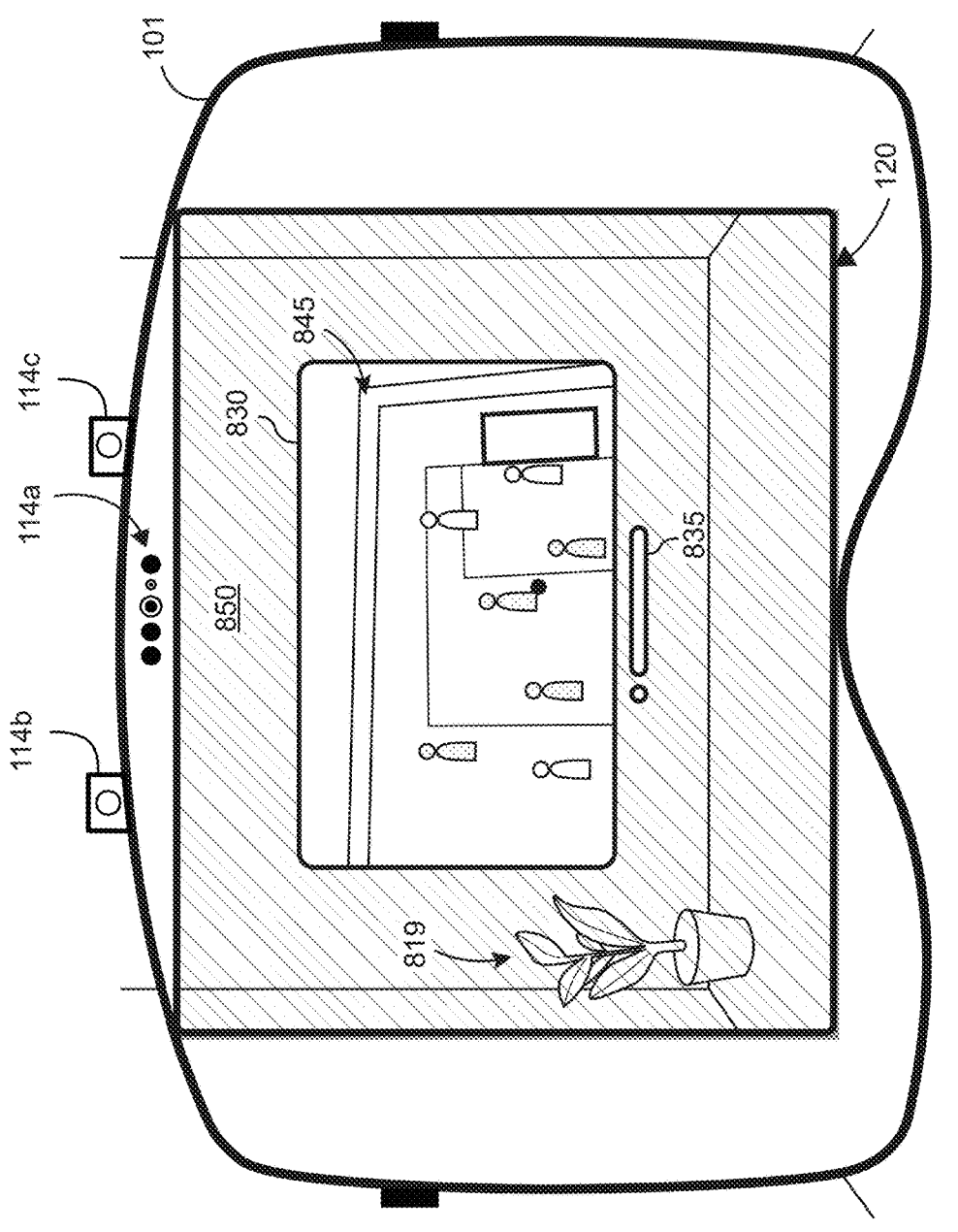

From FIGS. 8A to 8B, the electronic device 101 detects initiation of a first event associated with the live content 845. For example, as shown in FIG. 8B, the electronic device 101 detects initiation of a goal kick attempt in the live soccer game. Alternatively, in FIG. 8B, the electronic device 101 detects setup of a penalty kick in the live soccer game. As illustrated in FIG. 8B, a first player of a first team (e.g., indicated with pattern/shading of the players of the first team) is preparing to kick the soccer ball into the goal of a second team (e.g., indicated with solid black outline and no pattern/shading).

In some examples, the electronic device 101 detects the initiation of the first event associated with the live content 845 based on broadcast/streaming data provided by the content provider of the live content 845. For example, the broadcast/streaming data provided by the content provider of the live content 845 is embedded with a trigger (e.g., a flag or other indication) that, when received by the electronic device 101, enables the electronic device 101 to determine that the first event is initiated. Alternatively, in some examples, the electronic device 101 detects the initiation of the first event associated with the live content 845 based on image detection (e.g., object detection, optical character recognition, or other computer vision techniques). For example, in FIG. 8B, the live content 845 is being displayed on a second electronic device (e.g., a television, laptop, tablet, smartphone, etc.), separate from the electronic device 101, and the electronic device 101 visually detects, via one or more cameras of the electronic device 101, that the soccer ball is positioned near and/or in front of the goal, and in response, determines that a goal attempt within the live soccer game is imminent. In this instance, the live content 845 is visible via passthrough of the physical environment of the electronic device 101, rather than actively being displayed by the electronic device 101 (e.g., based on streaming/broadcast data as discussed above). As another example, the electronic device 101 detects the initiation of the first event associated with the live content 845 based on passive and/or active detection of user input (e.g., detected via sensors or other input devices in communication with the electronic device 101). For example, in FIG. 8B, the electronic device 101 detects the gaze of the user directed to the live content 845, detects verbal input provided by the user, detects movement of the user, or other indication that user anticipation and/or excitement is present.

In some examples, as shown in FIG. 8B, in response to detecting the initiation of the first event associated with the live content 845, the electronic device 101 adjusts one or more lighting characteristics of the three-dimensional environment 850. For example, as shown in FIG. 8B, the electronic device 101 reduces a brightness level of (e.g., dims) portions of the three-dimensional environment 850 surrounding the virtual playback user interface 830, without reducing the brightness level of the virtual playback user interface 830 (e.g., including the grabber bar 835). Accordingly, as illustrated in FIG. 8B, visibility of the portions of the physical environment that are included in the three-dimensional environment 850, such as the representations of the plant 819, the floor and walls of the physical environment, is reduced relative to the virtual playback user interface 830 from the viewpoint of the user. In some examples, the electronic device 101 increases the brightness level of the virtual playback user interface 830 (e.g., including a brightness of the live content 845) in the three-dimensional environment 850. In some examples, adjusting the one or more lighting characteristics of the three-dimensional environment 850 helps draw and/or direct attention of the user toward the first event associated with the live content 845 (e.g., the goal kick attempt discussed above), which helps facilitate user anticipation and thereby improve the user's viewing experience.

Figure 8C:
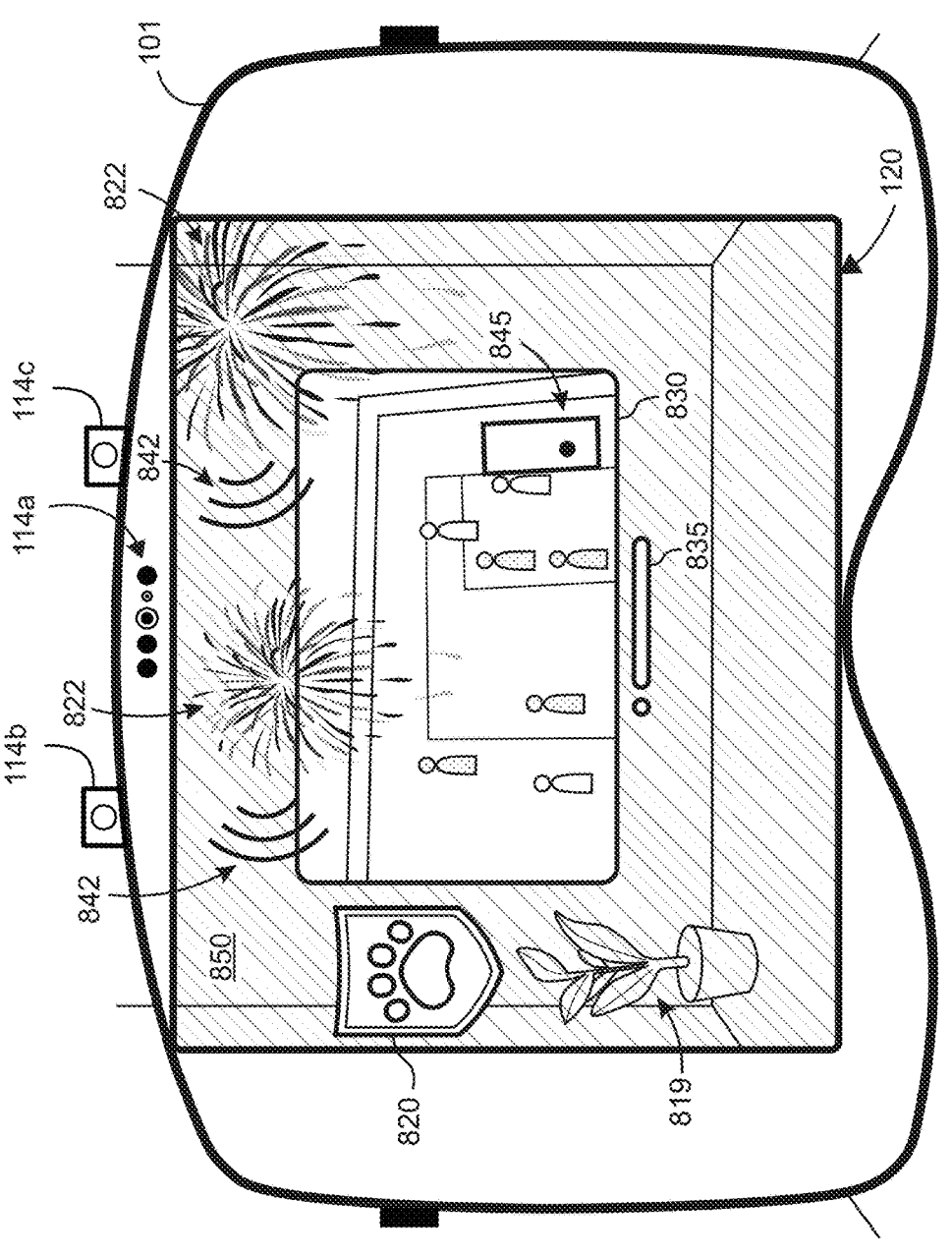

In FIG. 8C, the electronic device 101 determines (e.g., and/or detects) that the first event associated with the live content 845 satisfies one or more criteria. In some examples, the one or more criteria include a criterion that is satisfied when one or more points are scored in the athletic event illustrated in the examples of FIGS. 8A-8J. For example, as shown in FIG. 8C, the goal kick attempt in the live soccer game is successful (e.g., the soccer ball is kicked into the opposing team's goal). In some examples, the one or more criteria include a criterion that is satisfied when the team that scored the one or more points is a user-preferred team (e.g., a team selected by the user according to one or more user preferences). For example, based on user data collected from and/or provided by an application running on the electronic device 101 (e.g., the video playback application associated with the virtual playback user interface 830, a web-browsing application, a settings application, a gaming application, etc.), the electronic device 101 determines that the scoring team is the user's preferred team (e.g., a user-favorited team). In some examples, satisfaction of the one or more criteria is based on the individual players/participants participating in the live content 845 (e.g., the soccer players participating in the soccer game/match). For example, the one or more criteria include a criterion that is satisfied if the player who scored the one or more points for their team is a user-preferred player (e.g., a player selected by the user according to one or more preferences, such as a user-favorited player, as similarly discussed above with reference to the team being a user-preferred team). In some examples, satisfaction of the one or more criteria is based on a location of the athletic event of the live content 845. For example, the one or more criteria include a criterion that is satisfied if a venue at which the athletic event is taking place (e.g., the stadium and/or field at which the soccer game of the live content 845 is taking place) corresponds to a "home"

stadium or home field (e.g., the stadium or field at which one team hosts the opposing team). It should be understood that satisfaction of the one or more criteria is based on satisfaction of any one or combination of the individual criteria discussed above. Additionally, it should be understood that, as similarly discussed above, the determination the one or more criteria are satisfied is based on streaming/broadcast data provided by the content provider of the live content 845, image detection and/or computer vision, user input, etc.

In some examples, as shown in FIG. 8C, when the electronic device 101 determines that the first event associated with the live content 845 satisfies the one or more criteria, the electronic device 101 presents a first spatial animation effect (e.g., a celebration animation effect) that is based on the live content 845 in the three-dimensional environment 850. In some examples, as shown in FIG. 8C, presenting the first spatial animation effect includes presenting virtual fireworks 822 in the three-dimensional environment 850. For example, the electronic device 101 displays an animation of launching, exploding, and dissipating of the virtual fireworks 822 in the three-dimensional environment 850. In some examples, the presentation of the virtual fireworks 822 is accompanied by the presentation of audio 842 corresponding to the virtual fireworks 822 (e.g., spatial or stereo audio indicative of launching and booming of fireworks). In some examples, presenting the first spatial animation effect includes displaying a representation 820 of an emblem (e.g., crest, logo, flag, etc.) associated with the scoring team in the three-dimensional environment 850, as shown in FIG. 8C.

Figure 8D:
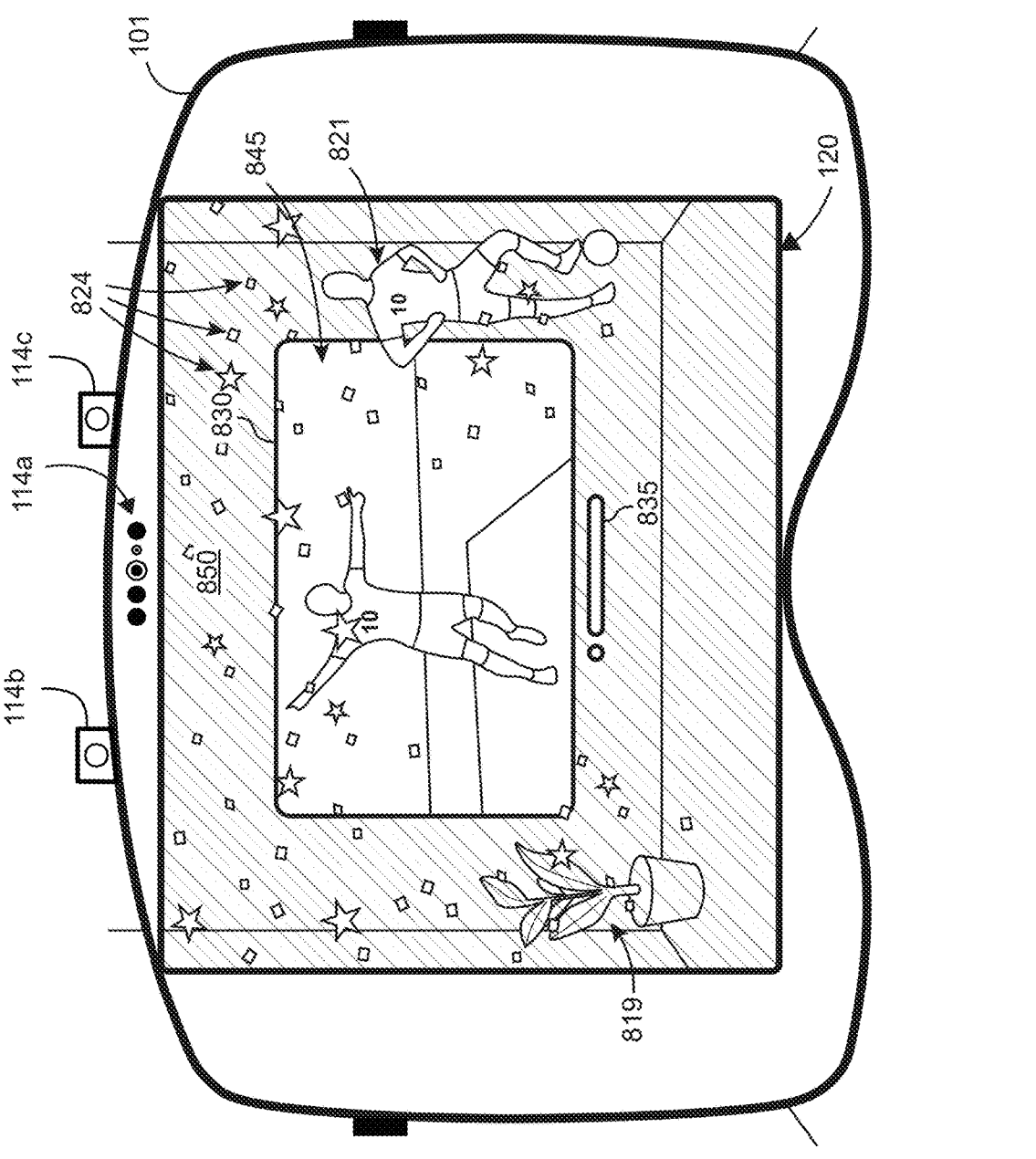

Additionally or alternatively, in some examples, as shown in FIG. 8D, presenting the first spatial animation effect includes presenting virtual confetti 824 in the three-dimensional environment 850. For example, the electronic device 101 displays an animation of the popping, falling, and settling of the virtual confetti 824 in the three-dimensional environment 850. In some examples, as similarly discussed above, presentation of the virtual confetti 824 may be accompanied by the presentation of audio corresponding to the virtual confetti 824 (e.g., audio indicating the popping of the confetti). In some examples, as shown in FIG. 8D, presenting the first spatial animation effect includes displaying a three-dimensional representation 821 of the player in the live soccer game who scored the one or more points as discussed above. In some examples, the three-dimensional representation 821 has one or more characteristics of three-dimensional representation 421 discussed above. In some examples, the virtual confetti 824 and/or the three-dimensional representation 821 are presented in the three-dimensional environment 850 concurrently with the virtual fireworks 822 and/or the representation 820 in FIG. 8C. Alternatively, in some examples, the virtual confetti 824 and/or the three-dimensional representation 821 are presented in the three-dimensional environment 850 before or after presentation of the virtual fireworks 822 and/or the representation 820 in FIG. 8C.

In some examples, the virtual fireworks 822, the representation 820, the virtual confetti 824, and/or the three-dimensional representation 821 are presented as world locked objects/animations in the three-dimensional environment 850. Additionally, in some examples, the presentation of the first spatial animation effect discussed above is based on a location of the virtual playback user interface 830 in the three-dimensional environment 850. For example, as shown in FIGS. 8C and 8D, the representation 820 of the emblem and the three-dimensional representation 821 of the player are displayed adjacent to the virtual playback user interface

830 in the three-dimensional environment 850. Similarly, as shown in FIGS. 8C and 8D, the virtual fireworks 822 and the virtual confetti 824 are presented at locations relative to the location of the virtual playback user interface 830 in the three-dimensional environment 850. For example, the virtual fireworks 822 and/or the virtual confetti 824 are presented above (e.g., and/or originating from behind or in front of) the virtual playback user interface 830 in the three-dimensional environment 850 from the viewpoint of the user. Alternatively, in some examples, the presentation of the first spatial animation effect discussed above is based on a location of the user's viewpoint in the three-dimensional environment 850. For example, the electronic device 101 may display the representation 820 and/or the three-dimensional representation 821 at predetermined locations in the three-dimensional environment 850 relative to the viewpoint of the user and/or at predetermined distances in the three-dimensional environment 850 relative to the viewpoint of the user. As another example, the electronic device 101 may present the virtual fireworks 822 and/or the virtual confetti 824 above (e.g., and/or originating from behind or in front of) the viewpoint of the user in the three-dimensional environment 850 (e.g., and irrespective of the location of the virtual playback user interface 830 in the three-dimensional environment 850).

Figure 8E:
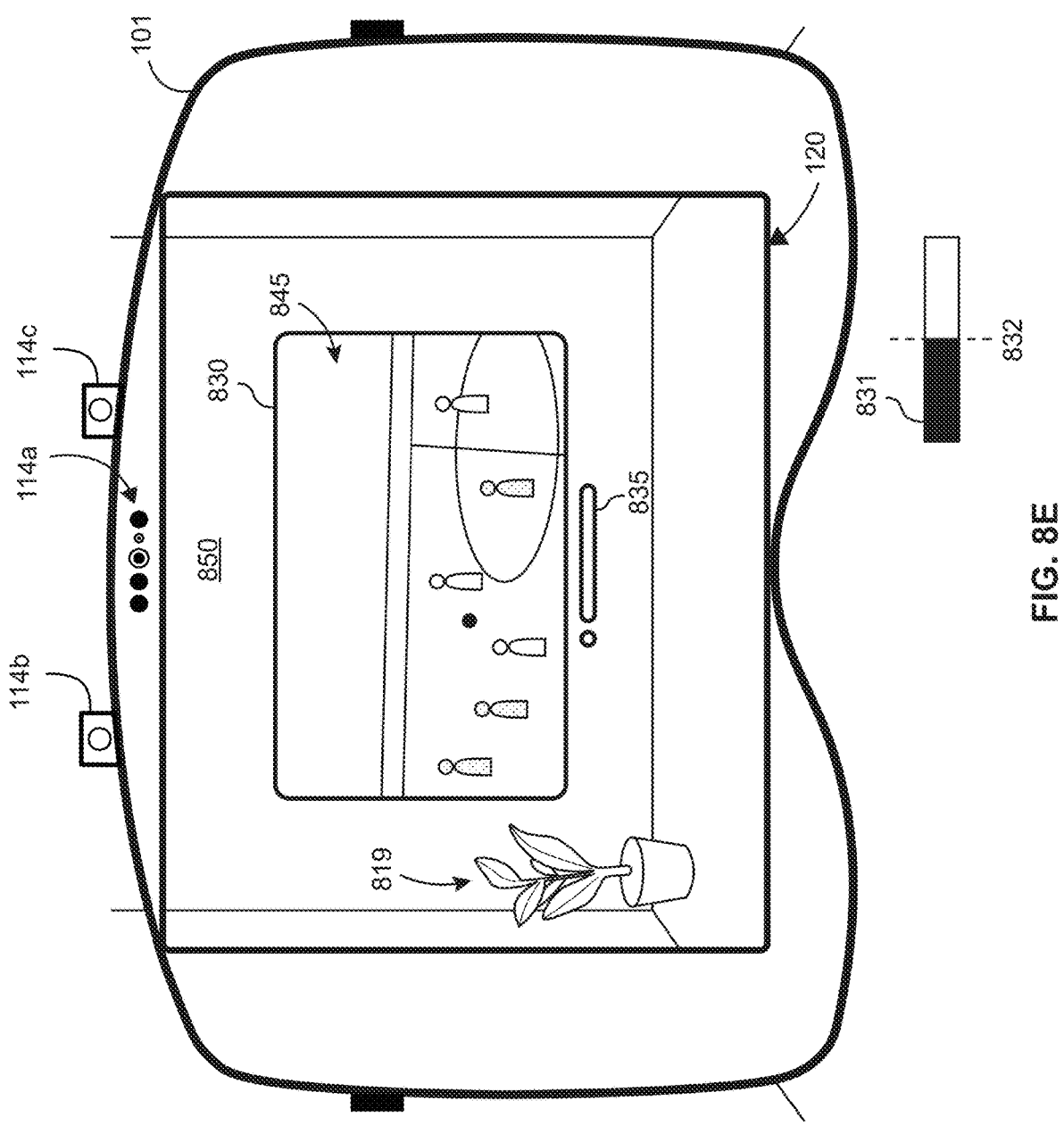

In some examples, as shown in FIG. 8E, the electronic device 101 ceases presentation of the first spatial animation effect in the three-dimensional environment 850 in response to detecting a conclusion of the first event associated with the live content 845. For example, as shown in FIG. 8E, the live soccer game has progressed since the scoring of the goal discussed above with reference to FIGS. 8C-8D. Accordingly, as shown in FIG. 8E, the electronic device 101 ceases presentation of the first spatial animation effect discussed above. Additionally, as shown in FIG. 8E, the electronic device 101 optionally restores the three-dimensional environment 850 to its previous one or more lighting characteristics. For example, as shown in FIG. 8E, the portions of the three-dimensional environment 850 surrounding the virtual playback user interface 830 are returned to their previous brightness level, such that the visibility of the portions of the physical environment surrounding the virtual playback user interface 830 (e.g., the plant 819, the floor and walls) is no longer reduced. In some examples, as shown in FIG. 8E, the electronic device 101 ceases the presentation of the first spatial animation effect after a threshold amount of time (e.g., 1, 2, 3, 4, 5, 10, 15, 20, etc.) seconds has elapsed since detecting the first event associated with the live content 845, as indicated by time 832 in time bar 831.

Figure 8F:
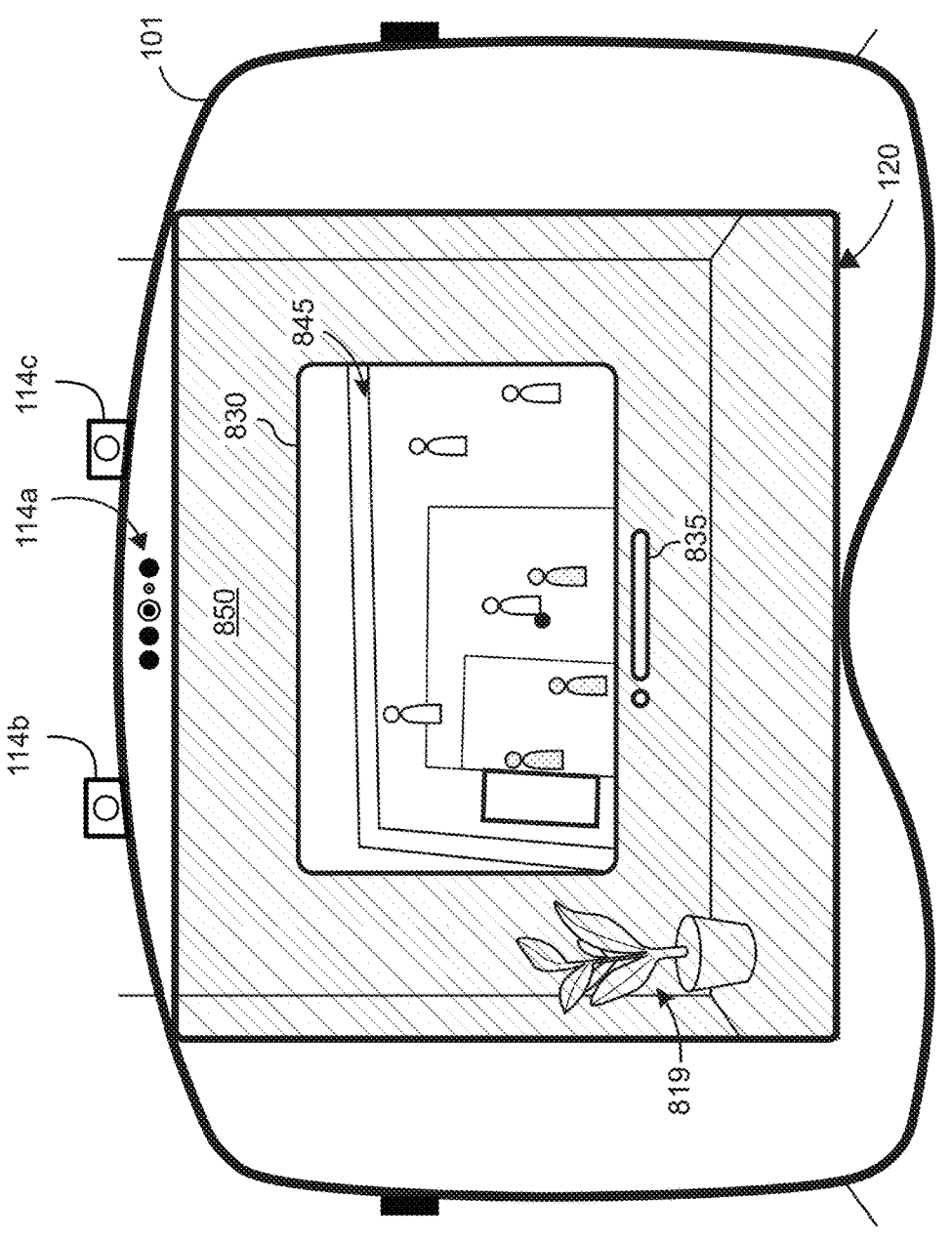

In FIG. 8F, the electronic device 101 detects initiation of a second event associated with the live content 845. For example, as illustrated in FIG. 8F, the electronic device 101 detects initiation of a goal kick attempt in the live soccer game. Alternatively, in FIG. 8F, the electronic device 101 detects setup of a penalty kick in the live soccer game. As illustrated in FIG. 8F, a first player of the second team (e.g., indicated with the solid black outline and no pattern/shading) is preparing to kick the soccer ball into the goal of the first team (e.g., indicated with pattern/shading of the players of the first team). In some examples, the detection of the initiation of the second event has one or more characteristics of detecting the first event discussed above. As shown in FIG. 8F, in response to detecting the initiation of the second event associated with the live content 845, the electronic device 101 adjusts the one or more lighting characteristics of the three-dimensional environment 850 (e.g., dims and/or reduces the visibility of the passthrough of the three-dimensional environment 850), as previously discussed above.

Figure 8G:
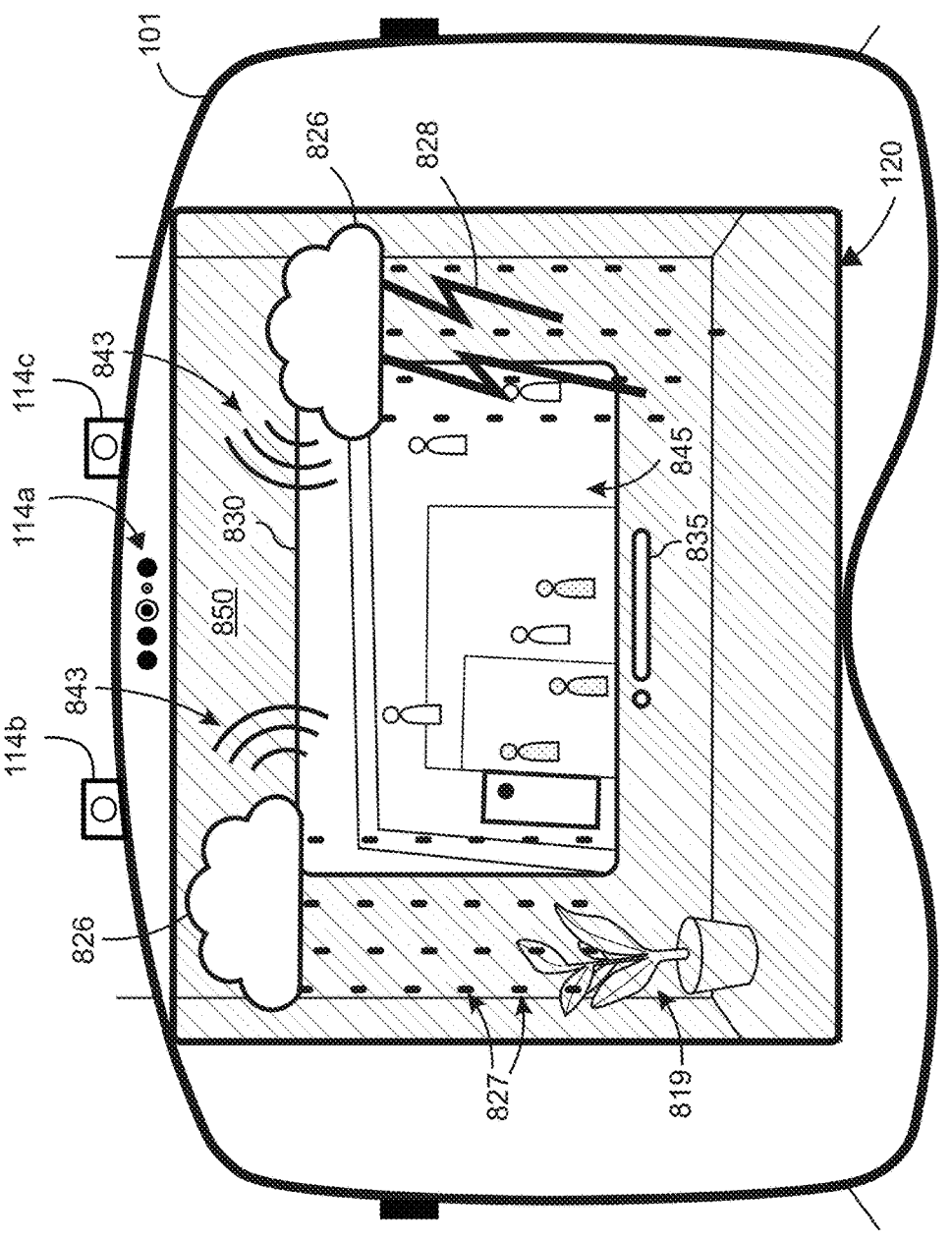

In FIG. 8G, the electronic device 101 determines (e.g., and/or detects) that the second event associated with the live content 845 does not satisfy the one or more criteria described above. For example, in FIG. 8G, the second team successfully scores a goal, but the one or more criteria are not satisfied. In some examples, the electronic device 101 determines that the second event does not satisfy the one or more criteria because the scoring team (e.g., the second team) is not the user's preferred team, as similarly discussed above. In some examples, the electronic device 101 determines that the second event does not satisfy the one or more criteria because the scoring team is the visiting team (e.g., in which case the first team is the home team). In some examples, the electronic device 101 determines that the second event does not satisfy the one or more criteria because the player who scored the goal for the second team is not a user preferred player, as similarly discussed above.

In some examples, as shown in FIG. 8G, in accordance with the determination that the second event does not satisfy the one or more criteria, the electronic device 101 presents a second spatial animation effect, different from the first spatial animation effect, in the three-dimensional environment 850. In some examples, as shown in FIG. 8G, presenting the second spatial animation effect includes presenting virtual clouds 826 in the three-dimensional environment 850. For example, as shown in FIG. 8G, the electronic device 101 displays virtual clouds 826 that are accompanied by virtual rain 827 and/or virtual lightning 828. Additionally, as similarly discussed above, the presentation of the virtual clouds 826 may be accompanied by the presentation of audio 843 corresponding to the virtual clouds 826 (e.g., spatial or stereo audio of rainfall and/or thunder). Alternatively, in some examples, as discussed in more detail later, in accordance with the determination that the second event does not satisfy the one or more criteria, the electronic device 101 forgoes presenting any spatial animation effects in the three-dimensional environment 850. In some examples, as previously discussed above, the electronic device 101 presents the second spatial animation effect based on the location of the virtual playback user interface 830 or based on the location of the viewpoint of the user in the three-dimensional environment 850. Additionally, in some examples, as similarly discussed above, the electronic device 101 ceases presentation of the second spatial animation effect after detecting a conclusion of the second event and/or in accordance with a determination that a threshold amount of time has elapsed since detecting the second event.

In some examples, the live content 845 may be presented via the virtual playback user interface 830 within a multi-user communication session, as discussed below.

Figure 8H:
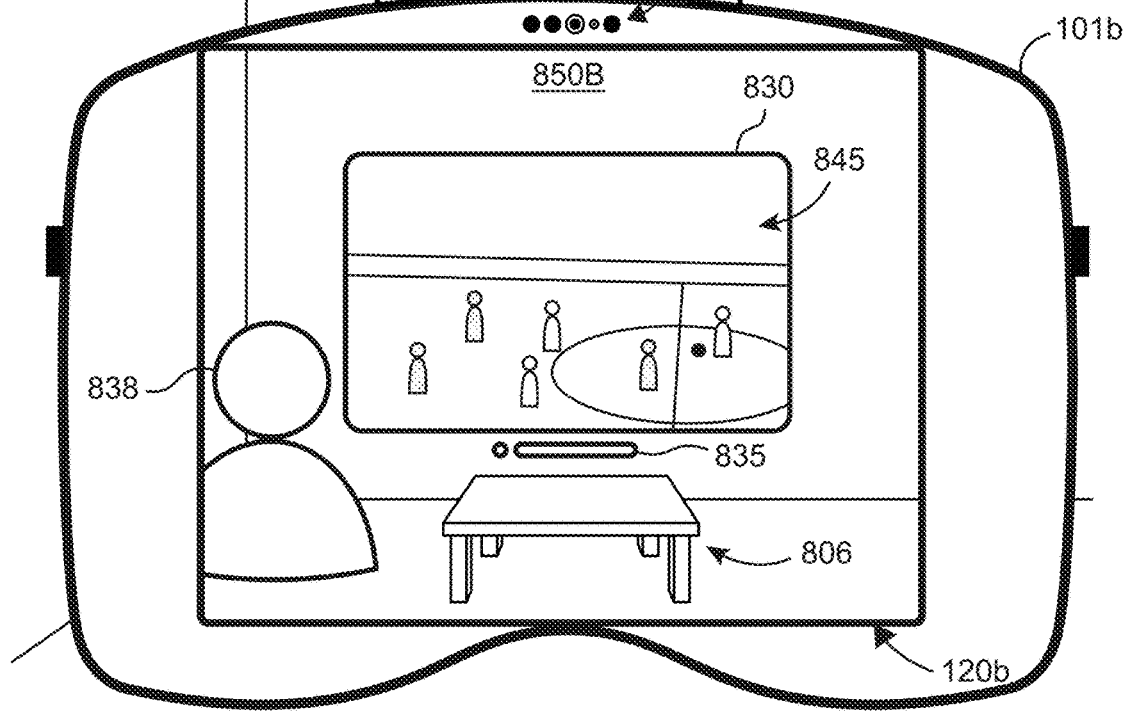

FIGS. 8H-8J illustrate examples of presenting spatial animation effects in a computer-generated environment while a first electronic device and a second electronic device are in a multi-user communication session. In some examples, the first electronic device 101a and the second electronic device 101b are similar to electronic device 101 discussed above. For example, as shown in FIG. 8H, the first electronic device 101a includes one or more internal image sensors 114a-i oriented towards a face of a first user (e.g., eye tracking cameras described below with reference to FIG. 2) and external image sensors 114b-i and 114c-i facing outwards from the first user to detect and/or capture the physical environment of the first electronic device 101a and/or movements of the first user's hands or other body parts. Similarly, as shown in FIG. 8H, the second electronic device 101b includes one or more internal image sensors 114a-ii oriented towards a face of a second user (e.g., eye tracking cameras described below with reference to FIG. 2) and external image sensors 114b-ii and 114c-ii facing outwards from the second user to detect and/or capture the physical environment of the second electronic device 101b and/or movements of the second user's hands or other body parts.

As shown in FIG. 8H, while the first electronic device 101a is in a multi-user communication session with the second electronic device 101b, the first electronic device 101a and the second electronic device 101b are configured to present a shared three-dimensional environment that includes one or more shared virtual objects (e.g., content such as images, video, audio and the like, representations of user interfaces of applications, etc.), as previously described herein with reference to FIGS. 5A-5E. For example, as shown in FIG. 8H, the first electronic device 101a is presenting, via display 120a, three-dimensional environment 850A and the second electronic device 101b is presenting, via display 120b, three-dimensional environment 850B. In some examples, the three-dimensional environment 850A corresponds to the three-dimensional environment 850 discussed above. As similarly discussed above, the three-dimensional environment 850B presented at the second electronic device 101b includes captured portions of the physical environment in which the second electronic device 101b is located. For example, the three-dimensional environment 850B optionally includes a table 806 and floor and walls (e.g., representations of the table 806, floor and walls), as shown in FIG. 8H. In some examples, the representations of the physical environment can include portions of the physical environment viewed through a transparent or translucent display of the second electronic device 101b as passthrough.

In some examples, as similarly discussed above, while the first electronic device 101a is in the multi-user communication session with the second electronic device 101b, an avatar corresponding to the user of one electronic device is optionally displayed in the three-dimensional environment that is displayed via the other electronic device. For example, as shown in FIG. 8H, at the first electronic device 101a, an avatar 836 corresponding to the user of the second electronic device 101b is displayed in the three-dimensional environment 850A, and at the second electronic device 101b, an avatar 838 corresponding to the user of the first electronic device 101a is displayed in the three-dimensional environment 850B. In some examples, displaying the avatars 836/838 has one or more characteristics of displaying avatar 536 described above with reference to FIGS. 5A-5E.

In some examples, as similarly discussed above, while the first electronic device 101a and the second electronic device 101b are in the multi-user communication session, content that is viewed by one user at one electronic device may be shared with another user at the other electronic device in the multi-user communication session. In some such examples, the content may be experienced (e.g., viewed and/or interacted with) by both users (e.g., via their respective electronic devices) in the shared three-dimensional environment (e.g., the content is shared content in the three-dimensional environment). For example, in FIG. 8H, the virtual playback user interface 830 (e.g., including the grabber bar 835) has been shared with the user of the second electronic device 101b (or vice versa). Accordingly, in some examples, as shown in FIG. 8H, the user of the first electronic device 101a and the user of the second electronic device 101b are both viewing the virtual playback user interface 830 that includes the live content 845 discussed previously above (e.g., as indicated by a positioning of the avatar 836 corresponding to the user of the second electronic device 101*b* adjacent to the viewpoint of the user of the first electronic device 101*a* in the three-dimensional environment 850A and a positioning of the avatar 838 corresponding to the user of the first electronic device 101*a* adjacent to the viewpoint of the user of the second electronic device 101*b* in the three-dimensional environment 850B).

In some examples, while the first electronic device 101*a* and the second electronic device 101*b* are in the multi-user communication session, the first electronic device 101*a* and the second electronic device 101*b* are configured to present spatial animation effects based on detection of events associated with the live content 845 that is being played back in the virtual playback user interface 830. Particularly, in some examples, the spatial animation effects may be selectively presented based on user preferences of the two users viewing the live content 845 within the multi-user communication session. For example, as previously discussed herein, the first electronic device 101*a* and the second electronic device 101*b* may determine user preferences based on one or more settings associated with the playback of the live content 845, user data provided by applications running on the electronic device, and/or user input detected passively and/or actively by the electronic device.

In FIG. 8I, the first electronic device 101*a* and the second electronic device 101*b* detect a respective event associated with the live content 845 (e.g., the live soccer game) being played back in the virtual playback user interface 830. In some examples, as shown in FIG. 8I, detecting the respective event associated with the live content 845 includes detecting (e.g., and/or determining) that a player on the first team described previously above (e.g., represented in pattern/shading) has scored a goal. In some examples, as similarly discussed above, the first electronic device 101*a* and the second electronic device 101*b* present a spatial animation effect in response to detecting the respective event in accordance with a determination that the one or more criteria described previously above are satisfied. In some examples, the one or more criteria are specific to each electronic device and/or to each user. For example, satisfaction of the one or more criteria at the first electronic device 101*a* may be determined differently from satisfaction of the one or more criteria at the second electronic device 101*b*. Particularly, as alluded to above, satisfaction of the one or more criteria at each electronic device may be based on whether the respective event associated with the live content 845 adheres to and/or follows the user preferences for each user at each electronic device.

In the example of FIG. 8I, the first team who scored the goal optionally corresponds to a user-preferred (e.g., user-favorited) team for the user of the first electronic device 101*a*, but not for the user of the second electronic device 101*b*. Accordingly, in FIG. 8I, the first electronic device 101*a* determines that the respective event associated with the live content 845 satisfies the one or more criteria for the user of the first electronic device 101*a* and the second electronic device 101*b* determines that the respective event associated with the live content 845 does not satisfy the one or more criteria for the user of the second electronic device 101*b*. In some examples, as similarly discussed above, in accordance with the determination that the respective event satisfies the one or more criteria for the user of the first electronic device 101*a*, the first electronic device 101*a* presents a spatial animation effect in the three-dimensional environment 850A that is based on the live content 845 (e.g., the live soccer game). For example, as shown in FIG. 8I, the first electronic device 101*a* displays virtual confetti 824*a* in the three-dimensional environment 850A. In some examples, a visual appearance of the virtual confetti 824*a* is based on one or more characteristics of the first team (e.g., the scoring team in the example of FIG. 8I). For example, a color, pattern, shading, shape, form, and/or size of the virtual confetti 824*a* may correspond to and/or otherwise be based on visual characteristics of the emblem (e.g., crest or logo) of the first team, a uniform (e.g., home or away uniform) of the first team, and/or a mascot of the first team. In some examples, presentation of the virtual confetti 824*a* has one or more characteristics of the presentation of the virtual confetti 824 described above.

In some examples, as shown in FIG. 8I, in accordance with the determination that the respective event does not satisfy the one or more criteria for the user of the second electronic device 101*b*, the second electronic device 101*b* forgoes presenting a spatial animation effect in the three-dimensional environment 850B. For example, as shown in FIG. 8I, the second electronic device 101*b* forgoes displaying any virtual objects (e.g., other than the virtual playback user interface 830) indicative of a celebration of the respective event discussed above (e.g., the scoring of the goal by the first team). Alternatively, in some examples, in accordance with the determination that the respective event does not satisfy the one or more criteria for the user of the second electronic device 101*b*, the second electronic device 101*b* presents an alternative spatial animation effect in the three-dimensional environment 850B, such as the virtual clouds 826 discussed above with reference to FIG. 8G.

In FIG. 8J, detecting the respective event associated with the live content 845 may alternatively include detecting (e.g., and/or determining) that a player on the second team described previously above (e.g., represented in solid outline with no pattern/shading) has scored a goal (e.g., rather than the first team scoring a goal as illustrated in FIG. 8I). In the example of FIG. 8J, the second team who scored the goal optionally corresponds to a user-preferred (e.g., user-favorited) team for the user of the second electronic device 101*b*, but not for the user of the first electronic device 101*a*. Accordingly, in FIG. 8J, the first electronic device 101*a* determines that the respective event associated with the live content 845 does not satisfy the one or more criteria for the user of the first electronic device 101*a* and the second electronic device 101*b* determines that the respective event associated with the live content 845 satisfies the one or more criteria for the user of the second electronic device 101*b*. In some examples, as similarly discussed above, in accordance with the determination that the respective event satisfies the one or more criteria for the user of the second electronic device 101*b*, the second electronic device 101*b* presents a spatial animation effect in the three-dimensional environment 850B that is based on the live content 845 (e.g., the live soccer game). For example, as shown in FIG. 8J, the second electronic device 101*b* displays virtual confetti 824*b* in the three-dimensional environment 850B. In some examples, as similarly discussed above, a visual appearance of the virtual confetti 824*b* is based on one or more characteristics of the second team (e.g., the scoring team in the example of FIG. 8J). For example, a color, pattern, shading, shape, form, and/or size of the virtual confetti 824*b* may correspond to and/or otherwise be based on visual characteristics of the emblem (e.g., crest or logo) of the second team, a uniform (e.g., home or away uniform) of the second team, and/or a mascot of the second team. Accordingly, the virtual confetti 824*b* shown in FIG. 8J is visually different from the virtual confetti 824*a* shown in FIG. 8I. In some examples, presentation of the virtual confetti 824*b* has one or more characteristics of the presentation of the virtual confetti 824 described above.

Additionally, in some examples, as shown in FIG. 8J, in accordance with the determination that the respective event does not satisfy the one or more criteria for the user of the first electronic device 101*a*, the first electronic device 101*a* forgoes presenting a spatial animation effect in the three-dimensional environment 850A, as similarly discussed above. For example, as shown in FIG. 8J, the first electronic device 101*a* forgoes displaying any virtual objects (e.g., other than the virtual playback user interface 830) indicative of a celebration of the respective event discussed above (e.g., the scoring of the goal by the second team). Alternatively, in some examples, as similarly discussed above, in accordance with the determination that the respective event does not satisfy the one or more criteria for the user of the first electronic device 101*a*, the first electronic device 101*a* presents an alternative spatial animation effect in the three-dimensional environment 850A, such as the virtual clouds 826 discussed above with reference to FIG. 8G.

Accordingly, as outlined above, presenting spatial animation effects in a computer-generated environment based on detecting respective events associated with a content item being played back in the computer-generated environment helps enhance the viewing experience of the content item for the user and/or helps simulate an in-person viewing experience of the performance/athletic event of the content item, thereby improving user-device interaction. As another benefit, providing spatial animation effects in a computer-generated environment within a multi-user communication session helps foster a sense of camaraderie and/or healthy competition among users participating in the multi-user communication session, which also enhances the viewing experience of the content item for the users in the multi-user communication session.

Attention is now directed toward examples of presenting spatial animation effects in a computer-generated environment (e.g., a three-dimensional environment) based on detecting a conclusion of live content being played back in the computer-generated environment.

Figure 9A:
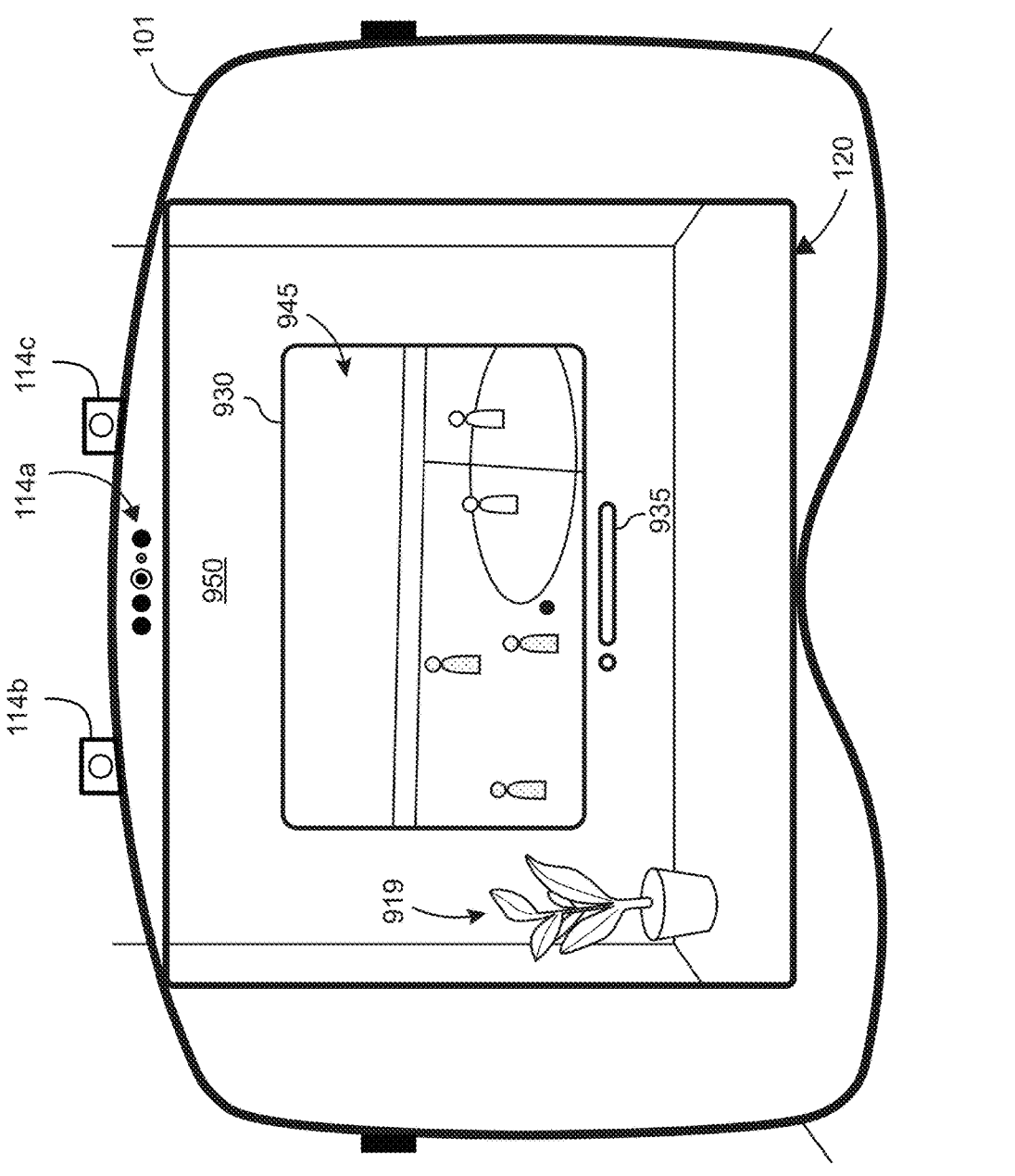
FIGS. 9A-9E illustrate examples of presenting spatial animation effects in accordance with detecting a conclusion of a live event content item according to some examples of the disclosure.

FIGS. 9A-9E illustrate examples of presenting spatial animation effects in accordance with detecting a conclusion of a live event content item according to some examples of the disclosure. In some examples, as shown in FIG. 9A, a three-dimensional environment 950 (e.g., an extended reality environment) may be presented using electronic device 101. In some examples, the electronic device 101 optionally corresponds to or is similar to electronic devices 301, 401, 501 and/or 101 discussed above. In some examples, the three-dimensional environment 950 includes captured portions of the physical environment in which electronic device 101 is located. For example, the three-dimensional environment 950 optionally includes a plant 919 and floor and walls (e.g., representations of the plant 919, floor and walls), as shown in FIG. 9A. In some examples, the three-dimensional environment 950 has one or more characteristics of three-dimensional environment 850/550/450/350 described above. In some examples, the representations of the physical environment can include portions of the physical environment viewed through a transparent or translucent display of electronic device 101 as passthrough.

Additionally, in some examples, as shown in FIG. 9A, the electronic device 101 is displaying virtual playback user interface 930 that includes live content 945 in the three-dimensional environment 950. In the example of FIG. 9A, the live content 945 corresponds to live content 845 discussed above (e.g., the live soccer game). For example, as shown in FIG. 9A, the live soccer game is being played between the first team (e.g., represented with shading/pattern) and the second team (e.g., represented with solid outline without shading/pattern) described previously above with reference to FIGS. 8A-8J. Additionally, as similarly discussed above, the virtual playback user interface 930 is displayed with grabber affordance 935 that is selectable to initiate movement of the virtual playback user interface 930 within the three-dimensional environment 950. In some examples, the display of the virtual playback user interface 930 has one or more characteristics of the display of virtual playback user interface 830 discussed above.

Figure 9B:
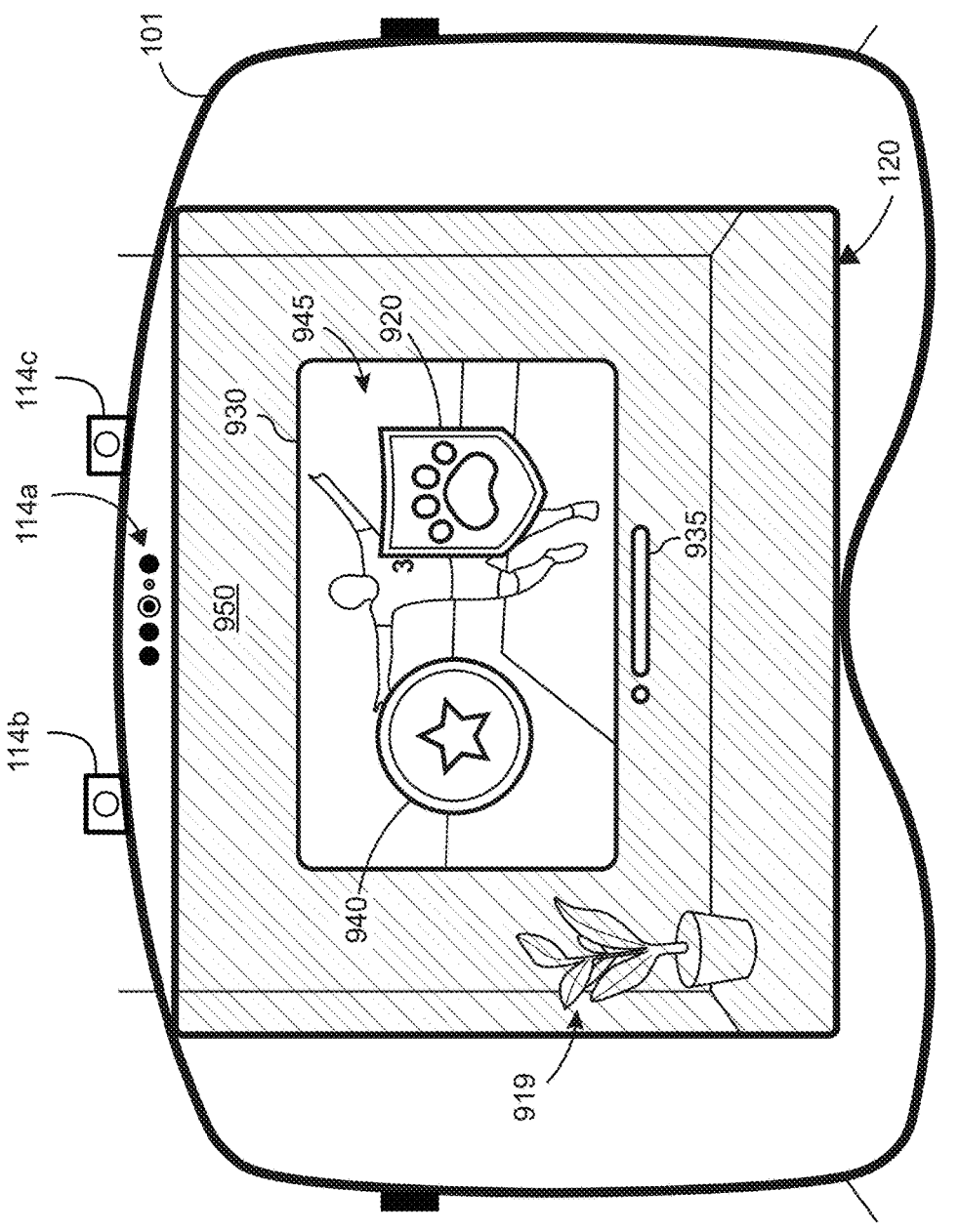

In FIG. 9B, the electronic device 101 detects a conclusion of the live content 945 being played back in the virtual playback user interface 930. For example, the electronic device 101 detects that the live soccer game being played back in the virtual playback user interface 930 has ended. In some examples, the electronic device 101 determines that the live content 945 has concluded based on broadcast/streaming data provided by the content provider of the live content 945. For example, the broadcast/streaming data includes an indication that the broadcast/stream of the live soccer game is ending, such that the content provider is no longer going to be broadcasting/streaming the soccer game (e.g., according to a predefined broadcast/streaming schedule of the content provider). As another example, the electronic device 101 determines that the live content 945 has ended via image recognition, optical character recognition, and/or other computer vision techniques. For example, the electronic device 101 visually detects that a game clock associated with the live soccer game has run out, indicating that the match is over. In some examples, the electronic device 101 determines that the live content 945 has ended based on user input detected actively or passively via one or more sensors, cameras, or other input devices in communication with the electronic device 101. For example, the electronic device 101 detects movement of the electronic device 101 caused by movement of the user (e.g., jumping), detects hand motion or other gestures of one or more of the user's hands (e.g., clapping, snapping, pointing, etc.), detects verbal input from the user (e.g., cheering, booing, chanting, singing, etc.), or other input indicating that the soccer game is over.

In some examples, as shown in FIG. 9B, in response to detecting the conclusion of the live content 945, the electronic device 101 initiates presentation of a concluding or final spatial animation effect in the three-dimensional environment 950. In some examples, as shown in FIG. 9B, initiating presentation of the concluding spatial animation effect includes adjusting one or more lighting characteristics of the three-dimensional environment 950. For example, as previously discussed above with reference to FIGS. 8A-8J, the electronic device 101 reduces the brightness level of the portions of the three-dimensional environment 950 surrounding the virtual playback user interface 930 (e.g., dims the passthrough of the physical environment surrounding the virtual playback user interface 930). Additionally, in some examples, as shown in FIG. 9B, initiating presentation of the concluding spatial animation effect includes displaying representations associated with the teams (e.g., or other organizations or groups) that participated in the live content 945. For example, as shown in FIG. 9B, the electronic device 101 displays representation 920 of an emblem of the first team and representation 940 of an emblem of the second team. In some examples, the representations 920 and 940 may alternatively or additionally include a mascot associated with the teams, particular players associated with the teams (e.g., team captains), and/or a name or other title associated with the teams. As shown in FIG. 9B, when the concluding spatial animation effect is initiated, the electronic device 101 optionally displays the representations 920 and 940 at locations in the three-dimensional environment 950 that are in front of the virtual playback user interface 930 from the viewpoint of the user. Additionally, as shown in FIG. 9B, in some examples, the representations 920 and 940 are displayed centrally relative to the virtual playback user interface 930 (e.g., centered on the virtual playback user interface 930 from the viewpoint of the user).

Figure 9C:
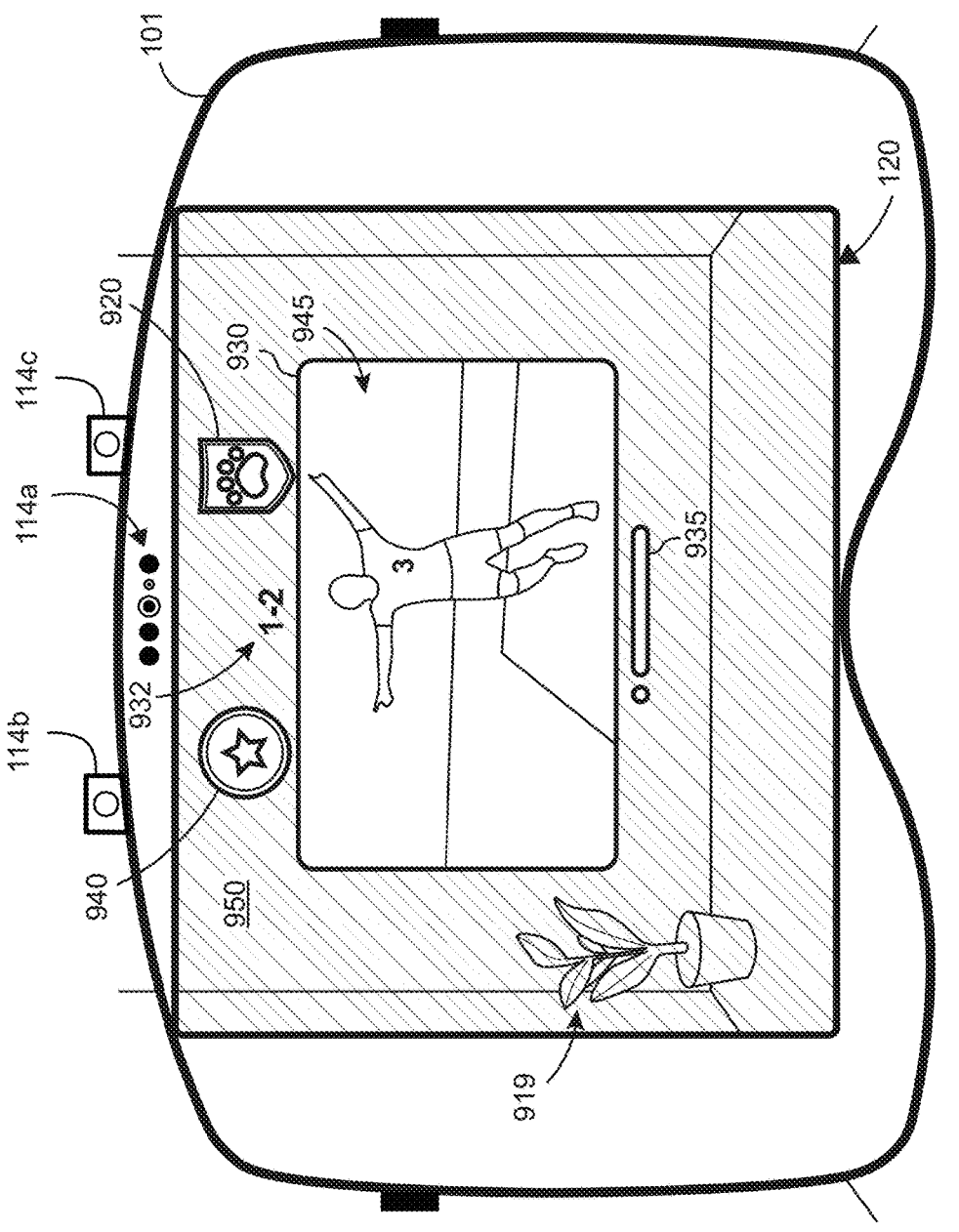

As shown in FIG. 9C, after displaying the representations 920 and 940 in the three-dimensional environment 950, the electronic device 101 continues with the presentation of the concluding spatial animation effect. In some examples, as shown in FIG. 9C, the electronic device 101 moves the representations 920 and 940 from locations in front of the virtual playback user interface 930 from the viewpoint of the user to locations above the virtual playback user interface 930 from the viewpoint of the user. In some examples, as shown in FIG. 9C, when the representations 920 and 940 are moved to be located above the virtual playback user interface 930, the electronic device 101 may adjust the size of the representations 920 and 940 in the three-dimensional environment 950. For example, as shown in FIG. 9C, the sizes of the representations 920 and 940 are reduced relative to the viewpoint of the user in the three-dimensional environment 950. Additionally, in some examples, presenting the concluding spatial animation effect includes displaying a visual indication 932 of a final score, tally, or other outcome of the live content 945. For example, as shown in FIG. 9C, the electronic device 101 displays visual indication 932 indicating that the final score of the live soccer game is "1-2". As shown in FIG. 9C, the visual indication 932 is optionally displayed above the virtual playback user interface 930 and in between the representations 920 and 940 relative to the viewpoint of the user.

Figure 9D:
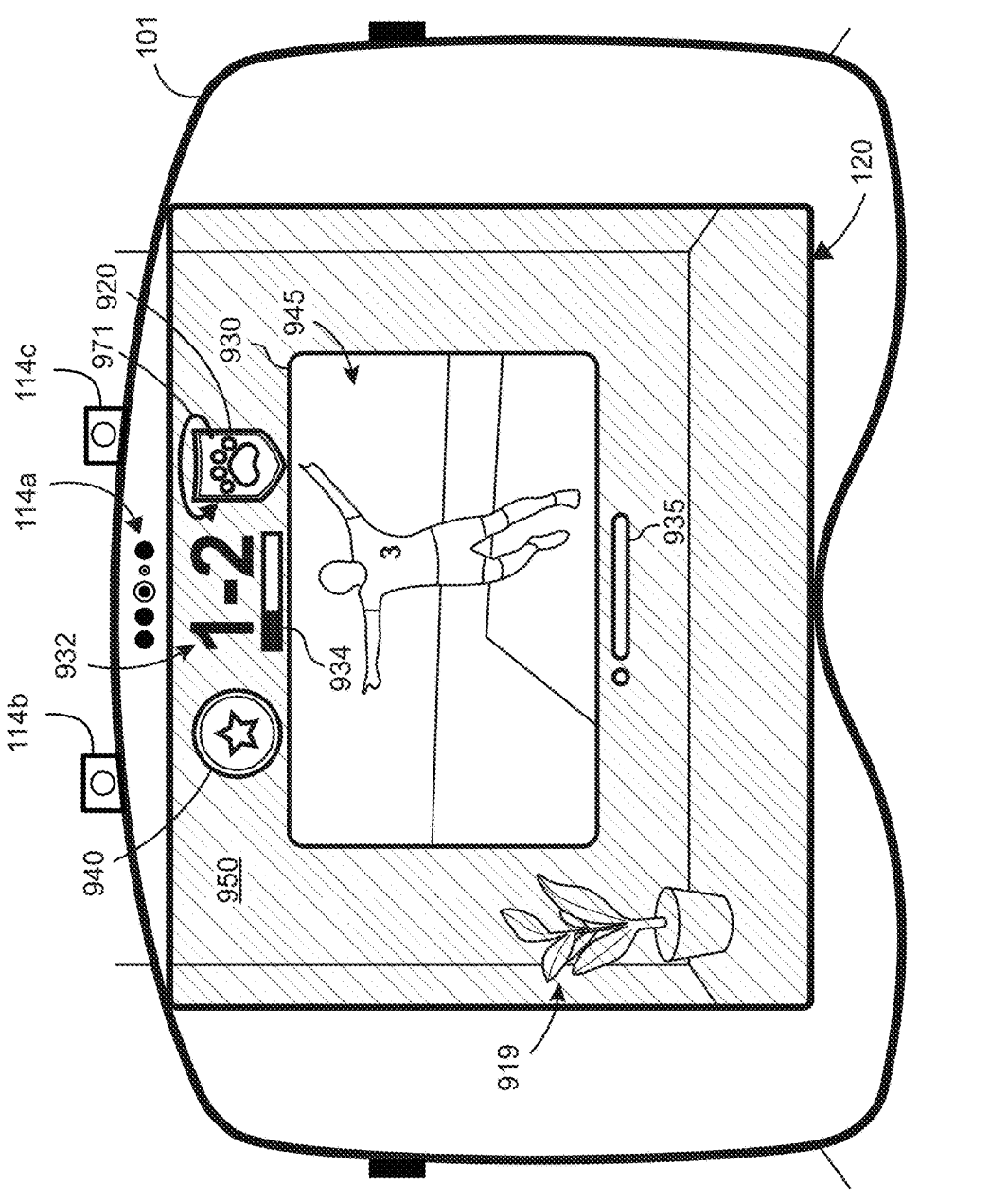

In FIG. 9D, the electronic device 101 progresses the presentation of the concluding spatial animation effect in the three-dimensional environment 950. In some examples, as shown in FIG. 9D, the electronic device 101 increases a size of the visual indication 932 in the three-dimensional environment 950. Additionally, as shown in FIG. 9D, the electronic device 101 displays score bar 934 indicating a proportion or amount (e.g., percentage) of the total points scored that each team achieved. For example, in FIG. 9D, because the first team represented by the representation 920 scored twice the number of points (e.g., goals) as the second team represented by the representation 940, the score bar 934 visually indicates that the proportion of the total points scored by the first team is twice as large as the proportion of the total points scored by the second team. Additionally, in some examples, the electronic device 101 moves the representation 920 in accordance with the progression of the concluding spatial animation effect in the three-dimensional environment 950. For example, as indicated by arrow 971 in FIG. 9D, the electronic device 101 spins/rotates the representation 920 in the three-dimensional environment 950 (e.g., about a vertical axis through a center of the representation 920). Particularly, the electronic device 101 optionally moves the representation 920 (e.g., as opposed to the representation 940) because the representation 920 is associated with the winning team of the live content 945.

Figure 9E:
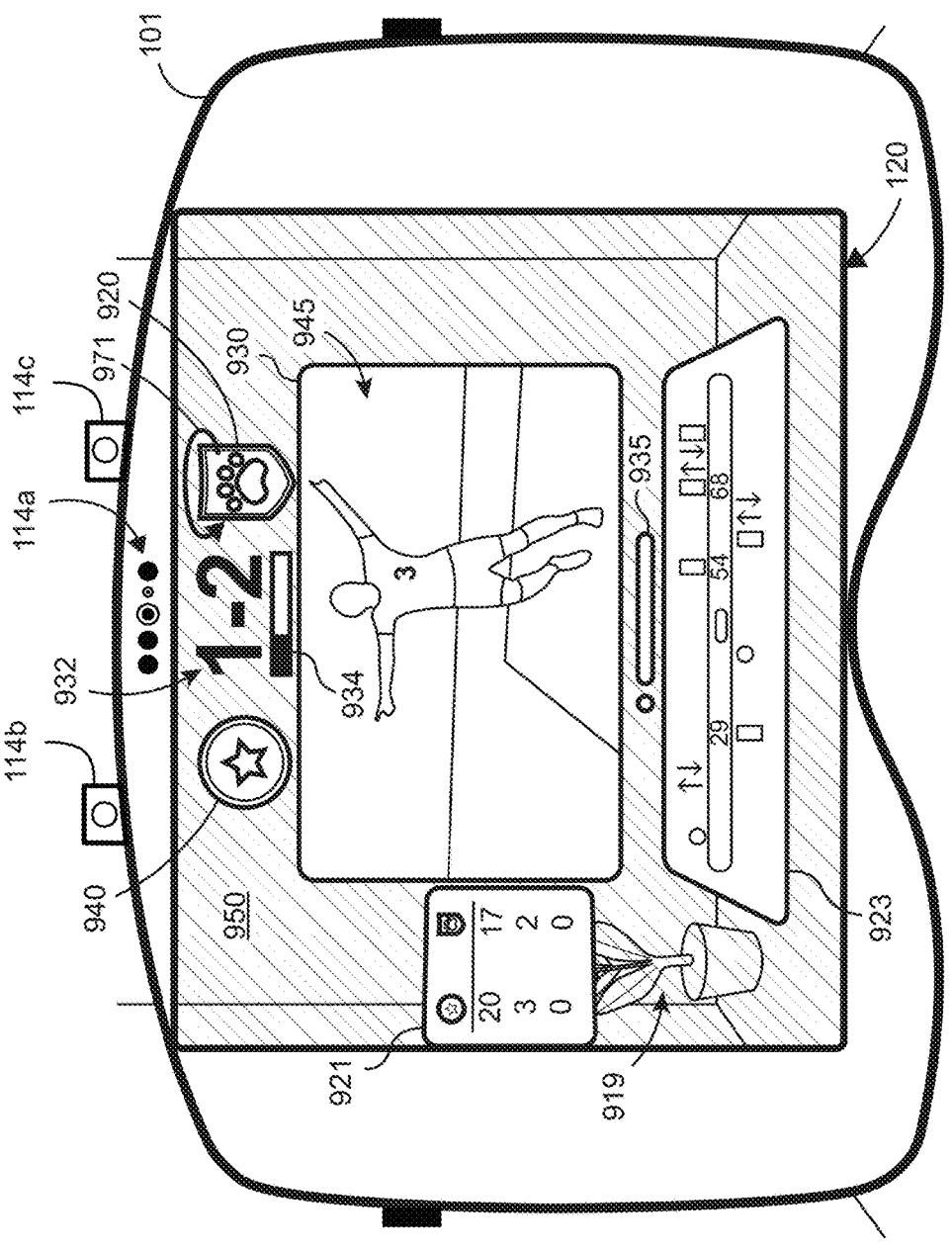

In some examples, as shown in FIG. 9E, the electronic device 101 displays one or more user interface objects corresponding to the live content 945 in the three-dimensional environment 950. For example, as shown in FIG. 9E, the electronic device 101 displays a first user interface object 921 and a second user interface object 923 in the three-dimensional environment 950. In some examples, as shown in FIG. 9E, the first user interface object 921 includes information corresponding to the live content 945, such as statistics associated with the live soccer game. In some examples, the display of the information corresponding to the live content 945 has one or more characteristics of the display of information corresponding to content items as discussed previously above, such as the display of the statistics described with reference to FIG. 3R. In some examples, as shown in FIG. 9E, the second user interface object 923 includes an indication of a timeline associated with the live content 945. For example, as shown in FIG. 9E, the second user interface object 923 provides a visual summary of significant events, such as penalties (e.g., penalty cards and jersey number of the player for whom each penalty card was issued), goals scored (e.g., and jersey number of the scoring player), offside infractions (e.g., and jersey number of the violating player), and/or other significant events, during the two halves (e.g., periods) of the live soccer game. In some examples, the statistics presented in the first user interface object 921 correspond to the events highlighted in the timeline of the second user interface object 923. It should be understood that additional or alternative information corresponding to the live content 945 may be provided in the three-dimensional environment 950. For example, the information provided in the first user interface object 921 and/or the second user interface object 923 may additionally or alternatively include statistics for individual players in the live soccer game, league rankings and/or standings for the teams participating in the live soccer game, and/or indications of managers, coaches, and other staff for the teams participating in the live soccer game. Further, the information provided in the first user interface object 921 and/or the second user interface object 923 may be different for different content items (e.g., different athletic events or different types of content, such as a concert, theater production, musical, movie, television show, or other non-athletic event).

In some examples, the electronic device 101 ceases presentation of the concluding spatial animation effect discussed above after the broadcast/stream of the live content 945 ends. In some examples, the electronic device 101 ceases presentation of the concluding spatial animation effect after a threshold amount of time (e.g., 5, 10, 15, 20, 30, 60, 120, etc. seconds) elapses since initially presenting the concluding spatial animation effect (e.g., displaying the representations 920 and 940 in the three-dimensional environment 950). In some examples, the electronic device 101 ceases presentation of the concluding spatial animation effect after detecting, via one or more input devices, an input corresponding to a request to cease display of the live content 945 and/or the virtual playback user interface 930 in the three-dimensional environment 950 (e.g., a selection input directed toward an exit or close option displayed on or with the virtual playback user interface 930).

It should be understood that, in addition to presenting the concluding spatial animation effect in response to detecting the conclusion of the performance/athletic event (e.g., the live soccer game) of the live content 945, the electronic device 101 may present a spatial animation effect (e.g., similar to the concluding spatial animation effect) during inter-performance or inter-game pauses. For example, the electronic device 101 may present a spatial animation effect that provides a visual indication of a current score of the game, a current leader/winner in the game, and/or a summary of statistics and/or significant events up until the inter-game pause, during a transition between time periods in a particular game (e.g., transition between quarters or innings, halftime, timeout or penalty periods, transition to overtime, etc.). As another example, for a content item that includes a concert, theater production, musical, movie, television show, or other non-athletic event, the electronic device 101 may present a spatial animation effect during a transition between particular acts, scenes, or other periods in the content item (e.g., as an intermission), where the spatial animation effect provides a visual indication of the songs performed up until the pause, actors and/or actresses in the content item, a summary of the scenes or acts up until the pause, etc. It should also be understood that, as similarly discussed above with reference to FIGS. 8H-8J, the concluding spatial animation effect described above may be provided at multiple electronic devices that are in communication within a multi-user communication session. For example, as similarly discussed above, each electronic device in the multi-user communication session may present the concluding spatial animation effect in response to detecting the conclusion of the live content 945.

Accordingly, as outlined above, presenting spatial animation effects in a computer-generated environment based on detecting respective events associated with a content item being played back in the computer-generated environment helps enhance the viewing experience of the content item for the user and/or helps simulate an in-person viewing experience of the performance/athletic event of the content item, thereby improving user-device interaction. As another benefit, providing spatial animation effects in a computer-generated environment within a multi-user communication session helps foster a sense of camaraderie and/or healthy competition among users participating in the multi-user communication session, which also enhances the viewing experience of the content item for the users in the multi-user communication session.

FIG. 10 is a flow diagram illustrating an example process for presenting spatial animation effects in a computer-generated environment in accordance with detecting respective events associated with a live event content item according to some examples of the disclosure. In some examples, process 1000 begins at an electronic device in communication with a display and one or more input devices. In some examples, the electronic device is optionally a head-mounted display similar or corresponding to electronic device 201 of FIG. 2 and/or electronic device 101 of FIGS. 8A-8J. As shown in FIG. 10, in some examples, at 1002, the electronic device presents, via the one or more displays, a virtual playback user interface in a computer-generated environment, wherein the virtual playback user interface is configured to display content. For example, as shown in FIG. 8A, electronic device 101 is displaying virtual playback user interface 830 that includes live content 845 in three-dimensional environment 850.

In some examples, at 1004, while displaying a first content item for a performance event in the virtual playback user interface in the computer-generated environment, the electronic device detects an indication of initiation of a first event associated with the first content item. For example, as described with reference to FIG. 8B, the electronic device 101 detects an indication of initiation of a first event associated with the live content 845, such as setup of a goal kick attempt. In some examples, at 1006, in response to detecting the indication, at 1008, in accordance with a determination that the first event associated with the first content item satisfies one or more criteria, the electronic device presents, via the one or more displays, a first animated spatial effect that is based on the performance event in the computer-generated environment. For example, as shown in FIGS. 8C-8D, the electronic device 101 displays one or more virtual objects, such as representation 820, virtual fireworks 822, virtual confetti 824, and/or three-dimensional representation 821, in the three-dimensional environment 850 that include animated motion.

In some examples, at 1010, in accordance with a determination that the first event associated with the first content item does not satisfy the one or more criteria, the electronic device forgoes presentation of the first animated spatial effect in the computer-generated environment. For example, as shown in FIG. 8G, the electronic device 101 presents a second animated spatial effect (e.g., displaying virtual clouds 826 with rain 827 and/or lightning 828) that is different from the first animated spatial effect.

In some examples, the one or more criteria include a criterion that is satisfied in accordance with a determination that a respective entity (e.g., a sports team) participating in the performance event scores a point (e.g., a goal, run, basket, etc.). In some examples, the criterion is further satisfied in accordance with a determination that the respective entity corresponds to a user-preferred entity (e.g., user-favorited sports team) defined according to one or more user preferences. In some examples, the one or more criteria include a criterion that is satisfied in accordance with a determination that the first event corresponds to a respective action performed by a respective participant (e.g., a particular player, such as a user-favorited player) participating in the performance event. In some examples, the one or more criteria include a criterion that is satisfied in accordance with a determination that a respective venue at which the performance event is taking place is a first venue (e.g., a home field or stadium of the scoring team). In some examples, the one or more criteria include a criterion that is satisfied in accordance with a determination that the performance event corresponds to a user-preferred performance event defined according to one or more user preferences (e.g., a user-favorited sporting event).

It is understood that process 1000 is an example and that more, fewer, or different operations can be performed in the same or in a different order. Additionally, the operations in process 1000 described above are, optionally, implemented by running one or more functional modules in an information processing apparatus such as general-purpose processors (e.g., as described with respect to FIG. 2) or application specific chips, and/or by other components of FIG. 2.

FIG. 11 is a flow diagram illustrating an example process for presenting spatial animation effects in a computer-generated environment in accordance with detecting a conclusion of a live event content item according to some examples of the disclosure. In some examples, process 1100 begins at an electronic device in communication with a display and one or more input devices. In some examples, the electronic device is optionally a head-mounted display similar or corresponding to electronic device 201 of FIG. 2 and/or electronic device 101 of FIGS. 9A-9E. As shown in FIG. 11, in some examples, at 1102, the electronic device presents, via the one or more displays, a virtual playback user interface in a computer-generated environment, wherein the virtual playback user interface is configured to display content. For example, as shown in FIG. 9A, electronic device 101 is displaying virtual playback user interface 930 that includes live content 945 in three-dimensional environment 950.

In some examples, at 1104, while displaying a first content item for a performance event in the virtual playback user interface in the computer-generated environment, the electronic device detects an indication of a conclusion of the performance event of the first content item. For example, as described with reference to FIG. 9B, the electronic device 101 detects that the live soccer game of the live content 945 in the three-dimensional environment 950 has ended (e.g., the game clock has run out). In some examples, at 1106, in response to detecting the indication, the electronic device presents, via the one or more displays, a spatial animation effect that is based on the conclusion of the performance event in the computer-generated environment. For example, as shown in FIGS. 9C-9E, the electronic device 101 presents a concluding spatial animation effect that provides a visual summary of the live content 945 in the three-dimensional environment 950.

In some examples, at 1108, the electronic device displays a plurality of first virtual objects corresponding to the performance event at a plurality of first locations relative to the virtual playback user interface in the computer-generated environment. For example, as shown in FIG. 9B, the electronic device 101 displays representation 920 corresponding to a first team participating in the live soccer game and representation 940 corresponding to a second team participating in the live soccer game in front of the virtual playback user interface 930 in the three-dimensional environment 950 from the viewpoint of the user of the electronic device 101. In some examples, at 1110, the electronic device 101 moves the plurality of first virtual objects from the plurality of first locations to a plurality of second locations, different from the plurality of first locations, relative to the virtual playback user interface in the computer-generated environment. For example, as shown in FIG. 9C, the electronic device 101 moves the representations 920 and 940 from in front of the virtual playback user interface 930 to above the virtual playback user interface 930 in the three-dimensional environment 950 from the viewpoint of the user.

It is understood that process 1100 is an example and that more, fewer, or different operations can be performed in the same or in a different order. Additionally, the operations in process 1100 described above are, optionally, implemented by running one or more functional modules in an information processing apparatus such as general-purpose processors (e.g., as described with respect to FIG. 2) or application specific chips, and/or by other components of FIG. 2.

Therefore, according to the above, some examples of the disclosure are directed to a method, comprising at an electronic device in communication with a display and one or more input devices: presenting, via the display, a computer-generated environment including a virtual playback user interface that is configured to display content; while displaying a first content item for an event in the virtual playback user interface in the computer-generated environment, presenting, via the display, a three-dimensional representation corresponding to the first content item, wherein the three-dimensional representation includes at least one of: representations of participants in the event and a representation of a venue of the event, and wherein at least a subset of the representations of the participants in the event and/or the representation of the venue of the event is not currently displayed in the first content item; while concurrently presenting the virtual playback user interface that is displaying the first content item and the three-dimensional representation in the computer-generated environment, detecting, via the one or more input devices, a first input corresponding to a request to change one or more visual characteristics of the three-dimensional representation; and in response to detecting the first input updating display of the three-dimensional representation in the computer-generated environment based on changes to the one or more visual characteristics of the three-dimensional representation in accordance with the first input, without updating display of the first content item in the virtual playback user interface.

Additionally or alternatively, in some examples, the first content item corresponds to a live event content item for a live event. Additionally or alternatively, in some examples, the electronic device includes a head-mounted display. Additionally or alternatively, in some examples, the method further comprises: while displaying the first content item in the virtual playback user interface in the computer-generated environment and before presenting the three-dimensional representation corresponding to the first content item, detecting an indication that supplemental content for the first content item is available; and in response to detecting the indication, displaying a notification that supplemental content for the first content item is available for display in the computer-generated environment, wherein the notification is selectable to initiate display of the supplemental content for the first content item, including the three-dimensional representation, in the computer-generated environment. Additionally or alternatively, in some examples, the three-dimensional representation corresponding to the first content item is displayed in the computer-generated environment in response to detecting, via the one or more input devices, a selection of the notification. Additionally or alternatively, in some examples, the first content item corresponds to a live broadcast of a sports game. Additionally or alternatively, in some examples, the method further comprises: while concurrently presenting the virtual playback user interface that is displaying the first content item and the three-dimensional representation in the computer-generated environment, detecting a progression of a current playback position within the first content item; and in response to detecting the progression of the current playback position, updating display of the three-dimensional representation in the computer-generated environment in accordance with the progression of the current playback position within the first content item. Additionally or alternatively, in some examples, updating display of the three-dimensional representation in the computer-generated environment includes updating display of the representations of the participants in the event based on data corresponding to participant activity in the event.

Additionally or alternatively, in some examples, the three-dimensional representation corresponding to the event is generated based on volumetric data of the event provided by a content provider for the first content item, and the volumetric data of the event includes information corresponding to images captured via a plurality of cameras used to produce a live broadcast of the event. Additionally or alternatively, in some examples, the three-dimensional representation corresponding to the event is generated based on joint-based data of the participants in the event provided by a content provider for the event content item, and the joint-based data of the participants in the event includes information corresponding to skeletal tracking of movement of the participants in the event. Additionally or alternatively, in some examples, the first input corresponding to the request to change the one or more visual characteristics of the three-dimensional representation corresponds to a request to move the three-dimensional representation within the computer-generated environment, and updating display of the three-dimensional representation in the computer-generated environment based on the changes to the one or more visual characteristics of the three-dimensional representation includes moving the three-dimensional representation within the computer-generated environment, without moving the virtual playback user interface. Additionally or alternatively, in some examples, the first input corresponding to the request to change the one or more visual characteristics of the three-dimensional representation corresponds to a request to scale the three-dimensional representation within the computer-generated environment, and updating display of the three-dimensional representation in the computer-generated environment based on the changes to the one or more visual characteristics of the three-dimensional representation includes scaling the three-dimensional representation within the computer-generated environment, without scaling the first content item displayed in the virtual playback user interface.

Additionally or alternatively, in some examples the three-dimensional representation is associated with a plurality of predetermined viewing points in the computer-generated environment. In some examples, before detecting the first input, the three-dimensional representation is displayed according to a first predetermined viewing point of the plurality of predetermined viewing points in the computer-generated environment relative to a viewpoint of a user of the electronic device. In some examples, the first input corresponding to the request to change the one or more visual characteristics of the three-dimensional representation corresponds to a request to view the three-dimensional representation from a second predetermined viewing point. In some examples, updating display of the three-dimensional representation in the computer-generated environment based on the changes to the one or more visual characteristics of the three-dimensional representation includes displaying the three-dimensional representation according to the second predetermined viewing point in the computer-generated environment relative to the viewpoint, without updating display of the first content item in the virtual playback user interface. Additionally or alternatively, in some examples, the method further comprises: while concurrently presenting the virtual playback user interface that is displaying the first content item and the three-dimensional representation in the computer-generated environment, detecting, via the one or more input devices, a second input corresponding to a request to scrub through the first content item; and in response to detecting the second input, updating a current playback position within the first content item in accordance with the second input, and updating display of the three-dimensional representation based on an updated current playback position within the first content item.

Additionally or alternatively, in some examples, the method further comprises: while concurrently presenting the virtual playback user interface that is displaying the first content item and the three-dimensional representation in the computer-generated environment, detecting replay of a portion of the first content item that has already been played back; and in response to detecting the replay of the portion of the first content item, updating display of the three-dimensional representation based on the replay of the portion of the first content item, including displaying the representations of the participants in the event from a first viewing point relative to a viewpoint of the user that is different from a second viewing point from which the replay of the portion of the first content item is displayed. Additionally or alternatively, in some examples, presenting the three-dimensional representation corresponding to the first content item further includes displaying information including one or more statistics associated with the first content item that are updated based on a current playback position with the first content item. Additionally or alternatively, in some examples, the one or more statistics are one or more first statistics associated with the first content item. In some examples, the method further comprises: while concurrently presenting the virtual playback user interface that is displaying the first content item, the three-dimensional representation, and the one or more first statistics in the computer-generated environment, detecting a progression of the current playback position within the first content item; and in response to detecting the progression of the current playback position, updating the information to include one or more second statistics, different from the one or more first statistics, associated with the first content item based on the progression of the current playback position. Additionally or alternatively, in some examples, the method further comprises: while concurrently presenting the virtual playback user interface that is displaying the first content item and the three-dimensional representation in the computer-generated environment, detecting an indication that a respective event has occurred during the event of the first content item; and in response to detecting the indication, displaying an animated spatial effect within the computer-generated environment.

Additionally or alternatively, in some examples, the method further comprises: while concurrently presenting the virtual playback user interface that is displaying the first content item and the three-dimensional representation in the computer-generated environment, receiving an invitation to join a communication session with a user of a second electronic device, different from the electronic device; and in response to receiving the invitation, in accordance with a determination that the invitation is accepted by the user of the electronic device, entering the communication session with the user of the second electronic device, including concurrently displaying an avatar corresponding to the user of the second electronic device, the virtual playback user interface that is displaying the first content item, and the three-dimensional representation corresponding to the first content item. Additionally or alternatively, in some examples, the avatar corresponding to the user of the second electronic device is displayed with one or more virtual accessories associated with the event. Additionally or alternatively, in some examples, the method further comprises: while concurrently presenting the virtual playback user interface that is displaying the first content item, the three-dimensional representation, and the avatar corresponding to the user of the second electronic device in the computer-generated environment, detecting an indication of a respective input detected via one or more input devices of the second electronic device directed to the three-dimensional representation; and in response to detecting the indication, updating display of the three-dimensional representation in the computer-generated environment based on the respective input, including displaying a virtual annotation with the three-dimensional representation.

Some examples of the disclosure are directed to a method, comprising at an electronic device in communication with a display and one or more input devices: presenting, via the display, a computer-generated environment including a virtual playback user interface that is configured to display content; while displaying a first content item for an event in the virtual playback user interface in the computer-generated environment, presenting, via the display, a first three-dimensional representation of a first participant in the event, wherein the first three-dimensional representation has a size that corresponds to a size of the first participant; while concurrently presenting the virtual playback user interface that is displaying the first content item and the first three-dimensional representation in the computer-generated environment, detecting, via the one or more input devices, a first input directed to the first three-dimensional representation; and in response to detecting the first input, causing the first three-dimensional representation of the first participant to perform a first operation in the computer-generated environment.

Additionally or alternatively, in some examples, the first content item corresponds to a live event content item for a live event. Additionally or alternatively, in some examples, the first operation is performed based on data corresponding to one or more physical abilities of the first participant. Additionally or alternatively, in some examples, the method further comprises: while concurrently presenting the virtual playback user interface that is displaying the first content item and the first three-dimensional representation in the computer-generated environment, detecting a progression of a current playback position within the first content item; and in response to detecting the progression of the current playback position, updating display of the first three-dimensional representation of the first participant in the computer-generated environment based on the progression of the current playback position. Additionally or alternatively, in some examples, updating display of the first three-dimensional representation of the first participant in the computer-generated environment includes ceasing display of the first three-dimensional representation in the computer-generated environment. Additionally or alternatively, in some examples, updating display of the first three-dimensional representation of the first participant in the computer-generated environment includes replacing display of the first three-dimensional representation with a second three-dimensional representation of a second participant, different from the first participant, in the first in the computer-generated environment. Additionally or alternatively, in some examples, the first participant in the event corresponds to a first player in a sports game that is being broadcast live. Additionally or alternatively, in some examples, the first player in the sports game is a member of a first sports team competing in the sports game, and the first player is selected from the first sports team for generating the first three-dimensional representation based on one or more user preferences. Additionally or alternatively, in some examples, the first three-dimensional representation of the first participant is further displayed with information that includes one or more statistics associated with the first participant.

Additionally or alternatively, in some examples, the method further comprises: while concurrently presenting the virtual playback user interface that is displaying the first content item and the first three-dimensional representation in the computer-generated environment, detecting, via the one or more input devices, a second input corresponding to a request to move the first three-dimensional representation within the computer-generated environment; and in response to detecting the second input, moving the first three-dimensional representation of the first participant within the computer-generated environment in accordance with the second input. Additionally or alternatively, in some examples, the first input corresponds to a selection of the first three-dimensional representation, and causing the first three-dimensional representation to perform the first operation in the computer-generated environment includes causing the first three-dimensional representation to move within the computer-generated environment independent of input for moving the first three-dimensional representation. Additionally or alternatively, in some examples, the method further comprises: while concurrently presenting the virtual playback user interface that is displaying the first content item and the first three-dimensional representation in the computer-generated environment, detecting replay of a portion of the first content item that has already been played back; and in response to detecting the replay of the portion of the first content item, causing the first three-dimensional representation of the first participant to perform a second operation in the computer-generated environment based on the replay of the portion of the first content item. Additionally or alternatively, in some examples, causing the first three-dimensional representation of the first participant to perform the second operation includes reenacting a movement of the first participant in the event that occurred during the portion of the first content item. Additionally or alternatively, in some examples, presenting the first three-dimensional representation of the first participant in the computer-generated environment includes applying a visual filtering effect to portions of the computer-generated environment surrounding the first three-dimensional representation and the virtual playback user interface that is displaying the first content item, wherein one or more characteristics of the visual filtering effect are generated based on an affiliation of the first participant in the event.

Additionally or alternatively, in some examples, the method further comprises: while concurrently presenting the virtual playback user interface that is displaying the first content item and the first three-dimensional representation in the computer-generated environment, detecting, via the one or more input devices, a second input corresponding to a request to save the first three-dimensional representation as a virtual figurine belonging to a user of the electronic device; and in response to detecting the second input, initiating a process to generate a virtual figurine corresponding to the first participant that is accessible to the user of the electronic device. Additionally or alternatively, in some examples, the virtual figurine corresponding to the first participant is configured to be accessible to the user via display of the virtual figurine on a respective surface of a physical object in the computer-generated environment. Additionally or alternatively, in some examples, presenting the first three-dimensional representation of the first participant in the computer-generated environment includes presenting spatial audio corresponding to the first three-dimensional representation concurrently with stereo audio corresponding to the first content item. Additionally or alternatively, in some examples, causing the first three-dimensional representation of the first participant to perform the first operation includes presenting spatial audio corresponding to the first operation. Additionally or alternatively, in some examples, the first three-dimensional representation of the first participant is generated based on joint-based data of the first participant in the event provided by a content provider for the first content item, and the joint-based data of the first participant in the event includes information corresponding to skeletal tracking of movement of the first participant.

Some examples of the disclosure are directed to a method, comprising at an electronic device in communication with one or more displays and one or more input devices: presenting, via the one or more displays, a virtual playback user interface in a computer-generated environment, wherein the virtual playback user interface is configured to display content; while displaying a first content item for a performance event in the virtual playback user interface in the computer-generated environment, detecting an indication of initiation of a first event associated with the first content item; and in response to detecting the indication, in accordance with a determination that the first event associated with the first content item satisfies one or more criteria, presenting, via the one or more displays, a first animated spatial effect that is based on the performance event in the computer-generated environment, and in accordance with a determination that the first event associated with the first content item does not satisfy the one or more criteria, forgoing presentation of the first animated spatial effect in the computer-generated environment.

Additionally or alternatively, in some examples, the performance event corresponds to an athletic event. Additionally or alternatively, in some examples, the one or more criteria include a criterion that is satisfied in accordance with a determination that a respective team participating in the athletic event scores a point. Additionally or alternatively, in some examples, the criterion is further satisfied in accordance with a determination that the respective team corresponds to a user-preferred team defined according to one or more user preferences. Additionally or alternatively, in some examples, the method further comprises, in response to detecting the indication, in accordance with the determination that the first event associated with the first content item does not satisfy the one or more criteria because a first team that does not correspond to a user-preferred team participating in the athletic event scores a point, presenting, via the one or more displays, a second animated spatial effect, different from the first animated spatial effect, that is based on the athletic event in the computer-generated environment. Additionally or alternatively, in some examples, the first animated spatial effect includes one or more first visual attributes that are based on one or more visual characteristics of the respective team. Additionally or alternatively, in some examples, the one or more criteria include a criterion that is satisfied in accordance with a determination that the first event corresponds to a respective action performed by a respective player participating in the athletic event. Additionally or alternatively, in some examples, the one or more criteria include a criterion that is satisfied in accordance with a determination that a respective venue at which the athletic event is taking place is a first venue.

Additionally or alternatively, in some examples, the one or more criteria include a criterion that is satisfied in accordance with a determination that the performance event corresponds to a user-preferred performance event defined according to one or more user preferences. Additionally or alternatively, in some examples, the method further comprises, in response to detecting the indication, in accordance with the determination that the first event associated with the first content item does not satisfy the one or more criteria, presenting, via the one or more displays, a second animated spatial effect, different from the first animated spatial effect, that is based on the performance event in the computer-generated environment. Additionally or alternatively, in some examples, the method further comprises: after presenting the first animated spatial effect in the computer-generated environment in accordance with the determination that the first event associated with the first content item satisfied the one or more criteria in response to detecting the indication, detecting an indication of a conclusion of the first event; and in response to detecting the indication of the conclusion of the first event, ceasing presentation of the first animated spatial effect in the computer-generated environment. Additionally or alternatively, in some examples, before detecting the indication, a portion of the computer-generated environment surrounding the virtual playback user interface is displayed with a first level of brightness relative to the virtual playback user interface, the method further comprising, in response to detecting the indication, updating display, via the one or more displays, of the portion of the computer-generated environment surrounding the virtual playback user interface to be displayed with a second level of brightness, less than the first level of brightness, relative to the virtual playback user interface. Additionally or alternatively, in some examples, presenting the first animated spatial effect includes displaying, via the one or more displays, a plurality of virtual objects associated with the performance event at a plurality of locations in the computer-generated environment.

Additionally or alternatively, in some examples, presenting the first animated spatial effect includes displaying a three-dimensional representation of a first participant in the performance event who is associated with the first event in the computer-generated environment. Additionally or alternatively, in some examples, the first animated spatial effect is generated based on metadata corresponding to the first content item provided by a content provider for the first content item. Additionally or alternatively, in some examples, presentation of the first animated spatial effect is based on a location of the virtual playback user interface in the computer-generated environment. Additionally or alternatively, in some examples, presentation of the first animated spatial effect is based on a viewpoint of a user of the electronic device in the computer-generated environment. Additionally or alternatively, in some examples, presenting the first animated spatial effect includes outputting first audio corresponding to the first animated spatial effect, wherein the first audio is different from audio corresponding to the first content item. Additionally or alternatively, in some examples, the method further comprises: while displaying the first content item for the performance event in the virtual playback user interface in the computer-generated environment, detecting an indication of initiation of a second event associated with the first content item; and in response to detecting the indication, in accordance with a determination that the second event associated with the first content item satisfies the one or more criteria, presenting, via the one or more displays, a second animated spatial effect that is based on the performance event in the computer-generated environment, and in accordance with a determination that the second event associated with the first content item does not satisfy the one or more criteria, forgoing presentation of the second animated spatial effect in the computer-generated environment.

Additionally or alternatively, in some examples, the method further comprises: while displaying the first content item for the performance event in the virtual playback user interface in the computer-generated environment, detecting an indication of conclusion of the performance event; and in response to detecting the indication, presenting, via the one or more displays, a second spatial animation effect that is based on the conclusion of the performance event in the computer-generated environment. Additionally or alternatively, in some examples, presenting the second spatial animation effect includes: displaying, via the one or more displays, a plurality of virtual objects corresponding to a plurality of entities participating in the performance event at a first plurality of locations in the computer-generated environment; and moving the plurality of virtual objects to a second plurality of locations, different from the first plurality of locations, in the computer-generated environment. Additionally or alternatively, in some examples, presenting the second spatial animation effect includes displaying, via the one or more displays, a visual indication of a final outcome associated with the performance event. Additionally or alternatively, in some examples, presenting the second spatial animation effect includes displaying, via the one or more displays, information including one or more statistics associated with the first content item.

Some examples of the disclosure are directed to a method comprising at an electronic device in communication with one or more displays and one or more input devices: presenting, via the one or more displays, a virtual playback user interface in a computer-generated environment, wherein the virtual playback user interface is configured to display content; while displaying a first content item for a performance event in the virtual playback user interface in the computer-generated environment, detecting an indication of a conclusion of the performance event of the first content item; and in response to detecting the indication, presenting, via the one or more displays, a spatial animation effect that is based on the conclusion of the performance event in the computer-generated environment, including displaying a plurality of first virtual objects corresponding to the performance event at a plurality of first locations relative to the virtual playback user interface in the computer-generated environment, and moving the plurality of first virtual objects from the plurality of first locations to a plurality of second locations, different from the plurality of first locations, relative to the virtual playback user interface in the computer-generated environment.

Additionally or alternatively, in some examples, the plurality of first virtual objects corresponds to a plurality of entities participating in the performance event. Additionally or alternatively, in some examples, the plurality of first locations relative to the virtual playback user interface in the computer-generated environment are located in front of the virtual playback user interface from a viewpoint of a user of the electronic device, and the plurality of second locations relative to the virtual playback user interface in the computer-generated environment are located above the virtual playback user interface from the viewpoint. Additionally or alternatively, in some examples, while displaying the plurality of first virtual objects at the plurality of first locations relative to the virtual playback user interface in the computer-generated environment, the plurality of first virtual objects is displayed at a first size relative to a viewpoint of a user of the electronic device, and while displaying the plurality of first virtual objects at the plurality of second locations relative to the virtual playback user interface in the computer-generated environment, the plurality of second virtual objects is displayed at a second size, different from the first size, relative to the viewpoint. Additionally or alternatively, in some examples, presenting the spatial animation effect includes displaying, via the one or more displays, a visual indication of a final outcome associated with the performance event. Additionally or alternatively, in some examples, presenting the spatial animation effect includes displaying, via the one or more displays, information including one or more statistics associated with the first content item. Additionally or alternatively, in some examples, before detecting the indication, a portion of the computer-generated environment surrounding the virtual playback user interface is displayed with a first level of brightness relative to the virtual playback user interface, the method further comprising, in response to detecting the indication, updating display, via the one or more displays, of the portion of the computer-generated environment surrounding the virtual playback user interface to be displayed with a second level of brightness, less than the first level of brightness, relative to the virtual playback user interface. Additionally or alternatively, in some examples, the electronic device includes a head-mounted display.

Some examples of the disclosure are directed to an electronic device, comprising: one or more processors; memory; and one or more programs stored in the memory and configured to be executed by the one or more processors, the one or more programs including instructions for performing any of the above methods.

Some examples of the disclosure are directed to a non-transitory computer readable storage medium storing one or more programs, the one or more programs comprising instructions, which when executed by one or more processors of an electronic device, cause the electronic device to perform any of the above methods.

Some examples of the disclosure are directed to an electronic device, comprising one or more processors, memory, and means for performing any of the above methods.

Some examples of the disclosure are directed to an information processing apparatus for use in an electronic device, the information processing apparatus comprising means for performing any of the above methods.

The foregoing description, for purpose of explanation, has been described with reference to specific examples. However, the illustrative discussions above are not intended to be exhaustive or to limit the invention to the precise forms disclosed. Many modifications and variations are possible in view of the above teachings. The examples were chosen and described in order to best explain the principles of the invention and its practical applications, to thereby enable others skilled in the art to best use the invention and various described examples with various modifications as are suited to the particular use contemplated.

What is claimed is:

1. A method comprising:

at an electronic device in communication with one or more displays and one or more input devices:

presenting, via the one or more displays, a virtual playback user interface at a first location in a three-dimensional environment, wherein the virtual playback user interface is configured to display content;

while displaying a first content item for a performance event in the virtual playback user interface at the first location in the three-dimensional environment, detecting an indication of initiation of a first event associated with the first content item; and in response to detecting the indication:

in accordance with a determination that the first event associated with the first content item satisfies one or more criteria, presenting, via the one or more displays, a first animated spatial effect that is based on the performance event in the three-dimensional environment, wherein the first animated spatial effect is presented as originating from a second location in the three-dimensional environment that is different from the first location of the virtual playback user interface and that is separate from the first content item; and in accordance with a determination that the first event associated with the first content item does not satisfy the one or more criteria, forgoing presentation of the first animated spatial effect in the three-dimensional environment.

2. The method of claim 1, wherein:

the performance event corresponds to an athletic event; and the one or more criteria include a criterion that is satisfied in accordance with a determination that a respective team participating in the athletic event scores a point.

3. The method of claim 2, wherein the criterion is further satisfied in accordance with a determination that the respective team corresponds to a user-preferred team defined according to one or more user preferences.

4. The method of claim 2, further comprising:

in response to detecting the indication:

in accordance with the determination that the first event associated with the first content item does not satisfy the one or more criteria because a first team that does not correspond to a user-preferred team participating in the athletic event scores a point, presenting, via the one or more displays, a second animated spatial effect, different from the first animated spatial effect, that is based on the athletic event in the three-dimensional environment.

5. The method of claim 2, wherein the one or more criteria include a criterion that is satisfied in accordance with a determination that the first event corresponds to a respective action performed by a respective player participating in the athletic event, a respective venue at which the athletic event is taking place is a first venue, or the performance event corresponds to a user-preferred performance event defined according to one or more user preferences.

6. The method of claim 1, further comprising:

after presenting the first animated spatial effect in the three-dimensional environment in accordance with the determination that the first event associated with the first content item satisfied the one or more criteria in response to detecting the indication, detecting an indication of a conclusion of the first event; and in response to detecting the indication of the conclusion of the first event, ceasing presentation of the first animated spatial effect in the three-dimensional environment.

7. The method of claim 1, wherein, before detecting the indication, a portion of the three-dimensional environment surrounding the virtual playback user interface is presented with a first level of brightness relative to the virtual playback user interface, the method further comprising:

in response to detecting the indication:

updating presentation, via the one or more displays, of the portion of the three-dimensional environment surrounding the virtual playback user interface to be displayed with a second level of brightness, less than the first level of brightness, relative to the virtual playback user interface.

8. The method of claim 1, wherein presenting the first animated spatial effect includes outputting first audio corresponding to the first animated spatial effect, wherein the first audio is different from audio corresponding to the first content item.

9. An electronic device comprising:

one or more processors;

memory; and one or more programs stored in the memory and configured to be executed by the one or more processors, the one or more programs including instructions for performing a method comprising:

presenting, via one or more displays, a virtual playback user interface at a first location in a three-dimensional environment, wherein the virtual playback user interface is configured to display content;

while displaying a first content item for a performance event in the virtual playback user interface at the first location in the three-dimensional environment, detecting an indication of initiation of a first event associated with the first content item; and in response to detecting the indication:

in accordance with a determination that the first event associated with the first content item satisfies one or more criteria, presenting, via the one or more displays, a first animated spatial effect that is based on the performance event in the three-dimensional environment, wherein the first animated spatial effect is presented as originating from a second location in the three-dimensional environment that is different from the first location of the virtual playback user interface and that is separate from the first content item; and in accordance with a determination that the first event associated with the first content item does not satisfy the one or more criteria, forgoing presentation of the first animated spatial effect in the three-dimensional environment.

10. The electronic device of claim 9, wherein:

the performance event corresponds to an athletic event; and the one or more criteria include a criterion that is satisfied in accordance with a determination that a respective team participating in the athletic event scores a point.

11. The electronic device of claim 10, wherein the criterion is further satisfied in accordance with a determination that the respective team corresponds to a user-preferred team defined according to one or more user preferences.

12. The electronic device of claim 10, wherein the method further comprises:

in response to detecting the indication:

in accordance with the determination that the first event associated with the first content item does not satisfy the one or more criteria because a first team that does not correspond to a user-preferred team participating in the athletic event scores a point, presenting, via the one or more displays, a second animated spatial effect, different from the first animated spatial effect, that is based on the athletic event in the three-dimensional environment.

13. The electronic device of claim 10, wherein the one or more criteria include a criterion that is satisfied in accordance with a determination that the first event corresponds to a respective action performed by a respective player participating in the athletic event, a respective venue at which the athletic event is taking place is a first venue, or the performance event corresponds to a user-preferred performance event defined according to one or more user preferences.

14. The electronic device of claim 9, wherein the method further comprises:

after presenting the first animated spatial effect in the three-dimensional environment in accordance with the determination that the first event associated with the first content item satisfied the one or more criteria in response to detecting the indication, detecting an indication of a conclusion of the first event; and in response to detecting the indication of the conclusion of the first event, ceasing presentation of the first animated spatial effect in the three-dimensional environment.

15. The electronic device of claim 9, wherein, before detecting the indication, a portion of the three-dimensional environment surrounding the virtual playback user interface is presented with a first level of brightness relative to the virtual playback user interface, the method further comprising:

in response to detecting the indication:

updating presentation, via the one or more displays, of the portion of the three-dimensional environment surrounding the virtual playback user interface to be displayed with a second level of brightness, less than the first level of brightness, relative to the virtual playback user interface.

16. The electronic device of claim 9, wherein presenting the first animated spatial effect includes outputting first audio corresponding to the first animated spatial effect, wherein the first audio is different from audio corresponding to the first content item.

17. A non-transitory computer readable storage medium storing one or more programs, the one or more programs comprising instructions, which when executed by one or more processors of an electronic device, cause the electronic device to perform a method comprising:

presenting, via one or more displays, a virtual playback user interface at a first location in a three-dimensional environment, wherein the virtual playback user interface is configured to display content;

while displaying a first content item for a performance event in the virtual playback user interface at the first location in the three-dimensional environment, detecting an indication of initiation of a first event associated with the first content item; and in response to detecting the indication:

in accordance with a determination that the first event associated with the first content item satisfies one or more criteria, presenting, via the one or more displays, a first animated spatial effect that is based on the performance event in the three-dimensional environment, wherein the first animated spatial effect is presented as originating from a second location in the three-dimensional environment that is different from the first location of the virtual playback user interface and that is separate from the first content item; and in accordance with a determination that the first event associated with the first content item does not satisfy the one or more criteria, forgoing presentation of the first animated spatial effect in the three-dimensional environment.

18. The non-transitory computer readable storage medium of claim 17, wherein:

the performance event corresponds to an athletic event; and the one or more criteria include a criterion that is satisfied in accordance with a determination that a respective team participating in the athletic event scores a point.

19. The non-transitory computer readable storage medium of claim 18, wherein the criterion is further satisfied in accordance with a determination that the respective team corresponds to a user-preferred team defined according to one or more user preferences.

20. The non-transitory computer readable storage medium of claim 18, wherein the method further comprises:

in response to detecting the indication:

in accordance with the determination that the first event associated with the first content item does not satisfy the one or more criteria because a first team that does not correspond to a user-preferred team participating in the athletic event scores a point, presenting, via the one or more displays, a second animated spatial effect, different from the first animated spatial effect, that is based on the athletic event in the three-dimensional environment.

21. The non-transitory computer readable storage medium of claim 18, wherein the one or more criteria include a criterion that is satisfied in accordance with a determination that the first event corresponds to a respective action performed by a respective player participating in the athletic event, a respective venue at which the athletic event is taking place is a first venue, or the performance event corresponds to a user-preferred performance event defined according to one or more user preferences.

22. The non-transitory computer readable storage medium of claim 17, wherein the method further comprises:

after presenting the first animated spatial effect in the three-dimensional environment in accordance with the determination that the first event associated with the first content item satisfied the one or more criteria in response to detecting the indication, detecting an indication of a conclusion of the first event; and in response to detecting the indication of the conclusion of the first event, ceasing presentation of the first animated spatial effect in the three-dimensional environment.

23. The non-transitory computer readable storage medium of claim 17, wherein, before detecting the indication, a portion of the three-dimensional environment surrounding the virtual playback user interface is presented with a first level of brightness relative to the virtual playback user interface, the method further comprising:

in response to detecting the indication:

updating presentation, via the one or more displays, of the portion of the three-dimensional environment surrounding the virtual playback user interface to be displayed with a second level of brightness, less than the first level of brightness, relative to the virtual playback user interface.

24. The non-transitory computer readable storage medium of claim 17, wherein presenting the first animated spatial effect includes outputting first audio corresponding to the first animated spatial effect, wherein the first audio is different from audio corresponding to the first content item.

* * * * *